(12) United States Patent
Teder et al.

(10) Patent No.: US 12,518,388 B2
(45) Date of Patent: Jan. 6, 2026

(54) SYSTEMS AND METHODS FOR EYELID LOCALIZATION

(71) Applicant: Blinktbi, Inc., Charleston, SC (US)

(72) Inventors: Logan Sean Teder, Charleston, SC (US); Eric Fouad Abboud, Charleston, SC (US); Ryan Nicholas Fiorini, Charleston, SC (US)

(73) Assignee: BLINKTBI, INC., Charleston, SC (US)

( * ) Notice: Subject to any disclaimer, the term of this patent is extended or adjusted under 35 U.S.C. 154(b) by 484 days.

(21) Appl. No.: 17/827,528

(22) Filed: May 27, 2022

(65) Prior Publication Data

US 2022/0383502 A1     Dec. 1, 2022

Related U.S. Application Data

(60) Provisional application No. 63/275,749, filed on Nov. 4, 2021, provisional application No. 63/194,554, filed on May 28, 2021.

(51) Int. Cl.
*G06T 7/00* (2017.01)
*A61B 5/00* (2006.01)
(Continued)

(52) U.S. Cl.
CPC .......... *G06T 7/0016* (2013.01); *A61B 5/4064* (2013.01); *G06T 7/70* (2017.01);
(Continued)

(58) Field of Classification Search
CPC .................. G06T 7/0016; G06T 7/70; G06T 2207/20081; G06T 2207/20084;
(Continued)

(56) References Cited

U.S. PATENT DOCUMENTS

| 4,815,839 A | 3/1989 | Waldorf |
| 4,850,691 A | 7/1989 | Gardner et al. |

(Continued)

FOREIGN PATENT DOCUMENTS

| AT | 505338 B1 | 3/2009 |
| AU | 767533 B2 | 11/2000 |

(Continued)

OTHER PUBLICATIONS

Buonaguidi, et al., "Blink reflexes in severe traumatic coma," Journal of Neurology, Neurosurgery, and Psychiatry, vol. 42, pp. 470-474, 1979.

(Continued)

*Primary Examiner* — Christopher M Brandt

(57) ABSTRACT

Systems and methods for localizing an upper eyelid in an image of a subject are provided. An image of an eye of the subject is obtained in electronic format. The image is inputted into a trained neural network comprising at least 10,000 parameters, thereby obtaining a set of coordinates for an upper eyelid in the image. This obtaining and inputting can be repeated over the course of a non-zero duration thereby obtaining a corresponding set of coordinates for the upper eyelid in each image in a plurality of images. Each corresponding set of coordinates for the upper eyelid from each image in the plurality of images can be used to determine whether the subject is afflicted with a neurological condition.

31 Claims, 9 Drawing Sheets

(51) Int. Cl.
  *G06T 7/70*      (2017.01)
  *G16H 30/40*     (2018.01)
  *G16H 50/20*     (2018.01)
(52) U.S. Cl.
  CPC ............ *G16H 30/40* (2018.01); *G16H 50/20* (2018.01); *G06T 2207/20081* (2013.01); *G06T 2207/20084* (2013.01); *G06T 2207/30041* (2013.01); *G06T 2207/30201* (2013.01)
(58) Field of Classification Search
  CPC . G06T 2207/30041; G06T 2207/30201; G06T 7/73; G06T 2207/10016; A61B 5/4064; A61B 5/4082; A61B 5/7267; A61B 2576/00; G16H 30/40; G16H 50/20
  See application file for complete search history.

(56) References Cited

U.S. PATENT DOCUMENTS

| | | |
|---|---|---|
| 5,138,345 A | 8/1992 | Waldorf et al. |
| 5,333,009 A | 7/1994 | Gell, Jr. et al. |
| 5,570,698 A | 11/1996 | Liang et al. |
| 5,867,587 A | 2/1999 | Aboutalib et al. |
| 6,091,334 A | 7/2000 | Galiana et al. |
| 6,116,736 A | 9/2000 | Stark et al. |
| 6,542,081 B2 | 4/2003 | Torch |
| 6,572,562 B2 | 6/2003 | Marshall |
| 6,820,979 B1 | 11/2004 | Stark et al. |
| 6,887,199 B2 | 5/2005 | Bridger et al. |
| 7,011,410 B2 | 3/2006 | Bolger et al. |
| 7,216,978 B2 | 5/2007 | Perez et al. |
| 7,347,551 B2 | 3/2008 | Fergason et al. |
| 7,401,920 B1 | 7/2008 | Kranz et al. |
| 7,438,418 B2 | 10/2008 | Marshall |
| 7,553,021 B2 | 6/2009 | Fergason et al. |
| 7,614,745 B2 | 11/2009 | Waldorf et al. |
| 7,647,098 B2 | 1/2010 | Prichep |
| 7,720,530 B2 | 5/2010 | Causevic |
| 7,771,353 B2 | 8/2010 | Luce |
| 7,810,928 B2 | 10/2010 | Kandel et al. |
| 7,938,785 B2 | 5/2011 | Aguilar et al. |
| 7,959,293 B2 | 6/2011 | Huth |
| 7,963,655 B2 | 6/2011 | Huth et al. |
| 7,967,442 B2 | 6/2011 | Siminou |
| 8,209,004 B2 | 6/2012 | Freer et al. |
| 8,333,475 B2 | 12/2012 | Sugio et al. |
| 8,393,734 B2 | 3/2013 | Privitera et al. |
| 8,911,087 B2 | 12/2014 | Publicover et al. |
| 9,155,489 B2 | 10/2015 | Zelinsky |
| 9,298,985 B2 | 3/2016 | Krueger |
| 10,448,825 B2 | 10/2019 | Tsai et al. |
| 10,796,147 B1* | 10/2020 | Hanna .................... G06V 40/19 |
| 11,538,280 B2* | 12/2022 | Kaehler ............... G06V 40/193 |
| 11,642,021 B2 | 5/2023 | Tsai et al. |
| 2005/0073136 A1 | 4/2005 | Larsson et al. |
| 2005/0165327 A1 | 7/2005 | Thibault et al. |
| 2011/0066003 A1 | 3/2011 | Duffy |
| 2011/0066068 A1 | 3/2011 | Duffy |
| 2011/0066082 A1 | 3/2011 | Duffy |
| 2011/0077548 A1 | 3/2011 | Torch |
| 2011/0207718 A1 | 8/2011 | Bird |
| 2012/0182149 A1 | 7/2012 | Moreno Valenzuela et al. |
| 2012/0238831 A1 | 9/2012 | Benford |
| 2012/0330178 A1 | 12/2012 | Kraft et al. |
| 2013/0217707 A1 | 8/2013 | Faraone |
| 2014/0016097 A1 | 1/2014 | Leonardi et al. |
| 2016/0073874 A1 | 3/2016 | Tsai et al. |
| 2018/0045949 A1* | 2/2018 | Hua ........................ G02B 5/04 |
| 2019/0059790 A1 | 2/2019 | Yoshii |
| 2019/0384967 A1* | 12/2019 | Sun ....................... G06V 10/82 |
| 2020/0013509 A1 | 1/2020 | Matharu |
| 2020/0069239 A1 | 3/2020 | Tsai et al. |
| 2020/0107767 A1 | 4/2020 | Anson |
| 2020/0175352 A1* | 6/2020 | Cha ......................... G06N 3/04 |
| 2020/0253472 A1* | 8/2020 | Yukimori .............. G06T 7/0012 |
| 2020/0286251 A1* | 9/2020 | Kaehler .................. G06N 3/04 |
| 2021/0042548 A1* | 2/2021 | Luo ...................... G06V 40/171 |
| 2021/0295954 A1* | 9/2021 | Rothberg .............. G16B 25/20 |
| 2021/0298595 A1* | 9/2021 | Lai .......................... A61B 5/00 |
| 2022/0044403 A1* | 2/2022 | Ayatsuka ............... A61B 3/152 |
| 2022/0318567 A1* | 10/2022 | Muhamedrahimov ....................... A61B 6/481 |
| 2022/0351545 A1* | 11/2022 | Ben-Ami ................. G06N 3/09 |
| 2023/0389853 A1 | 12/2023 | Tsai et al. |
| 2024/0032788 A1 | 2/2024 | Tsai et al. |

FOREIGN PATENT DOCUMENTS

| | | |
|---|---|---|
| AU | 2011326327 B2 | 1/2014 |
| CA | 2757486 C | 7/2018 |
| DE | 102005024796 A1 | 11/2006 |
| EP | 2062158 B1 | 9/2012 |
| EP | 2237237 B1 | 3/2013 |
| EP | 3081156 B1 | 5/2024 |
| FR | 2773521 A1 | 3/2000 |
| JP | S62275432 A | 11/1987 |
| JP | H04279143 A | 10/1992 |
| JP | H04126505 U | 11/1992 |
| JP | 1995255669 | 10/1995 |
| JP | 2004329879 A | 11/2004 |
| JP | 2007255669 A | 10/2007 |
| JP | 4103829 B2 | 6/2008 |
| JP | 4259160 B2 | 4/2009 |
| JP | 3183161 U | 5/2013 |
| JP | 5270415 B2 | 8/2013 |
| JP | 6227996 B2 | 11/2018 |
| JP | 2017209262 A | 11/2019 |
| KR | 101576319 B1 | 12/2015 |
| KR | 102072788 B1 | 3/2020 |
| WO | WO 2002/009025 A1 | 1/2002 |
| WO | WO 2003/075762 A1 | 9/2003 |
| WO | WO 2006/091893 A2 | 8/2006 |
| WO | WO 2006/092022 A1 | 9/2006 |
| WO | WO 2007/128034 A1 | 11/2007 |
| WO | WO 2009/109750 A1 | 9/2009 |
| WO | WO 2011/064534 A1 | 6/2011 |
| WO | WO 2012/006330 A1 | 1/2012 |
| WO | WO 2014/179558 | 11/2014 |
| WO | WO 2016/023126 A1 | 2/2016 |
| WO | WO 2018/213245 A1 | 11/2018 |
| WO | WO 2022/261316 A1 | 12/2022 |
| WO | WO 2023/154453 A1 | 8/2023 |
| WO | WO 2023/154456 A1 | 8/2023 |
| WO | WO 2023/154899 A1 | 8/2023 |
| WO | WO 2023/172561 A1 | 9/2023 |
| ZA | 200608191 B | 7/2008 |

OTHER PUBLICATIONS

Di Clemente, et al., "Interictal habituation deficit of the nociceptive blink reflex: an endophenotypic marker for presymptomatic migraine?" Brain, vol. 130, pp. 765-770, 2007.

Esteban, et al., "Early detection of Huntington's disease. Blink reflex and levodopa load in presymptomatic and incipient subjects," Journal of Neurology, Neurosurgery, and Psychiatry, vol. 44, pp. 43-48, 1981.

Garner, et al., "Blink reflex parameters in baseline, active, and head-impact Division I athletes," Cogent Engineering. vol. 5, 10 pages, 2018.

International Search Report & Written Opinion PCT Application No. PCT/US22/31443, dated Nov. 8, 2022, 12 pages.

Kaiser, et al., "A measure of the blink reflex to parametric variation of mechanical stimulation of the trigeminal nerve," Psychophysiology, vol. 61: e14566, 12 pages, 2024.

Khan, "Revisiting the Corneal and Blink Reflexes for Primary and Secondary Trigeminal Facial Pain Differentiation," Hindawi Pain Research and Management, vol. 2021, Article ID 6664736, 6 pages, 2021.

Paparella, et al., "Validating a Portable Device for Blinking Analyses through Laboratory Neurophysiological Techniques," Brain Sci., vol. 12, 12 pages, 2022.

(56) References Cited

OTHER PUBLICATIONS

Saunders, et al., "Loss of Emotional Experience After Traumatic Brain Injury: Findings With the Startle Probe Procedure," Neuropsychology, vol. 20, No. 2, pp. 224-231, 2006.

\* cited by examiner

| epoch | train_loss | valid_loss | pixmae | r2_score | time |
|---|---|---|---|---|---|
| 0 | 2.139720 | 0.545090 | 156.221222 | -9.077664 | 00:31 |
| 1 | 0.657690 | 0.053155 | 48.540703 | 0.017259 | 00:31 |
| 2 | 0.175191 | 0.005514 | 16.449020 | 0.898048 | 00:31 |
| 3 | 0.057106 | 0.003893 | 13.894175 | 0.928027 | 00:31 |
| 4 | 0.027418 | 0.004082 | 14.363956 | 0.924526 | 00:31 |
| epoch | train_loss | valid_loss | pixmae | r2_score | time |
| 0 | 0.020195 | 0.004117 | 14.482845 | 0.923878 | 00:31 |
| 1 | 0.020185 | 0.003961 | 14.224900 | 0.926776 | 00:32 |
| 2 | 0.020036 | 0.003923 | 14.240162 | 0.927463 | 00:31 |
| 3 | 0.020334 | 0.004058 | 14.323982 | 0.924968 | 00:32 |
| 4 | 0.019612 | 0.003792 | 13.822489 | 0.929895 | 00:31 |

Figure 4A

| epoch | train_loss | valid_loss | pixmae | r2_score | time |
|---|---|---|---|---|---|
| 0 | 0.114145 | 0.054773 | 52.658009 | -0.012653 | 00:52 |
| 1 | 0.086313 | 0.020367 | 30.318348 | 0.623456 | 00:23 |
| 2 | 0.040391 | 0.007899 | 19.428959 | 0.853970 | 00:23 |
| 3 | 0.026267 | 0.007471 | 19.488333 | 0.861873 | 00:23 |
| 4 | 0.020330 | 0.006734 | 18.209454 | 0.875507 | 00:23 |
| 5 | 0.017368 | 0.006033 | 16.947474 | 0.888463 | 00:23 |
| 6 | 0.016019 | 0.005373 | 15.951227 | 0.900666 | 00:23 |
| 7 | 0.014768 | 0.005443 | 16.015240 | 0.899376 | 00:23 |
| 8 | 0.014543 | 0.005378 | 15.952161 | 0.900567 | 00:23 |
| 9 | 0.014647 | 0.005224 | 15.622643 | 0.903418 | 00:23 |

Figure 4B

SYSTEMS AND METHODS FOR EYELID LOCALIZATION

CROSS REFERENCE TO RELATED APPLICATIONS

This application claims priority to U.S. Provisional Patent Application No. 63/194,554, entitled "Systems and Methods for Eyelid Localization," filed May 28, 2021, and U.S. Provisional Patent Application No. 63/275,749, entitled "Systems and Methods for Eyelid Localization," filed Nov. 4, 2021, the content of each of which is hereby incorporated by reference, in its entirety, for all purposes.

TECHNICAL FIELD

This specification describes using a neural network to locate an eyelid in an image.

BACKGROUND

Blinking is an activity that serves physiologic maintenance, protective, and brain restorative functions. With every blink, an ocular lubricant is swept across the eyeball providing moisture and anti-microbial protection to the orbit. Blinking also provides rest and reset for retinal cells that are activated and fade when fixed on an object. Blinks can be classified as voluntary, acquired, passive, spontaneous and reflexive; each with a distinct cause, innervation pathway and temporal profile. Reflexive blinks, also called the blink reflexes, can be elicited by tactile, light, and sound stimulation, and serve to provide a first line of defense to the globe and the brain behind it.

Numerous studies have examined the blink reflex in normal populations, as well as the changes that occur in a variety of neurological conditions, such as Parkinson's disease, Huntington's disease, schizophrenia and severe traumatic brain injury. Indeed, the sensitivity of the blink reflex to a variety of insults indicates that it may be a useful tool for assessing neurological function. This is particularly relevant given the current public interest in developing methods to detect concussions, offering a more encompassing field sobriety test, and monitoring patients for early onset of Alzheimer's disease.

The blink reflex is a primitive brainstem response to an external stimulus, such as air, visual cues or electrical signals, which can be affected by multiple neurological disorders, including those that affect the dopaminergic circuit that controls the eyelid. Previous studies using electromyography have shown that diffuse axonal injury and exercise result in measurable changes in the blink reflex. As described above, previous studies have also examined the changes that occur to the blink reflex in a variety of neurological conditions, such as Parkinson's disease, Huntington's disease, schizophrenia and severe traumatic brain injury. See, for example, Garner et al., 2018, "Blink reflex parameters in baseline, active, and head-impact Division I athletes," Cogent Engineering, 5:1429110; doi: 10.1080/23311916.2018.1429110.

However, despite the correlation between altered blink reflex parameters and neurological health, quantitative approaches for examining the blink reflex have not been adopted in clinical practice, and qualitative assessments remain standard. In recent decades, considerable technological advancements have been made. For instance, digital image capture technologies have improved significantly over the past two decades and have significantly decreased in cost. The high frame rates currently available allow for measurements in the millisecond range, where image capture occurs at speeds that facilitate the quantification of blink reflexes.

Concurrently, processing power has increased, making analysis of the thousands of image frames recorded at high frame rates feasible. High-speed image capture has been successfully employed to record and measure eyelid location during a single, voluntary blink in both healthy subjects and in patients with blepharoptosis. However, no study has used high-speed image capture to study reflexive blinks. Furthermore, methods that use non-invasive measurements and machine learning-based image analysis to measure eyelid location, or to diagnose a variety of neurological conditions, are lacking. See, for example, Tsai et al., 2017, "Development of a Non-Invasive Blink Reflexometer," IEEE J Transl Eng Health Med; 5:3800204; doi: 10.1109/JTEHM.2017.2782669, which is hereby incorporated by reference.

Given the above background, there is a need in the art for systems and methods of processing and analyzing images for eyelid location.

SUMMARY

Advantageously, the present disclosure provides robust techniques for localizing an eyelid in an image. Moreover, the combination of linear algebra, statistics, model architecture and image analysis used in some embodiments of the present disclosure provides additional model training and image localization power beyond previous model architectures used for image localization.

Technical solutions (e.g., computing systems, methods, and non-transitory computer-readable storage mediums) for addressing the above-identified problems with analyzing datasets are provided in the present disclosure.

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

Embodiments directed towards training a neural network to localize an eyelid in an image. One aspect of the present disclosure provides a method for training a neural network to localize an eyelid in an image. A training dataset is obtained in electronic format, the training dataset comprising, for each respective training object in a plurality of training objects, a corresponding image of an eye comprising a corresponding plurality of pixels and one or more pixel values (e.g., RGB and/or grey-scaled pixel values) for each pixel in the corresponding plurality of pixels, and a corresponding first measured set of coordinates that localize an eyelid (e.g., an upper eyelid and/or a lower eyelid) in the corresponding image. An untrained or partially trained neural network (e.g., a residual and/or convolutional neural network) comprising a plurality (e.g., 10,000 or more) of parameters is trained by a procedure comprising inputting each corresponding image of each corresponding training object in the plurality of training objects as input to the untrained or partially trained neural network, thus obtaining a corresponding first calculated set of coordinates that localize an eyelid in the corresponding image. The procedure further comprises using at least a difference between the corresponding calculated set of coordinates and the corresponding first measured set of coordinates obtained for each object in the plurality of objects to update all or a subset of the plurality (e.g., 10,000 or more) of parameters, thus training the neural network to localize an eyelid in an image.

In some embodiments, the method further comprises determining a class for a first training object in the plurality of training objects, by a procedure comprising obtaining a first pair of images comprising a query image of an eye corresponding to the first training object and a reference image of an eye corresponding to a second training object, other than the first training object, in the plurality of training objects, where the reference image is of a corresponding class, and inputting the query image and the reference image into a trained auxiliary neural network comprising a plurality (e.g., at least 500) parameters, thereby determining whether the query image and the reference image are of the same corresponding class.

Embodiments directed towards using a trained neural network to localize an eyelid in an image. Another aspect of the present disclosure provides a method for localizing an eyelid (e.g., an upper eyelid and/or a lower eyelid) in an image of a subject. An image of an eye of the subject is obtained in electronic format. The image is inputted into a trained neural network (e.g., a residual and/or convolutional neural network) comprising a plurality (e.g., at least 10,000) of parameters, thus obtaining a set of coordinates for an eyelid in the image.

Another aspect of the present disclosure provides a computing system including the above-disclosed one or more processors and memory storing one or more programs that further comprise instructions for performing any of the above-disclosed methods alone or in combination.

Another aspect of the present disclosure provides non-transitory computer-readable storage medium comprising the above-disclosed one or more programs in which the one or more programs further comprise instructions for performing any of the above-disclosed methods alone or in combination. The one or more programs are configured for execution by a computer.

Various embodiments of systems, methods, and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand these and other features and attributes of various embodiments of the present disclosure and their advantageous applications and/or uses.

INCORPORATION BY REFERENCE

All publications, patents, and patent applications mentioned in this specification are herein incorporated by reference in their entireties to the same extent as if each individual publication, patent, or patent application was specifically and individually indicated to be incorporated by reference.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the several views of the drawings.

FIGS. 4A and 4B illustrate example performance measures of a pre-trained ResNet model (FIG. 4A) and a ResNet model with custom architecture (FIG. 4B), in accordance with some embodiments of the present disclosure.

DETAILED DESCRIPTION

Figure 1:
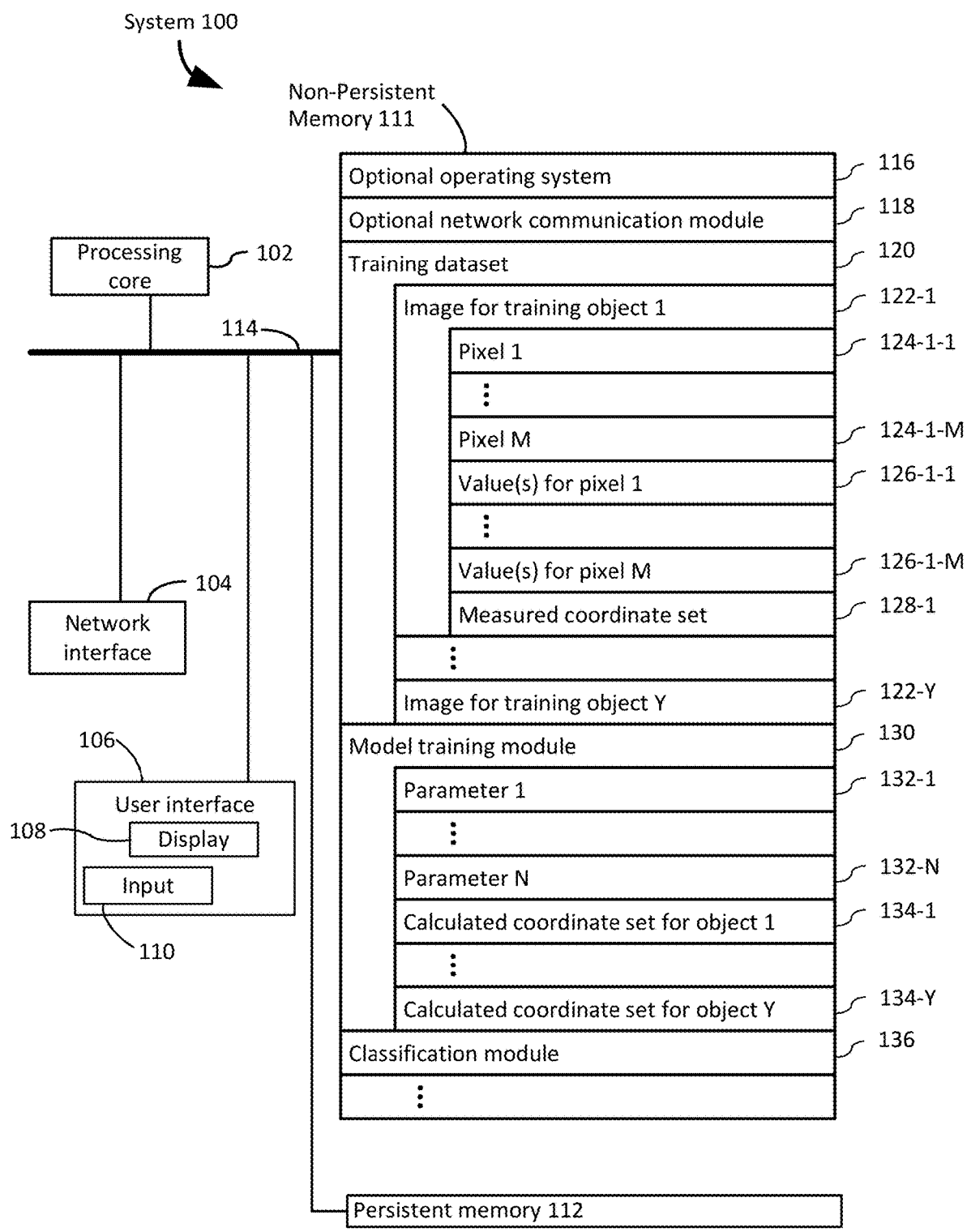
FIG. 1 illustrates an example block diagram illustrating a computing device in accordance with some embodiments of the present disclosure.

The implementations described herein provide various technical solutions for eyelid localization in an image. For instance, in an aspect of the present disclosure, a neural network (e.g., a convolutional and/or residual neural network) is trained to provide a set of coordinates that localize an upper and/or a lower eyelid in an image from a subject (e.g., images such as those illustrated in FIGS. 5A-C and 6). In another aspect of the present disclosure, a trained neural network (e.g., a convolutional and/or a residual neural network) is used to obtain a set of coordinates for an upper and/or a lower eyelid in a plurality of images obtained from a subject over a period of time (e.g., a series of captured images such as frames of a video), which can be used to determine whether the subject is afflicted with a neurological condition.

For example, in some embodiments, the present disclosure provides a machine-learning model constructed using a neural network. One or more images of an eye (including an eyelid) is received as input to the neural network. The output comprises Cartesian coordinates corresponding to the location of the upper and/or lower eyelids in the image, accomplished, for example, through application of linear algebra and statistics.

In some such embodiments, an image is interpreted as a large tensor of numeric values corresponding to the shade of each pixel in the image. Each pixel is compared to criteria that the model is trained to recognize. Each pixel in the frame is further augmented in such a way that the model can more easily differentiate it from other identifiable situations. The order and actions of augmentations are deeply layered to aid in the speed and accuracy of computing.

Each pixel is assigned, by the model, a probability that it is one of the target eyelids (e.g., upper and/or lower). Repeated iterations between pixel values and augmentations provides an emergent behavior in which the model is able to accurately identify the most probabilistic eyelid locations. Accuracy of predictions is established through the consistency and thoroughness of the training process. For example, through the refinement of parameters in the neural network (e.g., weights), the model is trained to recognize sequences of numeric values corresponding to real-world objects (e.g., eyelid coordinates) based on repeated exposure to similar sequences during the training process. Thus, the systems and methods provided herein, in some aspects, provide an extremely sophisticated and versatile pattern-matching system, in which large arrays of numeric values (e.g., a machine learning representation of an image) is transformed into a set of coordinates indicating a location on the image.

Advantageously, the present disclosure provides methods and systems that provide rapid and consistent eyelid localization through the use of the model architectures disclosed herein. For example, as illustrated in Example 1 and FIGS. 4A-B, a model architecture constructed and trained to localize an eyelid in an image in accordance with some embodiments of the present disclosure exhibited faster completion times for each training epoch (runtime speed), with consistency of mean absolute error of predictions in pixels (pixmae), training loss, and validation loss across training epochs, in comparison to a pre-trained (e.g., transfer-learned) residual neural network model. The systems and methods provided herein thus improve the speed of eyelid localization when performed on a computing system (e.g., using a machine-learning model as disclosed herein).

Nonlimiting examples of neural networks suitable for use include LeNet, AlexNet, VGGNet 16, GoogLeNet, ResNet, SE-ResNeXt, MobileNet, and/or EfficientNet. For instance, in some embodiments the neural network is a neural network (e.g., a residual and/or convolutional neural network) comprising 10,000 or more parameters.

Advantageously, the present disclosure further provides various systems and methods that improve the computational determination of coordinates in an image, such as the localization of an upper and/or a lower eyelid in an image of a subject, by improving the training and use of a model for more accurate image processing and analysis. The complexity of a machine learning model includes time complexity (running time, or the measure of the speed of an algorithm for a given input size n), space complexity (space requirements, or the amount of computing power or memory needed to execute an algorithm for a given input size n), or both. Complexity (and subsequent computational burden) applies to both training of and prediction by a given model.

In some instances, computational complexity is impacted by implementation, incorporation of additional algorithms or cross-validation methods, and/or one or more parameters (e.g., weights and/or hyperparameters). In some instances, computational complexity is expressed as a function of input size n, where input data is the number of instances (e.g., the number of training samples), dimensions p (e.g., the number of features), the number of trees $n_{trees}$ (e.g., for methods based on trees), the number of support vectors $n_{sv}$ (e.g., for methods based on support vectors), the number of neighbors k (e.g., fork nearest neighbor algorithms), the number of classes c, and/or the number of neurons $n_i$ at a layer i (e.g., for neural networks). With respect to input size n, then, an approximation of computational complexity (e.g., in Big O notation) denotes how running time and/or space requirements increase as input size increases. Functions can increase in complexity at slower or faster rates relative to an increase in input size. Various approximations of computational complexity include but are not limited to constant (e.g., $O(1)$), logarithmic (e.g., $O(\log n)$), linear (e.g., $O(n)$), loglinear (e.g., $O(n \log n)$), quadratic (e.g., $O(n^2)$), polynomial (e.g., $O(n^c)$), exponential (e.g., $O(c^n)$), and/or factorial (e.g., $O(n!)$). In some instances, simpler functions are accompanied by lower levels of computational complexity as input sizes increase, as in the case of constant functions, whereas more complex functions such as factorial functions can exhibit substantial increases in complexity in response to slight increases in input size.

Computational complexity of machine learning models can similarly be represented by functions (e.g., in Big O notation), and complexity may vary depending on the type of model, the size of one or more inputs or dimensions, usage (e.g., training and/or prediction), and/or whether time or space complexity is being assessed. For example, complexity in decision tree algorithms is approximated as $O(n^2p)$ for training and $O(p)$ for predictions, while complexity in linear regression algorithms is approximated as $O(p^2n+p^3)$ for training and $O(p)$ for predictions. For random forest algorithms, training complexity is approximated as $O(n^2pn_{trees})$ and prediction complexity is approximated as $O(pn_{trees})$. For gradient boosting algorithms, complexity is approximated as $O(npn_{trees})$ for training and $P(pn_{trees})$ for predictions. For kernel support vector machines, complexity is approximated as $O(n^2p+n^3)$ for training and $O(n_{sv}p)$ for predictions. For naïve Bayes algorithms, complexity is represented as $O(np)$ for training and $O(p)$ for predictions, and for neural networks, complexity is approximated as $O(pn_1 + n_1n_2 + \ldots )$ for predictions. Complexity in K nearest neighbors algorithms is approximated as $O(knp)$ for time and $O(np)$ for space. For logistic regression algorithms, complexity is approximated as $O(np)$ for time and $O(p)$ for space. For logistic regression algorithms, complexity is approximated as $O(np)$ for time and $O(p)$ for space.

As described above, for machine learning models, computational complexity dictates the scalability and therefore the overall effectiveness and usability of a model (e.g., a classifier) for increasing input, feature, and/or class sizes, as well as for variations in model architecture. In the context of large-scale image processing, as in the case of analysis of the thousands of image frames recorded at high frame rates using high-speed image capture described above, the computational complexity of functions performed on large image datasets (e.g., batches of images for a plurality of training subjects) may strain the capabilities of many existing systems. In addition, as the number of input features (e.g., number of pixels (e.g., image size and/or resolution), augmentations, and/or channels) and/or the number of instances (e.g., training subjects, test subjects, and/or number of images per subject (e.g., frame rate and/or batch size)) increases together with technological advancements and expanding downstream applications and possibilities, the computational complexity of any given classification model can quickly overwhelm the time and space capacities provided by the specifications of a respective system.

Thus, by using a machine learning model with a minimum input size (e.g., at least 10,000, at least 20,000, or at least 100,000 pixels) and/or a minimum number of parameters (e.g., at least 1000, at least 10,000, or at least 100,000 parameters) for the localization of an eyelid in an image of a subject, the computational complexity is proportionally increased such that it cannot be mentally performed, and the method addresses a computational problem.

Additional details on computational complexity in machine learning models are provided in "Computational complexity of machine learning algorithms," published Apr. 16, 2018, available online at: thekerneltrip.com/machine/learning/computational-complexity-learning-algorithms; Hastie, 2001, *The Elements of Statistical Learning*, Springer, N.Y.; and Arora and Barak, 2009, Computational Complexity: A Modern Approach, Cambridge University Press, New York; each of which is hereby incorporated herein by reference in its entirety.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

Definitions

As used herein, the term "about" or "approximately" means within an acceptable error range for the particular value as determined by one of ordinary skill in the art, which depends in part on how the value is measured or determined, e.g., the limitations of the measurement system. For example, in some embodiments "about" means within 1 or more than 1 standard deviation, per the practice in the art. In some embodiments, "about" means a range of ±20%, ±10%, ±5%, or ±1% of a given value. In some embodiments, the term "about" or "approximately" means within an order of magnitude, within 5-fold, or within 2-fold, of a value. Where particular values are described in the application and claims, unless otherwise stated the term "about" meaning within an acceptable error range for the particular value can be assumed. All numerical values within the detailed description herein are modified by "about" the indicated value, and consider experimental error and variations that would be expected by a person having ordinary skill in the art. The term "about" can have the meaning as commonly understood by one of ordinary skill in the art. In some embodiments, the term "about" refers to ±10%. In some embodiments, the term "about" refers to ±5%.

As disclosed herein, the term "subject," "training subject," or "test subject" refers to any living or non-living organism, including but not limited to a human (e.g., a male human, female human, fetus, pregnant female, child, or the like) and/or a non-human animal. Any human or non-human animal can serve as a subject, including but not limited to mammal, reptile, avian, amphibian, fish, ungulate, ruminant, bovine (e.g., cattle), equine (e.g., horse), caprine and ovine (e.g., sheep, goat), swine (e.g., pig), camelid (e.g., camel, llama, alpaca), monkey, ape (e.g., gorilla, chimpanzee), ursid (e.g., bear), poultry, dog, cat, mouse, rat, fish, dolphin, whale, and shark. The terms "subject" and "patient" are used interchangeably herein and can refer to a human or non-human animal who is known to have, or potentially has, a medical condition or disorder, such as, e.g., a neurological condition. In some embodiments, a subject is a "normal" or "control" subject, e.g., a subject that is not known to have a medical condition or disorder. In some embodiments, a subject is a male or female of any stage (e.g., a man, a woman, or a child).

A subject from whom an image is obtained, or who is stimulated, measured, and/or diagnosed using any of the methods or systems described herein can be of any age and can be an adult, infant or child. In some cases, the subject is 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 years old, or within a range therein (e.g., between about 2 and about 20 years old, between about 20 and about 40 years old, or between about 40 and about 90 years old).

Subjects (e.g., patients) that can benefit from a method of the present disclosure include subjects that are suspected of having a neurological condition (e.g., Alzheimer's disease, Parkinson's disease, dementia, Huntington's disease, schizophrenia, migraines, stroke, and/or epilepsy). Subjects that can benefit from a method of the present disclosure further include subjects who have experienced or are suspected of having experienced a traumatic event, a head impact, or a mild traumatic brain injury (e.g., a concussion). Additionally, subjects that can benefit from a method of the present disclosure further include subjects who are participants in sports and recreational activities (e.g., athletes).

As used herein, the terms "control," "reference," and "normal" describe a subject and/or an image from a subject that does not have a particular condition (e.g., a neurological condition), has a baseline condition (e.g., prior to onset of the particular condition), or is otherwise healthy. In an example, a method as disclosed herein can be performed to diagnose a subject having a neurological condition using a trained neural network, where the neural network is trained using one or more training images obtained from the subject prior to the onset of the condition (e.g., at an earlier time point), or from a different, healthy subject. A control image can be obtained from a control subject, or from a database.

The term "normalize" as used herein means transforming a value or a set of values to a common frame of reference for comparison purposes. For example, when one or more pixel values corresponding to one or more pixels in a respective image are "normalized" to a predetermined statistic (e.g., a mean and/or standard deviation of one or more pixel values across one or more images), the pixel values of the respective pixels are compared to the respective statistic so that the amount by which the pixel values differ from the statistic can be determined.

As used herein, the term "untrained model" (e.g., "untrained classifier" and/or "untrained neural network") refers to a machine learning model or algorithm, such as a classifier or a neural network, that has not been trained on a target dataset. In some embodiments, "training a model" (e.g., "training a neural network") refers to the process of training an untrained or partially trained model (e.g., "an untrained or partially trained neural network"). For instance, consider the case of a plurality of training objects comprising a corresponding plurality of images discussed below. The plurality of images are applied as collective input to an untrained or partially trained neural network, in conjunction with a corresponding measured set of coordinates for each respective image (hereinafter "training dataset") to train the untrained or partially trained neural network on coordinates that localize an eyelid, thereby obtaining a trained classifier. Moreover, it will be appreciated that the term "untrained model" does not exclude the possibility that transfer learning techniques are used in such training of the untrained or partially trained model. For instance, Fernandes et al., 2017, "Transfer Learning with Partial Observability Applied to Cervical Cancer Screening," Pattern Recognition and Image Analysis: 8th Iberian Conference Proceedings, 243-250, which is hereby incorporated by reference, provides non-limiting examples of such transfer learning. In instances where transfer learning is used, the untrained classifier described above is provided with additional data over and beyond that of the primary training dataset. That is, in non-limiting examples of transfer learning embodiments, the untrained classifier receives (i) the plurality of images and the measured sets of coordinates for each respective image ("primary training dataset") and (ii) additional data. Typically, this additional data is in the form of parameters (e.g., coefficients, weights, and/or hyperparameters) that were learned from another, auxiliary training dataset. Moreover, while a description of a single auxiliary training dataset has been disclosed, it will be appreciated that there is no limit on the number of auxiliary training datasets that may be used to complement the primary training dataset in training the untrained model in the present disclosure. For instance, in some embodiments, two or more auxiliary training datasets, three or more auxiliary training datasets, four or more auxiliary training datasets or five or more auxiliary training datasets are used to complement the primary training dataset through transfer learning, where each such auxiliary dataset is different than the primary training dataset. Any manner of transfer learning may be used in such embodiments. For instance, consider the case where there is a first auxiliary training dataset and a second auxiliary training dataset in addition to the primary training dataset. The parameters learned from the first auxiliary training dataset (by application of a first classifier to the first auxiliary training dataset) may be applied to the second auxiliary training dataset using transfer learning techniques (e.g., a second classifier that is the same or different from the first classifier), which in turn may result in a trained intermediate classifier whose parameters are then applied to the primary training dataset and this, in conjunction with the primary training dataset itself, is applied to the untrained classifier. Alternatively, a first set of parameters learned from the first auxiliary training dataset (by application of a first classifier to the first auxiliary training dataset) and a second set of parameters learned from the second auxiliary training dataset (by application of a second classifier that is the same or different from the first classifier to the second auxiliary training dataset) may each individually be applied to a separate instance of the primary training dataset (e.g., by separate independent matrix multiplications) and both such applications of the parameters to separate instances of the primary training dataset in conjunction with the primary training dataset itself (or some reduced form of the primary training dataset such as principal components or regression coefficients learned from the primary training set) may then be applied to the untrained classifier in order to train the untrained classifier. In some instances, additionally or alternatively, knowledge regarding eyelid coordinates (e.g., an upper eyelid and/or a lower eyelid, etc.) derived from an auxiliary training dataset is used, in conjunction with the coordinate-labeled images in the primary training dataset, to train the untrained model.

As used interchangeably herein, the term "classifier" or "model" refers to a machine learning model or algorithm.

In some embodiments, a classifier is an unsupervised learning algorithm. One example of an unsupervised learning algorithm is cluster analysis.

In some embodiments, a classifier is supervised machine learning. Nonlimiting examples of supervised learning algorithms include, but are not limited to, logistic regression, neural networks, support vector machines, Naive Bayes algorithms, nearest neighbor algorithms, random forest algorithms, decision tree algorithms, boosted trees algorithms, multinomial logistic regression algorithms, linear models, linear regression, GradientBoosting, mixture models, hidden Markov models, Gaussian NB algorithms, linear discriminant analysis, or any combinations thereof. In some embodiments, a classifier is a multinomial classifier algorithm. In some embodiments, a classifier is a 2-stage stochastic gradient descent (SGD) model. In some embodiments, a classifier is a deep neural network (e.g., a deep-and-wide sample-level classifier).

Neural networks. In some embodiments, the classifier is a neural network (e.g., a convolutional neural network and/or a residual neural network). Neural network algorithms, also known as artificial neural networks (ANNs), include convolutional and/or residual neural network algorithms (deep learning algorithms). Neural networks can be machine learning algorithms that may be trained to map an input data set to an output data set, where the neural network comprises an interconnected group of nodes organized into multiple layers of nodes. For example, the neural network architecture may comprise at least an input layer, one or more hidden layers, and an output layer. The neural network may comprise any total number of layers, and any number of hidden layers, where the hidden layers function as trainable feature extractors that allow mapping of a set of input data to an output value or set of output values. As used herein, a deep learning algorithm (DNN) can be a neural network comprising a plurality of hidden layers, e.g., two or more hidden layers. Each layer of the neural network can comprise a number of nodes (or "neurons"). A node can receive input that comes either directly from the input data or the output of nodes in previous layers, and perform a specific operation, e.g., a summation operation. In some embodiments, a connection from an input to a node is associated with a parameter (e.g., a weight and/or weighting factor). In some embodiments, the node may sum up the products of all pairs of inputs, $x_i$, and their associated parameters. In some embodiments, the weighted sum is offset with a bias, b. In some embodiments, the output of a node or neuron may be gated using a threshold or activation function, f, which may be a linear or non-linear function. The activation function may be, for example, a rectified linear unit (ReLU) activation function, a Leaky ReLU activation function, or other function such as a saturating hyperbolic tangent, identity, binary step, logistic, arcTan, softsign, parametric rectified linear unit, exponential linear unit, softPlus, bent identity, softExponential, Sinusoid, Sine, Gaussian, or sigmoid function, or any combination thereof.

The weighting factors, bias values, and threshold values, or other computational parameters of the neural network, may be "taught" or "learned" in a training phase using one or more sets of training data. For example, the parameters may be trained using the input data from a training data set and a gradient descent or backward propagation method so that the output value(s) that the ANN computes are consistent with the examples included in the training data set. The parameters may be obtained from a back propagation neural network training process.

Any of a variety of neural networks may be suitable for use in analyzing an image of a subject. Examples can include, but are not limited to, feedforward neural networks, radial basis function networks, recurrent neural networks, residual neural networks, convolutional neural networks, residual convolutional neural networks, and the like, or any combination thereof. In some embodiments, the machine learning makes use of a pre-trained and/or transfer-learned ANN or deep learning architecture. Convolutional and/or residual neural networks can be used for analyzing an image of a subject in accordance with the present disclosure.

For instance, a deep neural network classifier comprises an input layer, a plurality of individually parameterized (e.g., weighted) convolutional layers, and an output scorer. The parameters (e.g., weights) of each of the convolutional layers as well as the input layer contribute to the plurality of parameters (e.g., weights) associated with the deep neural network classifier. In some embodiments, at least 100 parameters, at least 1000 parameters, at least 2000 parameters or at least 5000 parameters are associated with the deep neural network classifier. As such, deep neural network classifiers require a computer to be used because they cannot be mentally solved. In other words, given an input to the classifier, the classifier output needs to be determined using a computer rather than mentally in such embodiments. See, for example, Krizhevsky et al., 2012, "Imagenet classification with deep convolutional neural networks," in *Advances in Neural Information Processing Systems* 2, Pereira, Burges, Bottou, Weinberger, eds., pp. 1097-1105, Curran Associates, Inc.; Zeiler, 2012 "ADADELTA: an adaptive learning rate method," CoRR, vol. abs/1212.5701; and Rumelhart et al., 1988, "Neurocomputing: Foundations of research," ch. Learning Representations by Back-propagating Errors, pp. 696-699, Cambridge, MA, USA: MIT Press, each of which is hereby incorporated by reference.

Neural network algorithms, including convolutional neural network algorithms, suitable for use as classifiers are disclosed in, for example, Vincent et al., 2010, "Stacked denoising autoencoders: Learning useful representations in a deep network with a local denoising criterion," J Mach Learn Res 11, pp. 3371-3408; Larochelle et al., 2009, "Exploring strategies for training deep neural networks," J Mach Learn Res 10, pp. 1-40; and Hassoun, 1995, Fundamentals of Artificial Neural Networks, Massachusetts Institute of Technology, each of which is hereby incorporated by reference. Additional example neural networks suitable for use as classifiers are disclosed in Duda et al., 2001, *Pattern Classification*, Second Edition, John Wiley & Sons, Inc., New York; and Hastie et al., 2001, *The Elements of Statistical Learning*, Springer-Verlag, New York, each of which is hereby incorporated by reference in its entirety. Additional example neural networks suitable for use as classifiers are also described in Draghici, 2003, *Data Analysis Tools for DNA Microarrays*, Chapman & Hall/CRC; and Mount, 2001, *Bioinformatics: sequence and genome analysis*, Cold Spring Harbor Laboratory Press, Cold Spring Harbor, New York, each of which is hereby incorporated by reference in its entirety.

Support vector machines. In some embodiments, the classifier is a support vector machine (SVM). SVM algorithms suitable for use as classifiers are described in, for example, Cristianini and Shawe-Taylor, 2000, "An Introduction to Support Vector Machines," Cambridge University Press, Cambridge; Boser et al., 1992, "A training algorithm for optimal margin classifiers," in Proceedings of the 5th Annual ACM Workshop on Computational Learning Theory, ACM Press, Pittsburgh, Pa., pp. 142-152; Vapnik, 1998, Statistical Learning Theory, Wiley, New York; Mount, 2001, Bioinformatics: sequence and genome analysis, Cold Spring Harbor Laboratory Press, Cold Spring Harbor, N.Y.; Duda, Pattern Classification, Second Edition, 2001, John Wiley & Sons, Inc., pp. 259, 262-265; and Hastie, 2001, The Elements of Statistical Learning, Springer, New York; and Furey et al., 2000, Bioinformatics 16, 906-914, each of which is hereby incorporated by reference in its entirety. When used for classification, SVMs separate a given set of binary labeled data with a hyper-plane that is maximally distant from the labeled data. For cases in which no linear separation is possible, SVMs can work in combination with the technique of 'kernels', which automatically realizes a non-linear mapping to a feature space. The hyper-plane found by the SVM in feature space can correspond to a non-linear decision boundary in the input space. In some embodiments, the plurality of parameters (e.g., weights) associated with the SVM define the hyper-plane. In some embodiments, the hyper-plane is defined by at least 10, at least 20, at least 50, or at least 100 parameters and the SVM classifier requires a computer to calculate because it cannot be mentally solved.

Naïve Bayes algorithms. In some embodiments, the classifier is a Naive Bayes algorithm. Naïve Bayes classifiers suitable for use as classifiers are disclosed, for example, in Ng et al., 2002, "On discriminative vs. generative classifiers: A comparison of logistic regression and naive Bayes," Advances in Neural Information Processing Systems, 14, which is hereby incorporated by reference. A Naive Bayes classifier is any classifier in a family of "probabilistic classifiers" based on applying Bayes' theorem with strong (naïve) independence assumptions between the features. In some embodiments, they are coupled with Kernel density estimation. See, for example, Hastie et al., 2001, *The elements of statistical learning: data mining, inference, and prediction*, eds. Tibshirani and Friedman, Springer, New York, which is hereby incorporated by reference.

Nearest neighbor algorithms. In some embodiments, a classifier is a nearest neighbor algorithm. Nearest neighbor classifiers can be memory-based and include no classifier to be fit. For nearest neighbors, given a query point $x_0$ (a test subject), the k training points $x_{(r)}$, r, . . . , k (here the training subjects) closest in distance to $x_0$ are identified and then the point $x_0$ is classified using the k nearest neighbors. Here, the distance to these neighbors is a function of the abundance values of the discriminating gene set. In some embodiments, Euclidean distance in feature space is used to determine distance as $d_{(i)}=\|x_{(i)}-x_{(o)}\|$. Typically, when the nearest neighbor algorithm is used, the abundance data used to compute the linear discriminant is standardized to have mean zero and variance 1. The nearest neighbor rule can be refined to address issues of unequal class priors, differential misclassification costs, and feature selection. Many of these refinements involve some form of weighted voting for the neighbors. For more information on nearest neighbor analysis, see Duda, *Pattern Classification*, Second Edition, 2001, John Wiley & Sons, Inc; and Hastie, 2001, The Elements of Statistical Learning, Springer, N.Y., each of which is hereby incorporated by reference.

A k-nearest neighbor classifier is a non-parametric machine learning method in which the input consists of the k closest training examples in feature space. The output is a class membership. An object is classified by a plurality vote of its neighbors, with the object being assigned to the class most common among its k nearest neighbors (k is a positive integer, typically small). If k=1, then the object is simply assigned to the class of that single nearest neighbor. See, Duda et al., 2001, *Pattern Classification*, Second Edition, John Wiley & Sons, which is hereby incorporated by reference. In some embodiments, the number of distance calculations needed to solve the k-nearest neighbor classifier is such that a computer is used to solve the classifier for a given input because it cannot be mentally performed.

Random forest, decision tree, and boosted tree algorithms. In some embodiments, the classifier is a decision tree. Decision trees suitable for use as classifiers are described generally by Duda, 2001, Pattern Classification, John Wiley & Sons, Inc., New York, pp. 395-396, which is hereby incorporated by reference. Tree-based methods partition the feature space into a set of rectangles, and then fit a model (like a constant) in each one. In some embodiments, the decision tree is random forest regression. One specific algorithm that can be used is a classification and regression tree (CART). Other specific decision tree algorithms include, but are not limited to, ID3, C4.5, MART, and Random Forests. CART, ID3, and C4.5 are described in Duda, 2001, Pattern Classification, John Wiley & Sons, Inc., New York, pp. 396-408 and pp. 411-412, which is hereby incorporated by reference. CART, MART, and C4.5 are described in Hastie et al., 2001, The Elements of Statistical Learning, Springer-Verlag, New York, Chapter 9, which is hereby incorporated by reference in its entirety. Random Forests are described in Breiman, 1999, "Random Forests-Random Features," Technical Report 567, Statistics Department, U.C. Berkeley, September 1999, which is hereby incorporated by reference in its entirety. In some embodiments, the decision tree classifier includes at least 10, at least 20, at least 50, or at least 100 parameters (e.g., weights and/or decisions) and requires a computer to calculate because it cannot be mentally solved.

Regression. In some embodiments, the classifier uses a regression algorithm. A regression algorithm can be any type of regression. For example, in some embodiments, the regression algorithm is logistic regression. In some embodiments, the regression algorithm is logistic regression with lasso, L2 or elastic net regularization. In some embodiments, those extracted features that have a corresponding regression coefficient that fails to satisfy a threshold value are pruned (removed from) consideration. In some embodiments, a generalization of the logistic regression model that handles multicategory responses is used as the classifier. Logistic regression algorithms are disclosed in Agresti, An Introduction to Categorical Data Analysis, 1996, Chapter 5, pp. 103-144, John Wiley & Son, New York, which is hereby incorporated by reference. In some embodiments, the classifier makes use of a regression model disclosed in Hastie et al., 2001, The Elements of Statistical Learning, Springer-Verlag, New York. In some embodiments, the logistic regression classifier includes at least 10, at least 20, at least 50, at least 100, or at least 1000 parameters (e.g., weights) and requires a computer to calculate because it cannot be mentally solved.

Linear discriminant analysis algorithms. Linear discriminant analysis (LDA), normal discriminant analysis (NDA), or discriminant function analysis can be a generalization of Fisher's linear discriminant, a method used in statistics, pattern recognition, and machine learning to find a linear combination of features that characterizes or separates two or more classes of objects or events. The resulting combination can be used as the classifier (linear classifier) in some embodiments of the present disclosure.

Mixture model and Hidden Markov model. In some embodiments, the classifier is a mixture model, such as that described in McLachlan et al., Bioinformatics 18(3):413-422, 2002. In some embodiments, in particular, those embodiments including a temporal component, the classifier is a hidden Markov model such as described by Schliep et al., 2003, Bioinformatics 19(1):i255-i263.

Clustering. In some embodiments, the classifier is an unsupervised clustering model. In some embodiments, the classifier is a supervised clustering model. Clustering algorithms suitable for use as classifiers are described, for example, at pages 211-256 of Duda and Hart, Pattern Classification and Scene Analysis, 1973, John Wiley & Sons, Inc., New York, (hereinafter "Duda 1973") which is hereby incorporated by reference in its entirety. The clustering problem can be described as one of finding natural groupings in a dataset. To identify natural groupings, two issues can be addressed. First, a way to measure similarity (or dissimilarity) between two samples can be determined. This metric (e.g., similarity measure) can be used to ensure that the samples in one cluster are more like one another than they are to samples in other clusters. Second, a mechanism for partitioning the data into clusters using the similarity measure can be determined. One way to begin a clustering investigation can be to define a distance function and to compute the matrix of distances between all pairs of samples in the training set. If distance is a good measure of similarity, then the distance between reference entities in the same cluster can be significantly less than the distance between the reference entities in different clusters. However, clustering may not use of a distance metric. For example, a nonmetric similarity function $s(x, x')$ can be used to compare two vectors x and x'. $s(x, x')$ can be a symmetric function whose value is large when x and x' are somehow "similar." Once a method for measuring "similarity" or "dissimilarity" between points in a dataset has been selected, clustering can use a criterion function that measures the clustering quality of any partition of the data. Partitions of the data set that extremize the criterion function can be used to cluster the data. Particular exemplary clustering techniques that can be used in the present disclosure can include, but are not limited to, hierarchical clustering (agglomerative clustering using a nearest-neighbor algorithm, farthest-neighbor algorithm, the average linkage algorithm, the centroid algorithm, or the sum-of-squares algorithm), k-means clustering, fuzzy k-means clustering algorithm, and Jarvis-Patrick clustering. In some embodiments, the clustering comprises unsupervised clustering (e.g., with no preconceived number of clusters and/or no predetermination of cluster assignments).

Ensembles of classifiers and boosting. In some embodiments, an ensemble (two or more) of classifiers is used. In some embodiments, a boosting technique such as AdaBoost is used in conjunction with many other types of learning algorithms to improve the performance of the classifier. In this approach, the output of any of the classifiers disclosed herein, or their equivalents, is combined into a weighted sum that represents the final output of the boosted classifier. In some embodiments, the plurality of outputs from the classifiers is combined using any measure of central tendency known in the art, including but not limited to a mean, median, mode, a weighted mean, weighted median, weighted mode, etc. In some embodiments, the plurality of outputs is combined using a voting method. In some embodiments, a respective classifier in the ensemble of classifiers is weighted or unweighted.

The term "classification" can refer to any number(s) or other characters(s) that are associated with a particular property of a sample. For example, a "+" symbol (or the word "positive") can signify that a sample is classified as having deletions or amplifications. In another example, the term "classification" refers to an amount of tumor tissue in the subject and/or sample, a size of the tumor in the subject and/or sample, a stage of the tumor in the subject, a tumor load in the subject and/or sample, and presence of tumor metastasis in the subject. In some embodiments, the term "classification" refers to a contamination state of a biological sample. In some embodiments, the classification is binary (e.g., positive or negative) or has more levels of classification (e.g., a scale from 1 to 10 or 0 to 1). In some embodiments, the terms "cutoff" and "threshold" refer to predetermined numbers used in an operation. In one example, a cutoff size refers to a size above which fragments are excluded. In some embodiments, a threshold value is a value above or below which a particular classification applies. Either of these terms can be used in either of these contexts.

As used herein, the term "parameter" refers to any coefficient or, similarly, any value of an internal or external element (e.g., a weight and/or hyperparameter) in a model, classifier, or algorithm that modulates one or more inputs, outputs, and/or functions in the model, classifier, or algorithm, such as the behavior, learning and/or performance of a model.

For instance, a parameter can be used to upweight or down-weight the influence of an input to a model, such as a feature. In some embodiments, features can be associated with parameters, such as in a logistic regression, SVM, or naïve Bayes model. Parameters can, alternately or additionally, be used to upweight or down-weight the influence of a node in a neural network (e.g., where the node comprises one or more activation functions that define the transformation of an input to an output), a class, or an instance (e.g., of a subject). Assignment of parameters to specific inputs, outputs, functions, or features is not limited to any one paradigm for a given model but can be used in any suitable model architecture for optimal performance. Nevertheless, reference to the parameters associated with the inputs, outputs, functions, or features of a model can similarly be used as an indicator of the number, performance, or optimization of the same, such as in the context of the computational complexity of machine learning algorithms. In some embodiments, a feature applied as an input to a model is associated with a plurality of parameters. For example, as described below, in some embodiments, a parameter refers to a channel, where a respective image is associated with a plurality of channels, and each pixel in a plurality of pixels in the respective image has, for each channel in the plurality of channels, a corresponding value.

In some embodiments, a parameter has a fixed value. In some embodiments, a value of a parameter is manually and/or automatically adjustable. In some embodiments, a value of a parameter is modified by a classifier validation, a hyperparameter optimization process variable (e.g., a hyperparameter sweep), and/or a training process variable (e.g., by error minimization and/or backpropagation methods, as described elsewhere herein).

Several aspects are described below with reference to example applications for illustration. Numerous specific details, relationships, and methods are set forth to provide a full understanding of the features described herein. The features described herein can be practiced without one or more of the specific details or with other methods. The features described herein are not limited by the illustrated ordering of acts or events, as some acts can occur in different orders and/or concurrently with other acts or events. Furthermore, not all illustrated acts or events are used to implement a methodology in accordance with the features described herein.

Exemplary System Embodiments

Details of an exemplary system are now described in conjunction with FIG. 1. FIG. 1 is a block diagram illustrating system 100 in accordance with some implementations. System 100 in some implementations includes one or more processing units CPU(s) 102 (also referred to as processors or processing core), one or more network interfaces 104, user interface 106, display 108, input 110, non-persistent memory 111, persistent memory 112, and one or more communication buses 114 for interconnecting these components. One or more communication buses 114 optionally include circuitry (sometimes called a chipset) that interconnects and controls communications between system components. Non-persistent memory 111 typically includes high-speed random access memory, such as DRAM, SRAM, DDR RAM, ROM, EEPROM, flash memory, whereas persistent memory 112 typically includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid-state storage devices. Persistent memory 112 optionally includes one or more storage devices remotely located from the CPU(s) 102. Persistent memory 112, and the non-volatile memory device(s) within non-persistent memory 112, comprise non-transitory computer-readable storage medium. In some implementations, non-persistent memory 111 or alternatively non-transitory computer-readable storage medium stores the following programs, modules and data structures, or a subset thereof, sometimes in conjunction with persistent memory 112:

instructions, programs, data, or information associated with an optional operating system 116, which includes procedures for handling various basic system services and for performing hardware dependent tasks;

instructions, programs, data, or information associated with an optional network communication module 118 for connecting the system 100 with other devices, or a communication network;

instructions, programs, data, or information associated with a training dataset 120 that includes, for each respective training object in a plurality of training objects:

a corresponding image of an eye 122 (e.g., 122-1, . . . 122-Y) including a corresponding plurality of pixels 124 (e.g., 124-1-1, . . . 124-1-M) and one or more pixel values 126 (e.g., 126-1-1, . . . 126-1-M) for each pixel in the corresponding plurality of pixels, and a corresponding measured set of coordinates that localize an eyelid (e.g., an upper eyelid and/or a lower eyelid) in the corresponding image 128 (e.g., 128-1);

instructions, programs, data, or information associated with a model training module 130 that trains an untrained or partially trained neural network, where the untrained or partially trained neural network includes a plurality (e.g., at least 10,000) of parameters 132 (e.g., 132-1, . . . 132-N), and, responsive to receiving the corresponding image for each corresponding training object, provides as output a corresponding calculated set of coordinates 134 (e.g., 134-1, . . . 134-Y) that localize an eyelid (e.g., an upper eyelid and/or a lower eyelid) in the corresponding image, such that at least the difference between the corresponding calculated set of coordinates and the corresponding measured set of coordinates is used to update all or a subset of the plurality of parameters; and a classification module 136 that comprises a trained neural network for localizing an eyelid in an image.

In some implementations, one or more of the above-identified elements are stored in one or more of the previously mentioned memory devices and correspond to a set of instructions for performing a function described above. The above-identified modules, data, or programs (e.g., sets of instructions) may not be implemented as separate software programs, procedures, datasets, or modules, and thus various subsets of these modules and data may be combined or otherwise re-arranged in various implementations. In some implementations, the non-persistent memory 111 optionally stores a subset of the modules and data structures identified above. Furthermore, in some embodiments, the memory stores additional modules and data structures not described above. In some embodiments, one or more of the above-identified elements is stored in a computer system, other than that of visualization system 100, that is addressable by visualization system 100 so that visualization system 100 may retrieve all or a portion of such data.

Although FIG. 1 depicts a "system 100," the figure is intended more as functional description of the various features which may be present in computer systems than as a structural schematic of the implementations described herein. In practice, items shown separately could be combined and some items can be separated. Moreover, although FIG. 1 depicts certain data and modules in non-persistent memory 111, some or all of these data and modules may be in persistent memory 112.

While a system in accordance with the present disclosure has been disclosed with reference to FIG. 1, methods in accordance with the present disclosure are now detailed with reference to FIGS. 2A-B. Any of the disclosed methods can make use of any of the devices, systems or methods disclosed in U.S. patent application Ser. No. 14/787,564, filed May 1, 2014, and/or International Patent Application No. PCT/US2018/032666, having an International Filing Date of May 15, 2018, each of which is hereby incorporated by reference, in order to localize an eyelid in an image. For instance, any of the disclosed methods can work in conjunction with any of the disclosed methods or algorithms disclosed in U.S. patent application Ser. No. 14/787,564, filed May 1, 2014, and/or International Patent Application No. PCT/US2018/032666, having an International Filing Date of May 15, 2018.

Embodiments for Training a Neural Network to Localize an Eyelid in an Image.

Figure 2A:
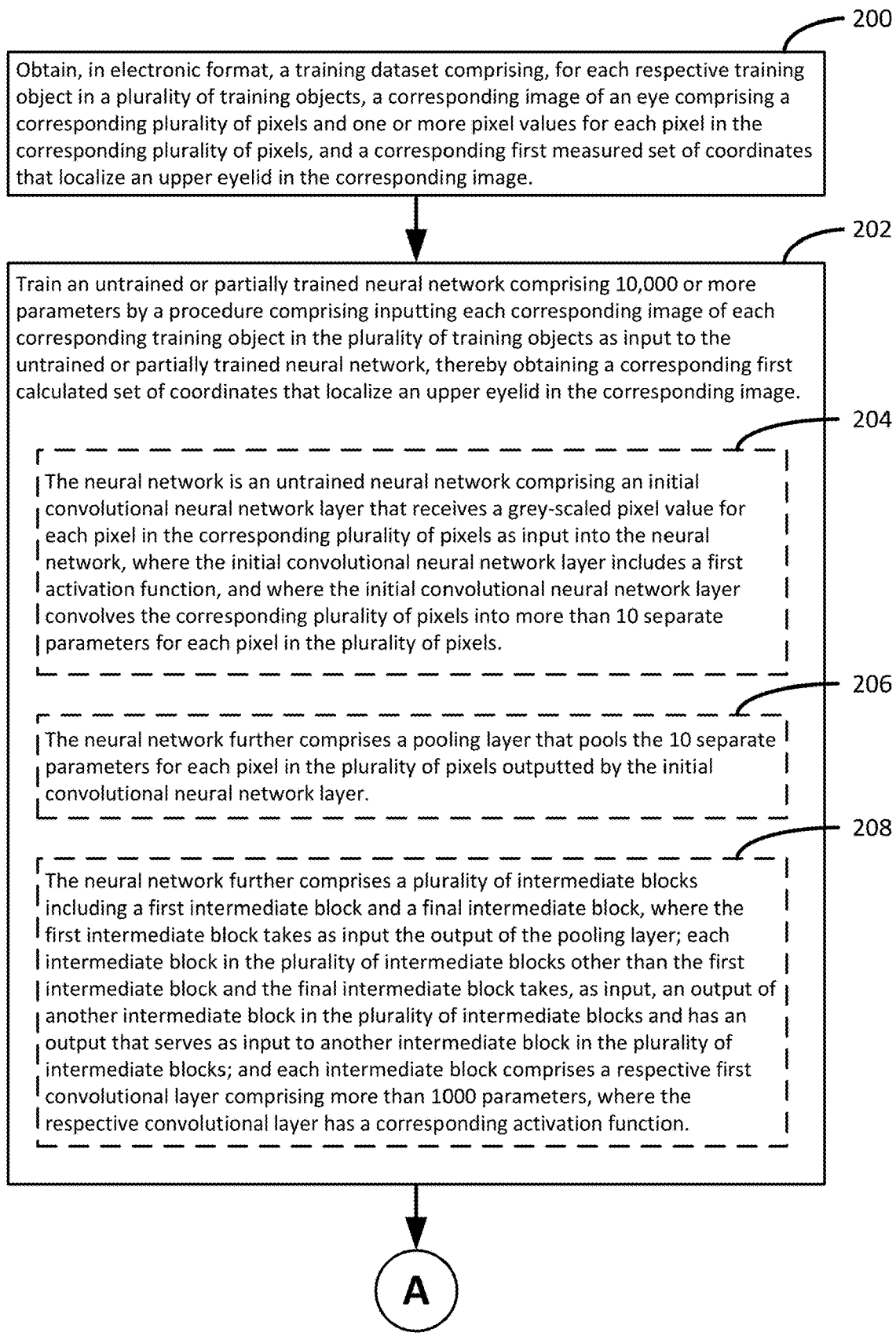
FIGS. 2A and 2B collectively illustrate an example flowchart of a method of training a CNN to localize an upper eyelid in an image, in which dashed boxes represent optional steps, in accordance with some embodiments of the present disclosure.
Figure 2B:
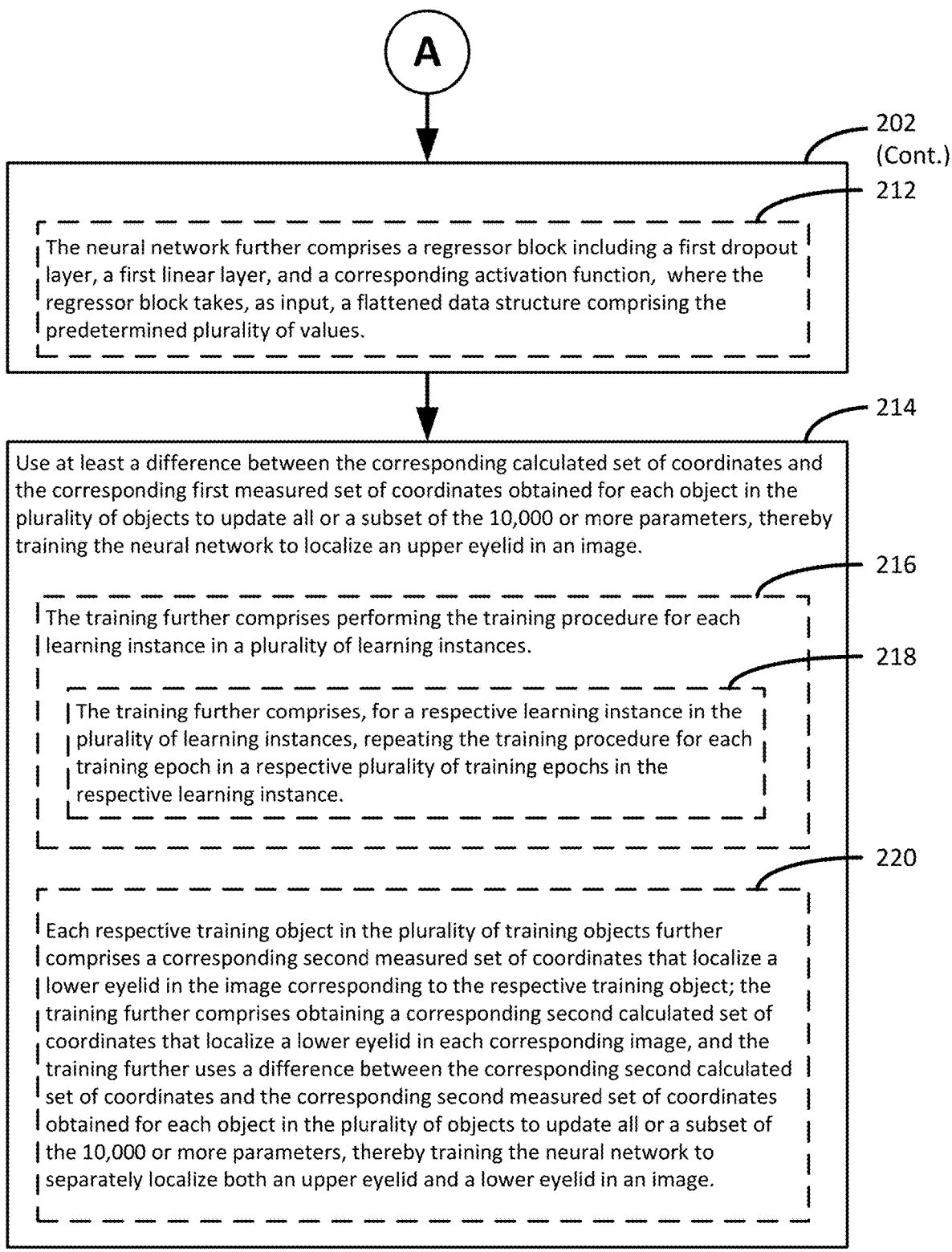
Figure 3:
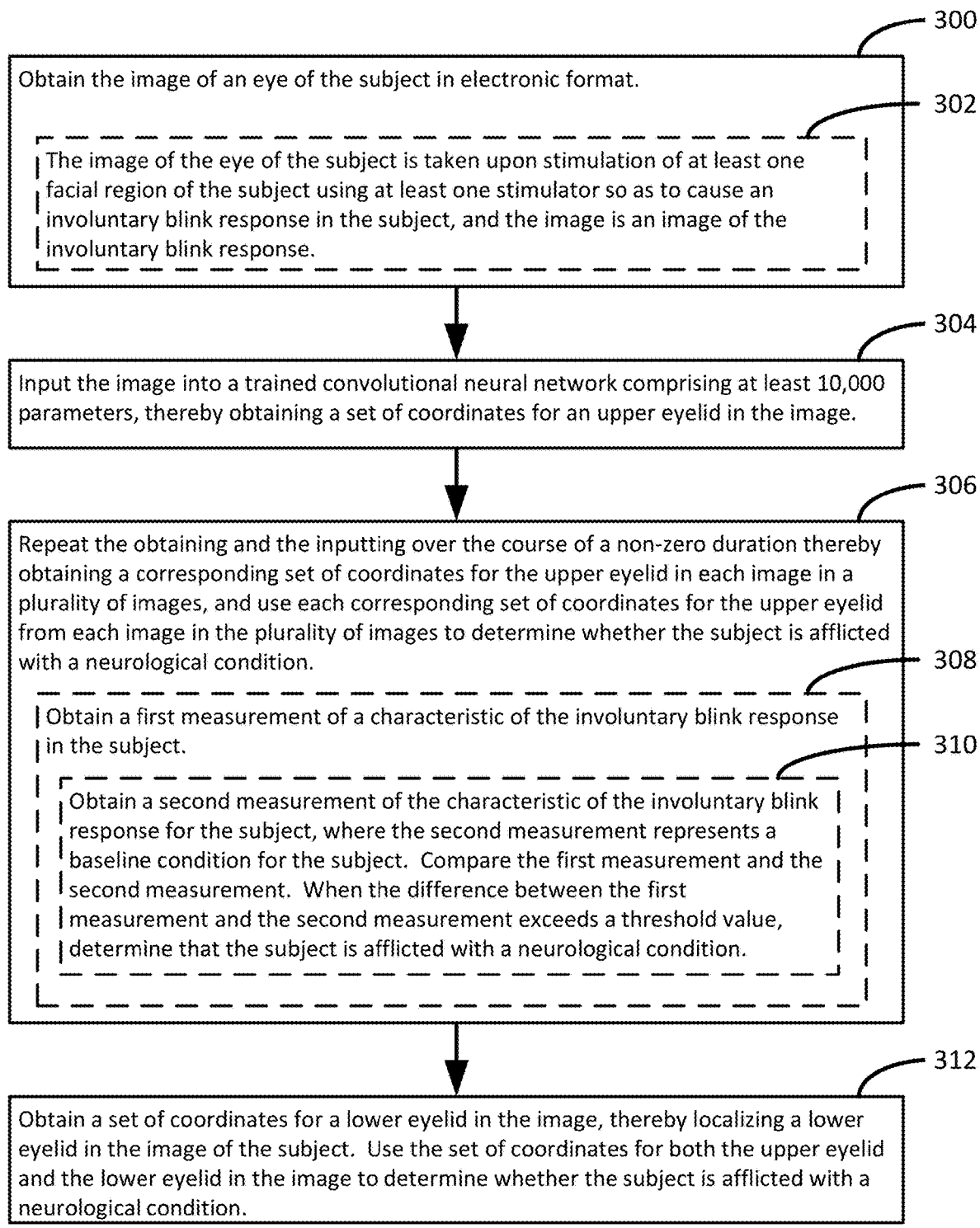
FIG. 3 illustrates an example flowchart of a method of using a trained CNN to localize an upper eyelid in an image, in which dashed boxes represent optional steps, in accordance with some embodiments of the present disclosure.

FIGS. 2A-B and 3 collectively illustrate an overview of the techniques in accordance with some embodiments of the present disclosure. In the described embodiments, various methods of training and using a neural network (e.g., a residual and/or convolutional neural network) for localizing an eyelid in an image (e.g., in an image such as those provided in FIGS. 5A-C and 6) are described.

Referring to FIGS. 2A-B, the method provides for training a neural network (e.g., a residual and/or a convolutional neural network) to localize an upper eyelid in an image.

Images.

Referring to Block 200, the method includes obtaining, in electronic format, a training dataset comprising, for each respective training object in a plurality of training objects, a corresponding image of an eye comprising a corresponding plurality of pixels and one or more pixel values for each pixel in the corresponding plurality of pixels.

In some embodiments, the plurality of training objects comprises at least 20, at least 40, at least 60, at least 80, at least 100, at least 150, at least 200, at least 250, at least 300, at least 350, at least 400, at least 450, at least 500, at least 600, at least 700, at least 800, at least 900, at least 1000, at least 2000, at least 3000, at least 4000, at least 5000, at least 6000, at least 7000, at least 8000, at least 9000, at least 10,000, at least 20,000, at least 50,000, at least 100,000, at least 200,000, at least 500,000, or at least 1 million training objects. In some embodiments, the plurality of training objects comprises no more than 2 million, no more than 500,000, no more than 100,000, no more than 50,000, no more than 20,000, no more than 10,000, no more than 5000, no more than 2000, no more than 1000, or no more than 500 training objects. In some embodiments, the plurality of training objects comprises from 2 to 100,000, from 100 to 500,000, from 10 to 5000, from 10,000 to 50,000, from 100,000 to 1 million, or from 1 million to 2 million training objects. In some embodiments, the plurality of training objects comprises a different range starting no lower than 20 training objects and ending no higher than 2 million training objects.

In some embodiments, each respective image in the training dataset corresponds to a respective subject (e.g., a training subject in a plurality of training subjects). In some embodiments, a respective plurality of images in the training dataset corresponds to a respective subject (e.g., a training subject in a plurality of training subjects). For instance, in some embodiments, the training dataset includes a plurality of subjects and each respective subject is associated with a respective one or more images in the training dataset. As another example, in some embodiments, the training dataset includes, for a respective subject, a respective series of sequential images.

In some embodiments, the training dataset comprises a respective series of sequential images for a respective subject, where the series of images is obtained from the subject over the course of a non-zero duration, such as during a period of image capture (e.g., frames of a video and/or images taken during high-speed image capture).

In some embodiments, each respective image in a series of sequential images corresponds to a partition of time during the non-zero duration (e.g., frames of a video taken at a respective frame rate).

For example, in some embodiments, each respective image in the series of sequential images is captured at a rate of no more than 200 milliseconds (ms)/image, no more than 100 ms/image, no more than 90 ms/image, no more than 80 ms/image, no more than 70 ms/image, no more than 60 ms/image, no more than 50 ms/image, no more than 40 ms/image, no more than 30 ms/image, no 4 ms/image, no more than 3 ms/image, no more than 2 ms/image, no more than 1 ms/image, no more than 0.5 ms/image, no more than 0.1 ms/image. In some embodiments, each respective image in the series of sequential images is captured at a rate of from 0.1 to 50 ms/image, from 1 to 30 ms/image, from 0.5 to 100 ms/image, or from 1 to 10 ms/image. In some embodiments, each respective image in the series of sequential images is captured at a rate that falls within another range starting no lower than 0.1 ms/image and ending no higher than 200 ms/image.

In some embodiments, the training dataset includes a respective plurality of images obtained from a subject while blinking. Thus, for example, the training dataset can include a plurality of images obtained by recording one or more subjects during a blink (e.g., a blink reflex), where the recording occurs at a given frame rate (e.g., 3 ms/image). In some instances, the recording is high-speed image capture.

In some embodiments, a respective image in the training dataset is obtained from a subject during a blink. In some embodiments, the blink is voluntary or involuntary. In some embodiments, a respective image in the training dataset is obtained upon stimulation of at least one facial region of the subject using at least one stimulator so as to cause an involuntary blink response in the subject. In some embodiments, the at least one facial region is selected from the group consisting of the temple, the outer canthus, and the eye. In some embodiments, the stimulation of the at least one facial region is provided in proximity of the left eye, the right eye, or both. In some embodiments, a respective image in the training dataset is taken for the left eye, the right eye, or both.

In some implementations, the stimulation of the at least one facial region is selected from the group consisting of a puff of fluid (e.g., the fluid corresponding to a gas, a liquid, or a vapor), a mechanical contact (e.g., a pin prick), one or more flashes of light, an electrical current (e.g., less than approximately 1 milliamp), and a sound (e.g., between 70 and 80 decibels). In some implementations, the stimulation is a verbal or visual command. For example, in some embodiments, the stimulation is a verbal command (e.g., "blink") administered to the subject. In some embodiments, the stimulation is a visual command (e.g., a screen that displays the word "blink") that is presented to the subject.

Methods for obtaining images and stimulating blink reflexes are disclosed in further detail in U.S. patent application Ser. No. 14/787,564, filed May 1, 2014, and International Patent Application No. PCT/US2018/032666, having an International Filing Date of May 15, 2018, each of which is hereby incorporated herein by reference in its entirety for all purposes. In addition, characteristics of blink responses are described in detail, for example, in Garner et al., 2018, "Blink reflex parameters in baseline, active, and head-impact Division I athletes," Cogent Engineering, 5:1429110; doi: 10.1080/23311916.2018.1429110, which is hereby incorporated herein by reference in its entirety.

In some embodiments, a respective image in the training dataset is obtained from a subject that is afflicted with a neurological condition. In some embodiments, the neurological condition is a result of a traumatic event, a head impact, or a mild traumatic brain injury. Non-limiting examples of neurological conditions include Alzheimer's disease, Parkinson's disease, dementia, Huntington's disease, schizophrenia, migraines, stroke, and/or epilepsy. In some embodiments, a respective image in the training dataset is obtained from a subject exhibiting a healthy and/or normal activity. For instance, in some embodiments, a respective image in the training dataset is obtained from a subject prior to onset of a suspected neurological condition and/or from a healthy control subject.

Figure 5A:
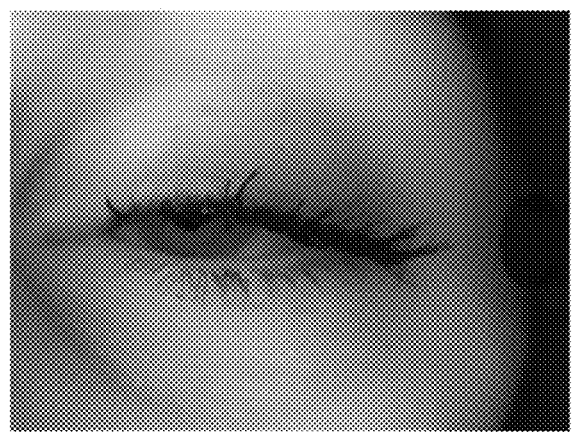
FIGS. 5A, 5B, and 5C illustrate example images used as input to a neural network, in accordance with some embodiments of the present disclosure.
Figure 5B:
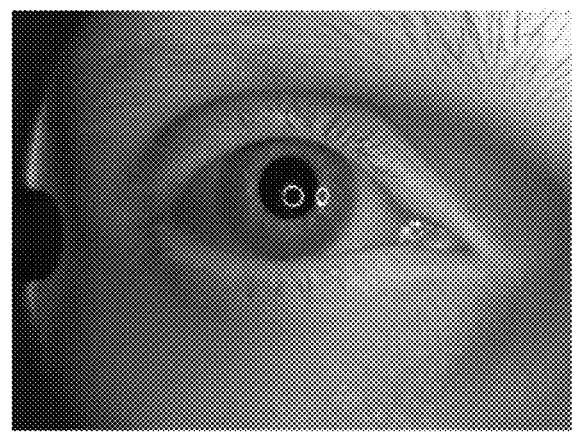
Figure 5C:

FIGS. 5A-C and 6 illustrate images of eyes of various subjects that can be used in the training dataset, in accordance with some embodiments of the present disclosure. For instance, FIGS. 5A-C illustrate images captured at various positions (e.g., as can occur during a blink), including open (FIG. 5B), closed (FIG. 5C), and partial open (FIG. 5A).

In some embodiments, obtaining images (e.g., obtaining the training dataset) includes any methods and embodiments disclosed herein, such as those described in further detail below in the section entitled "Using a trained neural network to localize an eyelid," and any substitutions, modifications, additions, deletions, and/or combinations thereof, as will be apparent to one skilled in the art. For instance, in some embodiments, a respective image used for training a neural network includes any of the embodiments of a respective image used as input for using a trained neural network disclosed herein. Moreover, in some embodiments, a respective image used as input for using a trained neural network includes any of the embodiments of a respective image used for training a neural network disclosed herein.

In some embodiments, the training dataset includes multiple images for a single subject. In some embodiments, the training dataset includes multiple batches of images (e.g., scans, videos, and/or series of images using high-speed image capture) for a single subject. In some embodiments, the multiple images and/or multiple batches of images for the single subject are obtained at a corresponding plurality of time points. In some embodiments, the training dataset comprises, for a respective subject, a plurality of images obtained at 2 or more, 3 or more, 4 or more, 5 or more, 6 or more, 7 or more, 8 or more, 9 or more, or 10 or more different acquisition time points.

In some embodiments, the training dataset comprises a plurality of batches, where each respective batch includes a subset of the plurality of images from the training dataset. Batches are further described below in the section entitled, "Parameters."

In some embodiments, an image is any form of two-dimensional RGB or grey-scaled pixelated image.

In some embodiments, an image comprises a size denoted by n×m, where n and m refer to an edge length, in pixels.

In some embodiments, an edge length, in pixels, of an image in the training dataset consists of between 164 pixels and 1024 pixels. In some embodiments, an edge length, in pixels, of each image in the training dataset consists of between 164 pixels and 1024 pixels.

In some embodiments, an edge length of an image in the training dataset is at least 50, at least 100, at least 150, at least 200, at least 250, at least 300, at least 400, at least 500, at least 600, at least 700, at least 800, at least 900, at least 1000, at least 1100, at least 1200, at least 1300, at least 1400, at least 1500, at least 1600, at least 1700, at least 1800, at least 1900, or at least 2000 pixels. In some embodiments, an edge length of an image in the training dataset is no more than 2500, no more than 2000, no more than 1600, no more than 1000, no more than 800, no more than 600, no more than 400, no more than 300, or no more than 200 pixels. In some embodiments, an edge length of an image in the training dataset is from 50 to 800, from 200 to 600, from 300 to 900, from 500 to 1800, or from 50 to 2500 pixels. In some embodiments, an edge length of an image in the training dataset falls within another range starting no lower than 50 pixels and ending no higher than 2500 pixels.

In some embodiments, n and m are the same value. In some embodiments, n and m are different values.

Generally, the plurality of pixels corresponding to a respective image of an eye refers to the image resolution (e.g., the number of pixels in an image). In some instances, the image resolution can be determined by the dimensions of the image (e.g., n×m).

Thus, in some embodiments, the plurality of pixels corresponding to a respective image of an eye in the training dataset comprises at least 2000, at least 5000, at least 10,000, at least 20,000, at least 30,000, at least 40,000, at least 50,000, at least 100,000, at least 250,000, at least 500,000, at least 1 million, at least 1.5 million, at least 2 million, at least 3 million, or at least 5 million pixels. In some embodiments, the plurality of pixels corresponding to a respective image of an eye in the training dataset comprises no more than 10 million, no more than 5 million, no more than 1 million, no more than 500,000, no more than 100,000, no more than 50,000, or no more than 10,000 pixels. In some embodiments, the plurality of pixels corresponding to a respective image of an eye in the training dataset comprises from 5000 to 50,000, from 10,000 to 500,000, from 50,000 to 1 million, or from 1 million to 3 million pixels. In some embodiments, the plurality of pixels falls within another range starting no lower than 2000 pixels and ending no higher than 10 million pixels. In some embodiments, the plurality of pixels comprises any number of pixels determined using the values for edge length, in pixels, of an image in the training dataset disclosed herein.

In some embodiments, one or more images in the training dataset are downscaled or upscaled (e.g., where the resolution is decreased or increased) in order to fit a target size. In some embodiments, each respective image in the training dataset is downscaled or upscaled in order to match a target size.

In some embodiments, the one or more pixel values for each pixel in the corresponding plurality of pixels are RGB values.

In some embodiments, the one or more pixel values for each pixel in the corresponding plurality of pixels are grey-scaled values (e.g., pixel intensity).

In some embodiments, the one or more pixel values for each pixel in the corresponding plurality of pixels are stored in a corresponding one or more channels (e.g., in a tensor). For instance, three channels can be used to store RGB values for each pixel in the plurality of pixels, whereas one channel can be used to store a grey-scaled pixel value for each pixel in the plurality of pixels.

In some embodiments, each pixel value in the one or more pixel values is from 0 to 255.

In some embodiments, a respective image in the training dataset comprises an annotation associated with the respective image, where the annotation includes any category, characteristic, or identifying feature of the image, including but not limited to a tag, filename, subject identity, scan number, batch number, timestamp, frame number, demographic data (e.g., gender, age, clinical condition, neurological condition, cohort, etc.) of the subject, image metadata (e.g., image size, image resolution, type of preprocessing used, etc.), eyelid position (open, closed, partial open, etc.), and/or image input group (e.g., training, validation, test, etc.). Other embodiments for image annotations are described herein (see, for example, the section entitled "Embodiments for determining a class of an image," below).

Data Preprocessing and Keypoints.

In some embodiments, the method further comprises normalizing the one or more pixel values for each pixel in the corresponding plurality of pixels of each corresponding image of the plurality of training objects across the plurality of training objects.

In some embodiments, the normalizing normalizes a mean value of the pixel values of the corresponding plurality of pixels of each corresponding image of the plurality of training objects to a predetermined value. In some embodiments, the normalizing normalizes a standard deviation of the pixel values of the corresponding plurality of pixels of each corresponding image of the plurality of training objects to a predetermined standard deviation.

Generally, normalization of pixels in one or more images used for training the neural network increases training stability, due to the reduction of outliers in the data.

In some embodiments, the one or more pixel values for each corresponding image corresponding to a respective subject are normalized across a plurality of training objects corresponding to the respective subject. In some embodiments, the one or more pixel values for each corresponding image in a batch of images are normalized across the plurality of training objects in the batch. In some embodiments, the one or more pixel values for each corresponding image are normalized across the plurality of training objects in the training dataset.

In some embodiments, one or more pixel values for a corresponding image are not normalized. In some embodiments, the one or more pixel values for each corresponding image corresponding to a respective subject, a respective batch, or the training dataset are not normalized.

In some embodiments, the normalizing normalizes a mean value of the pixel values of the corresponding plurality of pixels of each corresponding image of a plurality of training objects (e.g., corresponding to a subject, a batch, and/or to the training dataset) to a predetermined value, where the predetermined value is a measure of central tendency (e.g., a mean, median, mode, etc.) determined for the respective plurality of training objects (e.g., corresponding to the subject, the batch, and/or to the training dataset). In some embodiments, the normalizing normalizes a standard deviation of the pixel values of the corresponding plurality of pixels of each corresponding image of the plurality of training objects (e.g., corresponding to a subject, a batch, and/or to the training dataset) to a predetermined value, where the predetermined value is a measure of dispersion (e.g., a standard deviation, standard error, confidence interval, etc.) determined for the respective plurality of training objects (e.g., corresponding to the subject, the batch, and/or to the training dataset).

In some embodiments, the predetermined value (e.g., for the mean and/or the standard deviation of the pixel values) is a value that is defined by a user or practitioner (e.g., an explicit statistic).

In some embodiments, predetermined value (e.g., for the mean and/or the standard deviation of the pixel values) is a predetermined statistic determined by a transfer-learned neural network (e.g., a pre-trained ResNet).

In some embodiments, a corresponding image of a respective training object in the plurality of training objects is further preprocessed. In some embodiments, each corresponding image for each respective training object in the plurality of training objects is further preprocessed. In some embodiments, the preprocessing comprises one or more of resizing, tensor conversion, normalization, and/or reordering channels (e.g., permutation).

Referring again to Block 200, each respective training object in the plurality of training objects in the training dataset further comprises a corresponding first measured set of coordinates that localize an upper eyelid in the corresponding image.

In some embodiments, an image corresponding to a respective training object in the plurality of training objects contains an upper eyelid and/or a lower eyelid. In some such embodiments, the respective training object further comprises a corresponding second measured set of coordinates that localize the lower eyelid in the corresponding image.

In some embodiments, a set of coordinates corresponding to an eyelid (e.g., an upper eyelid and/or a lower eyelid) indicates the center of the eyelid. In some embodiments, the set of coordinates indicates an edge of an eyelid (e.g., a bottom edge of an upper eyelid and/or an upper edge of a bottom eyelid). In some embodiments, the set of coordinates indicates the center of the edge of an eyelid. In some embodiments, a set of coordinates corresponding to an eyelid is measured from the top left of the eyelid (e.g., where the top left of the eyelid has the coordinates (0,0)).

Thus, for an upper eyelid and a lower eyelid of a corresponding image for a respective training object, the corresponding first measured set of coordinates and the corresponding second measured set of coordinates provides two sets of coordinates (e.g., (x1, y1) and (x2, y2)) that localize the upper eyelid and the lower eyelid, respectively.

Figure 6:
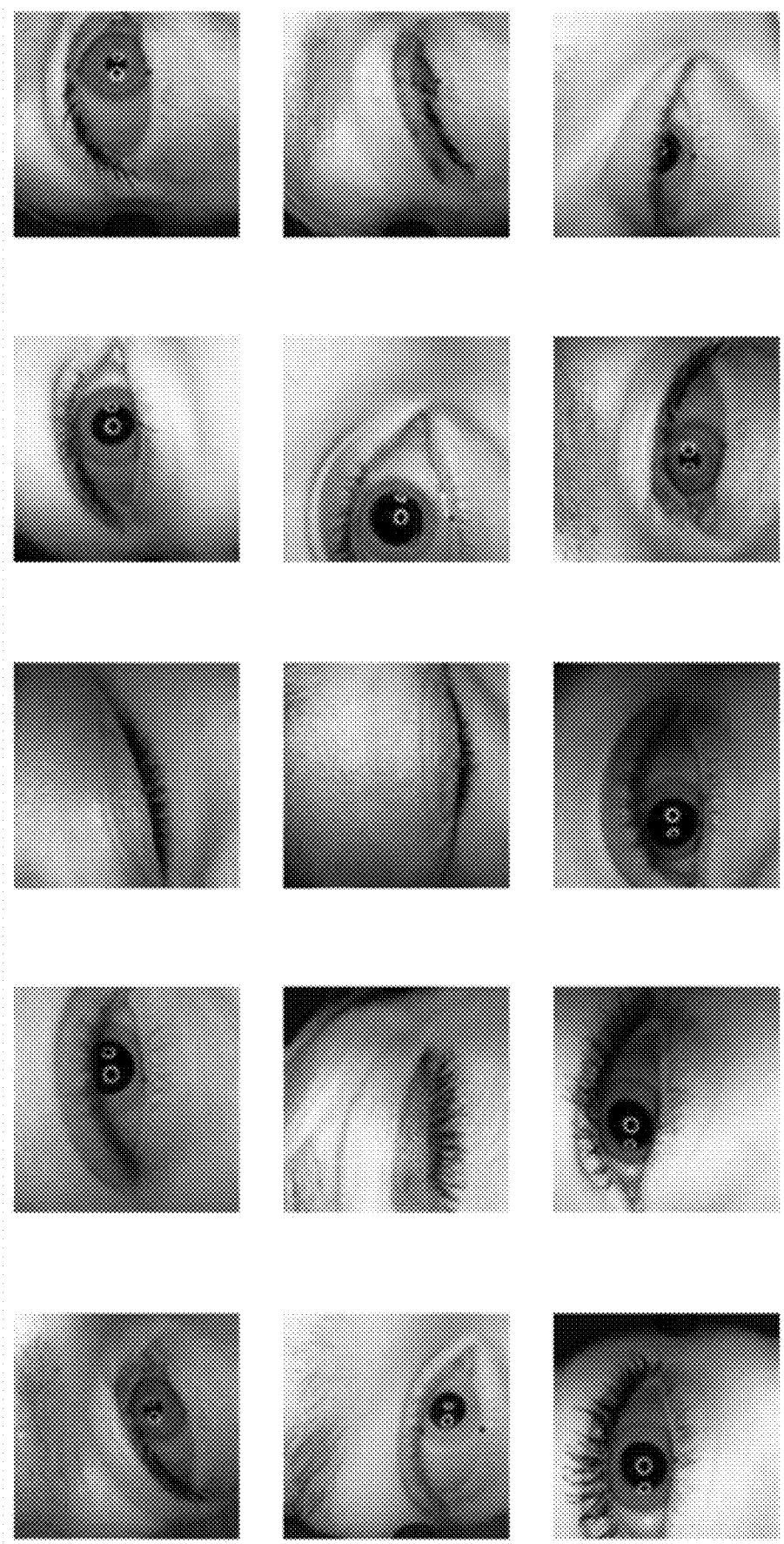
FIG. 6 collectively illustrates example images used as input to an untrained or partially trained neural network, where each image comprises a corresponding first measured set of coordinates that localize an upper eyelid and a corresponding second measured set of coordinates that localize a lower eyelid, in accordance with some embodiments of the present disclosure.

As an example, FIG. 6 illustrates various "keypoints" (e.g., first and second measured sets of coordinates), where highlighted points on each image indicate annotated centers of the upper and lower eyelids in each image. In some embodiments, annotation of the first and/or second measured sets of coordinates is performed manually. In some embodiments, annotation of the first and/or second measured sets of coordinates is automated.

In some embodiments, the measured set of coordinates for each respective training object in the plurality of training objects in the training dataset is provided as a list of values indicating the x and y coordinates for corresponding images, which can be read by a computing system and/or a non-transitory computer readable storage medium. In some embodiments, the corresponding images are further provided as image files, file names, and/or file paths that can be read by a computing system and/or a non-transitory computer readable storage medium.

Examples of image files and corresponding coordinates contemplated for use in the training dataset (e.g., used as input to a neural network) are provided below. For instance, the example input includes an image file name (*.png), an indication of an upper lid (top-lid), a first measured set of coordinates for the upper lid (x1, y1), an indication of a lower lid (bottom-lid), and a second measured set of coordinates for the bottom lid (x2,y2).

0_180Lcrop.png,top-lid,258,170,bottom-lid,254,341
0_180Lcrop0.png,top-lid,208,170,bottom-lid,204,341
0_180Lcrop1.png,top-lid,308,170,bottom-lid,304,341
0_180Lcrop2.png,top-lid,258,120,bottom-lid,254,291
0_180Lcrop3.png,top-lid,258,177,bottom-lid,254,348
0_180Lcrop4.png,top-lid,208,120,bottom-lid,204,291
0_180Lcrop5.png,top-lid,308,120,bottom-lid,304,291
0_180Lcrop6.png,top-lid,308,120,bottom-lid,304,291

In some embodiments, the obtaining the training dataset further comprises, for one or more respective training objects in the plurality of training objects, applying a transformation to the corresponding one or more images, where the transformation is selected from the group consisting of resizing, cropping, affine transformation, lighting transformation, random rotation, random zoom, perspective warping, scaling, and padding.

In some embodiments, the applying a transformation comprises applying a probability that an image will receive a transformation.

In some embodiments, the applying a transformation comprises determining a maximum degree and/or a minimum degree of transformation applied to an image. For example, in some embodiments, a degree of transformation can include a percentage used for scaling or zoom, a degree of rotation and/or skew, a number of pixels used for padding, and/or a percentage of lighting change.

In some embodiments, a transformation is applied to a single image. In some embodiments, a transformation is applied to a subset of images that correspond to a respective subject. In some embodiments, a transformation is applied to a plurality of images in a batch. In some embodiments, a transformation is applied to each image corresponding to each respective training object in the plurality of training objects in a training dataset.

In some embodiments, the obtaining the training dataset further comprises, for each respective training object in the plurality of training objects, restricting the corresponding first measured set of coordinates that localize the upper eyelid to within a predetermined minimum value and a predetermined maximum value.

For instance, in some embodiments, the applying a transformation to an image can result in a keypoint (e.g., the set of coordinates localizing an eyelid) translocating to another region of the image. In some embodiments, the keypoint can translocate to a position that is outside of the bounds of the image. Thus, in some embodiments, the method comprises restricting a measured set of coordinates (e.g., corresponding to an eyelid in the image) to a predetermined minimum value and a predetermined maximum value such that the set of coordinates is contained within the frame of the image.

In some embodiments, the restriction comprises, when the measured set of coordinates exceeds the predetermined minimum value or the predetermined maximum value, updating the measured set of coordinates to the closest value that falls within the predetermined minimum value and the predetermined maximum value.

In some embodiments, the predetermined minimum value is −1. In some embodiments, the predetermined maximum value is 1.

In some embodiments, the method further comprises obtaining a validation dataset including, for each validation object in a plurality of validation objects, a corresponding image of an eye comprising a corresponding plurality of pixels and one or more pixel values (e.g., RGB and/or grey-scaled pixel values) for each pixel in the corresponding plurality of pixels, and a corresponding first measured set of coordinates that localize an eyelid (e.g., an upper eyelid and/or a lower eyelid) in the corresponding image.

It will be appreciated that any of the characteristics and embodiments disclosed herein with reference to the training dataset, including objects, subjects, images, image capture, pixels, pixel values, normalization, keypoints, transformations, and the like, are likewise contemplated for the validation dataset, and/or any substitutions, modifications, additions, deletions, and/or combinations thereof, as will be apparent to one skilled in the art. For instance, any of the embodiments disclosed herein for any image in the training dataset is contemplated for any image in the validation dataset.

In some embodiments, the validation dataset is separated from the training dataset. For example, one or more images in the validation dataset can be labeled such that the one or more images are not included in training the neural network. In some embodiments, the validation dataset is obtained from a subset of the training dataset.

In some embodiments, the method comprises obtaining a validation subset and a training subset, where the validation subset and the training subset are both obtained from the training dataset. In some embodiments, the training subset is used as input for training the untrained or partially trained neural network, and the validation subset is used for validating the model. In some embodiments, the validation subset and the training subset comprise nonoverlapping subsets of training objects in the plurality of training objects.

In some embodiments, the validation subset and the training subset are obtained by splitting the training dataset according to a ratio, such that the training dataset is divided between the two subsets. Accordingly, in some embodiments, the validation subset comprises at least 5%, at least 10%, at least 20%, at least 30%, at least 40%, or at least 50% of the training dataset. In some embodiments, the validation subset and the training subset are obtained using a 20:80 split of the training dataset.

In some embodiments, the method further comprises determining a corresponding class of a respective image in the training dataset, where the corresponding class is determined based on an annotation, in electronic form, for the respective image. For example, as described above, in some embodiments, the association of a respective image in a respective pair of images with its corresponding class is determined based on an annotation associated with the respective image, where the annotation includes any category, characteristic, or identifying feature of the image, including but not limited to a tag, filename, subject identity, scan number, batch number, timestamp, frame number, demographic data (e.g., gender, age, clinical condition, neurological condition, cohort, etc.) of the subject, image metadata (e.g., image size, image resolution, type of preprocessing used, etc.), eyelid position (open, closed, partial open, etc.), image input group (e.g., training, validation, test, etc.), and/or any other category, characteristic, or identifying feature as described herein or as will be apparent to one skilled in the art. Image classes are further disclosed herein, as in the section entitled, "Classes," below.

Model Architecture.

Referring to Block 202, the method further includes training an untrained or partially trained neural network (e.g., a residual and/or a convolutional neural network) comprising a plurality of parameters (e.g., 10,000 or more parameters) by a procedure comprising inputting each corresponding image of each corresponding training object in the plurality of training objects as input to the untrained or partially trained neural network, thus obtaining a corresponding first calculated set of coordinates that localize an upper eyelid in the corresponding image.

In some embodiments, the inputting the image comprises inputting an image, an image file name, and/or a file path for the image. In some embodiments, the method comprises inputting batches of images to the untrained or partially trained neural network.

In some embodiments, the size of a corresponding image for a respective training object for input to the untrained or partially trained neural network comprises a first number of dimensions (e.g., 250×250, 560×560, etc.) and/or a first number of channels.

In some embodiments, each corresponding image of each corresponding training object that is inputted to the neural network is restricted by the input shape of a first layer in the neural network.

For example, in some embodiments, the untrained or partially trained neural network comprises: a plurality of convolutional layers, where each convolutional layer in the plurality of convolutional layers comprises one or more filters (e.g., kernels), a respective size (e.g., n×n), and a respective stride; and one or more pooling layers, where each pooling layer in the one or more pooling layers comprises a respective size and a respective stride.

In some such embodiments, the size of a respective layer (e.g., n×n) defines the input shape of the layer.

In some embodiments, the corresponding image is reshaped prior to input to the untrained or partially trained neural network (e.g., converted from a three-dimensional matrix to a one-dimensional vector).

In some embodiments, the untrained or partially trained neural network comprises one or more convolutional layers, where the respective parameters for each convolutional layer are filters.

In some embodiments, the one or more pooling layers (e.g., downsampling layers) are used to reduce the number of parameters (e.g., to reduce the computational complexity).

In another example embodiment, the untrained or partially trained neural network comprises a corresponding plurality of inputs, where each input in the corresponding plurality of inputs is for a pixel in the plurality of pixels for each respective training object, a corresponding first hidden layer comprising a corresponding plurality of hidden neurons, where each hidden neuron in the corresponding plurality of hidden neurons (i) is fully connected to each input in the plurality of inputs, (ii) is associated with a first activation function type, and (iii) is associated with a corresponding parameter (e.g., weight) in a plurality of parameters for the untrained or partially trained neural network, and one or more corresponding neural network outputs, where each respective neural network output in the corresponding one or more neural network outputs (i) directly or indirectly receives, as input, an output of each hidden neuron in the corresponding plurality of hidden neurons, and (ii) is associated with a second activation function type. In some such embodiments, the untrained or partially trained neural network is a fully connected network.

In some embodiments, the untrained or partially trained neural network comprises a plurality of hidden layers. As described above, hidden layers are located between input and output layers (e.g., to capture additional complexity). In some embodiments, where there is a plurality of hidden layers, each hidden layer may have a same respective number of neurons.

In some embodiments, each hidden neuron (e.g., in a respective hidden layer in a neural network) is associated with an activation function that performs a function on the input data (e.g., a linear or non-linear function). Generally, the purpose of the activation function is to introduce non-linearity into the data such that the neural network is trained on representations of the original data and can subsequently "fit" or generate additional representations of new (e.g., previously unseen) data. Selection of activation functions (e.g., a first and/or a second activation function) is dependent on the use case of the neural network, as certain activation functions can lead to saturation at the extreme ends of a dataset (e.g., tanh and/or sigmoid functions). For instance, in some embodiments, an activation function (e.g., a first and/or a second activation function) is selected from any of the activation functions disclosed herein and described in greater detail below.

In some embodiments, each hidden neuron is further associated with a parameter (e.g., a weight and/or a bias value) that contributes to the output of the neural network, determined based on the activation function. In some embodiments, the hidden neuron is initialized with arbitrary parameters (e.g., randomized weights). In some alternative embodiments, the hidden neuron is initialized with a predetermined set of parameters.

In some embodiments, the plurality of hidden neurons in a neural network (e.g., across one or more hidden layers) is at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 40, at least 50, at least 60, at least 70, at least 80, at least 90, at least 100, at least 200, at least 300, at least 400, or at least 500 neurons. In some embodiments, the plurality of hidden neurons is at least 100, at least 500, at least 800, at least 1000, at least 2000, at least 3000, at least 4000, at least 5000, at least 6000, at least 7000, at least 8000, at least 9000, at least 10,000, at least 15,000, at least 20,000, or at least 30,000 neurons. In some embodiments, the plurality of hidden neurons is no more than 30,000, no more than 20,000, no more than 15,000, no more than 10,000, no more than 9000, no more than 8000, no more than 7000, no more than 6000, no more than 5000, no more than 4000, no more than 3000, no more than 2000, no more than 1000, no more than 900, no more than 800, no more than 700, no more than 600, no more than 500, no more than 400, no more than 300, no more than 200, no more than 100, or no more than 50 neurons. In some embodiments, the plurality of hidden neurons is from 2 to 20, from 2 to 200, from 2 to 1000, from 10 to 50, from 10 to 200, from 20 to 500, from 100 to 800, from 50 to 1000, from 500 to 2000, from 1000 to 5000, from 5000 to 10,000, from 10,000 to 15,000, from 15,000 to 20,000, or from 20,000 to 30,000 neurons. In some embodiments, the plurality of hidden neurons falls within another range starting no lower than 2 neurons and ending no higher than 30,000 neurons.

In some embodiments, the untrained or partially trained neural network comprises from 1 to 50 hidden layers. In some embodiments, the untrained or partially trained neural network comprises from 1 to 20 hidden layers. In some embodiments, the untrained or partially trained neural network comprises at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 40, at least 50, at least 60, at least 70, at least 80, at least 90, or at least 100 hidden layers. In some embodiments, the untrained or partially trained neural network comprises no more than 100, no more than 90, no more than 80, no more than 70, no more than 60, no more than 50, no more than 40, no more than 30, no more than 20, no more than 10, no more than 9, no more than 8, no more than 7, no more than 6, or no more than 5 hidden layers. In some embodiments, the untrained or partially trained neural network comprises from 1 to 5, from 1 to 10, from 1 to 20, from 10 to 50, from 2 to 80, from 5 to 100, from 10 to 100, from 50 to 100, or from 3 to 30 hidden layers. In some embodiments, the untrained or partially trained neural network comprises a plurality of hidden layers that falls within another range starting no lower than 1 layer and ending no higher than 100 layers.

In some embodiments, the untrained or partially trained neural network comprises is a shallow neural network. A shallow neural network refers to a neural network with a small number of hidden layers. In some embodiments, such neural network architectures improve the efficiency of neural network training and conserve computational power due to the reduced number of layers involved in the training. In some embodiments, the untrained or partially trained neural network comprises has only one hidden layer.

Referring to Block 204, in some embodiments, the neural network is an untrained neural network comprising an initial convolutional neural network layer that receives a greyscaled pixel value for each pixel in the corresponding plurality of pixels as input into the neural network, where the initial convolutional neural network layer includes a first activation function, and where the initial convolutional neural network layer convolves the corresponding plurality of pixels into more than 10 separate parameters for each pixel in the plurality of pixels.

In some embodiments, the more than 10 separate parameters for each pixel in the plurality of pixels comprises a corresponding more than 10 separate channels for each pixel in the plurality of pixels. For instance, in some embodiments, the convolution comprises "windowing" a kernel of a specified size (e.g., 2×2, 3×3, etc.) across the plurality of pixels. As the kernel moves along (e.g., in accordance with a specified stride), each window is convolved according to a specified function (e.g., an activation function, average pooling, max pooling, etc.). In some embodiments, the convolution further convolves the corresponding plurality of pixels into a plurality of output channels. In some embodiments, the number of output channels for each respective pixel in the plurality of pixels increases or decreases in accordance with a specified output size (e.g., from 1 input channel to more than 10 output channels after the first pooling layer).

In some embodiments, the first activation function is tanh, sigmoid, softmax, Gaussian, Boltzmann-weighted averaging, absolute value, linear, rectified linear unit (ReLU), bounded rectified linear, soft rectified linear, parameterized rectified linear, average, max, min, sign, square, square root, multiquadric, inverse quadratic, inverse multiquadric, polyharmonic spline, swish, mish, Gaussian error linear unit (GeLU), or thin plate spline.

Referring to Block 206, the neural network further comprises a pooling layer that pools the 10 separate parameters for each pixel in the plurality of pixels outputted by the initial convolutional neural network layer.

In some embodiments, as described above, the pooling layer is used to reduce the number of pixels and/or parameters associated with an input image (e.g., to reduce the computational complexity).

For instance, an average pooling function windows across the plurality of pixels, in accordance with the kernel size and the stride, and averages, for each window, the one or more pixel values encompassed by the kernel. Alternatively, a max pooling function windows across the plurality of pixels, in accordance with the kernel size and the stride, and pools the one or more pixel values windowed by the kernel by selecting the maximum value within the kernel.

Referring to Block 208, in some embodiments, the neural network further comprises a plurality of intermediate blocks including a first intermediate block and a final intermediate block, where the first intermediate block takes as input the output of the pooling layer; each intermediate block in the plurality of intermediate blocks other than the first intermediate block and the final intermediate block takes, as input, an output of another intermediate block in the plurality of intermediate blocks and has an output that serves as input to another intermediate block in the plurality of intermediate blocks; and where each intermediate block comprises a respective first convolutional layer comprising more than 1000 parameters, where the respective convolutional layer has a corresponding activation function.

In some embodiments, each intermediate block in the plurality of intermediate blocks comprises a corresponding second convolutional layer that takes, as input, an output of the respective first convolutional layer.

In some embodiments, each intermediate block in the plurality of intermediate blocks comprises a merge layer that merges (i) an output of the respective second convolutional layer and (ii) an output of a preceding intermediate block in the plurality of intermediate blocks.

In some embodiments, each intermediate block in the plurality of intermediate blocks has a corresponding input size and a corresponding output size, and, when the corresponding input size of a respective intermediate block differs from the corresponding output size, the respective intermediate block further comprises a corresponding third convolutional layer that receives, as input, the (ii) output of the preceding intermediate block, where the corresponding third convolutional layer convolves the (ii) output of the preceding intermediate block prior to the merging (i) and (ii) by the merge layer. Thus, in some such embodiments, when the shape of the data changes between intermediate blocks, the method comprises using a third convolutional layer that preprocesses the previous block's output such that it can be merged with the current block's output.

In some embodiments, the final intermediate block takes, as input, an output of another intermediate block in the plurality of intermediate blocks and produces, as output, a flattened data structure comprising a predetermined plurality of values.

In some embodiments, the flattened data structure is a one-dimensional vector comprising the predetermined plurality of values.

In some embodiments, the predetermined plurality of values comprises from 10 to 1000, from 200 to 800, from 100 to 2000, from 500 to 5000, or from 1000 to 10,000 values.

In some embodiments, the final intermediate block further comprises, prior to the flattening of the data, decreasing the number of channels in the plurality of channels in the input provided as input to the final intermediate block. In some embodiments, the final intermediate block further comprises, prior to the flattening of the data, decreasing the number of pixels in the plurality of pixels provided as input to the final intermediate block.

In some embodiments, each value in the predetermined plurality of values is a value between −1 and 1. In some embodiments, each value in the predetermined plurality of values is a value between 0 and 1.

In some embodiments, the untrained or partially trained neural network comprises at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 40, at least 50, at least 60, at least 70, at least 80, at least 90, or at least 100 intermediate blocks. In some embodiments, the untrained or partially trained neural network comprises no more than 100, no more than 90, no more than 80, no more than 70, no more than 60, no more than 50, no more than 40, no more than 30, no more than 20, no more than 10, no more than 9, no more than 8, no more than 7, no more than 6, or no more than 5 intermediate blocks. In some embodiments, the untrained or partially trained neural network comprises from 1 to 5, from 1 to 10, from 1 to 20, from 10 to 50, from 2 to 80, from 5 to 100, from 10 to 100, from 50 to 100, or from 3 to 30 intermediate blocks. In some embodiments, the untrained or partially trained neural network comprises a plurality of hidden layers that falls within another range starting no lower than 1 intermediate block and ending no higher than 100 intermediate blocks.

Referring to Block 212, in some embodiments, the neural network further comprises a regressor block including a first dropout layer, a first linear layer, and a corresponding activation function, where the regressor block takes, as input, the flattened data structure comprising the predetermined plurality of values. In some embodiments, the regressor block does not include a dropout layer. In some embodiments, the first dropout layer removes a first subset of values from the plurality of values in the flattened data structure, based on a first dropout rate (e.g., where the dropout rate is predefined and/or determined using a hyperparameter sweep). In some embodiments, the first linear layer applies a first linear transformation to the plurality of values in the flattened data structure.

In some embodiments, the regressor block further includes a second dropout layer, where the second dropout layer removes a second subset of values from the plurality of values in the flattened data structure, based on a second dropout rate (e.g., where the dropout rate is predefined and/or determined using a hyperparameter sweep). In some embodiments, the regressor block further includes a second linear layer, where the second linear layer applies a second linear transformation to the plurality of values in the flattened data structure.

In some embodiments, a linear layer (e.g., a first linear layer and/or a second linear layer) applies a linear function to the plurality of values in the flattened data structure. In some embodiments, the linear function is a matrix multiplication.

In some embodiments, the regressor block produces, as output, the corresponding first calculated set of coordinates that localize an upper eyelid in the corresponding image of each respective training object in the plurality of training objects. For instance, in some such embodiments, the regressor block produces, as output, one or more sets of predicted coordinates for an eyelid (e.g., an upper eyelid and/or a lower eyelid).

Parameters.

In some embodiments, the untrained or partially trained neural network comprises a plurality of parameters (e.g., weights and/or hyperparameters). In some embodiments, each respective layer and/or block in the untrained or partially trained neural network comprises a respective corresponding plurality of parameters. In some such embodiments, the respective corresponding plurality of parameters for a respective layer and/or block is a subset of the plurality of parameters associated with the neural network.

In some embodiments, each respective channel in a plurality of channels for the plurality of pixels in each corresponding image for a respective training object comprises a respective corresponding plurality of parameters. In some such embodiments, the respective corresponding plurality of parameters for a respective channel is a subset of the plurality of parameters associated with the neural network.

In some embodiments, the plurality of parameters for the untrained or partially trained neural network comprises at least 10, at least 50, at least 100, at least 500, at least 1000, at least 2000, at least 5000, at least 10,000, at least 20,000, at least 50,000, at least 100,000, at least 200,000, at least 500,000, at least 1 million, at least 2 million, at least 3 million, at least 4 million or at least 5 million parameters. In some embodiments, the plurality of parameters for the untrained or partially trained neural network comprises no more than 8 million, no more than 5 million, no more than 4 million, no more than 1 million, no more than 500,000, no more than 100,000, no more than 50,000, no more than 10,000, no more than 5000, no more than 1000, or no more than 500 parameters. In some embodiments, the plurality of parameters for the untrained or partially trained neural network comprises from 10 to 5000, from 500 to 10,000, from 10,000 to 500,000, from 20,000 to 1 million, or from 1 million to 5 million parameters. In some embodiments, the plurality of parameters for the untrained or partially trained neural network falls within another range starting no lower than 10 parameters and ending no higher than 8 million parameters.

In some embodiments, the plurality of parameters for a first layer of the untrained or partially trained neural network comprises at least 10, at least 50, at least 100, at least 500, at least 1000, at least 2000, at least 3000, at least 4000, at least 5000, at least 7500, at least 10,000, at least 20,000, at least 30,000, at least 40,000, at least 50,000, at least 100,000, at least 200,000, or at least 500,000 parameters. In some embodiments, the plurality of parameters for a first layer of the untrained or partially trained neural network comprises no more than 1 million, no more than 500,000, no more than 100,000, no more than 50,000, no more than 10,000, no more than 5000, no more than 1000, or no more than 500 parameters. In some embodiments, the plurality of parameters for a first layer of the untrained or partially trained neural network comprises from 10 to 5000, from 500 to 10,000, from 1000 to 5000, from 1000 to 100,000, or from 10,000 to 500,000 parameters. In some embodiments, the plurality of parameters for a first layer of the untrained or partially trained neural network falls within another range starting no lower than 10 parameters and ending no higher than 1 million parameters.

In some embodiments, the plurality of parameters for a respective layer in a plurality of layers in the untrained or partially trained neural network comprises at least 100, at least 500, at least 1000, at least 2000, at least 5000, at least 10,000, at least 20,000, at least 50,000, at least 100,000, at least 200,000, at least 500,000, at least 1 million, at least 2 million, or at least 3 million parameters. In some embodiments, the plurality of parameters for a respective layer in a plurality of layers in the untrained or partially trained neural network comprises no more than 5 million, no more than 4 million, no more than 1 million, no more than 500,000, no more than 100,000, no more than 50,000, no more than 10,000, no more than 5000, or no more than 1000 parameters. In some embodiments, the plurality of parameters for a respective layer in a plurality of layers in the untrained or partially trained neural network comprises from 100 to 1000, from 1000 to 10,000, from 2000 and 200,000, from 8000 and 1 million, or from 30,000 and 3 million parameters. In some embodiments, the plurality of parameters for a respective layer in a plurality of layers in the untrained or partially trained neural network falls within another range starting no lower than 100 parameters and ending no higher than 5 million parameters.

In some embodiments, one or more layers and/or blocks in the untrained or partially trained neural network is associated with one or more activation functions. In some embodiments, an activation function in the one or more activation functions is tanh, sigmoid, softmax, Gaussian, Boltzmann-weighted averaging, absolute value, linear, rectified linear unit (ReLU), bounded rectified linear, soft rectified linear, parameterized rectified linear, average, max, min, sign, square, square root, multiquadric, inverse quadratic, inverse multiquadric, polyharmonic spline, swish, mish, Gaussian error linear unit (GeLU), or thin plate spline. In some embodiments, an activation function in the one or more activation functions is any of the activation functions disclosed herein. Other suitable activation functions are possible, as will be apparent to one skilled in the art.

In some embodiments, one or more layers and/or blocks in the untrained or partially trained neural network is associated with one or more average pooling and/or max pooling functions (e.g., as described above).

In some embodiments, the training of the untrained or partially trained neural network is further characterized by one or more hyperparameters (e.g., one or more values that may be tuned during training). In some embodiments, the hyperparameter values are tuned (e.g., adjusted) during training. In some embodiments, the hyperparameter values are determined based on the specific elements of the training dataset and/or one or more input images (e.g., number of images, number of pixels, number of channels, etc.). In some embodiments, the hyperparameter values are determined using experimental optimization. In some embodiments, the hyperparameter values are determined using a hyperparameter sweep. In some embodiments, the hyperparameter values are assigned based on prior template or default values.

In some embodiments, a respective hyperparameter in the one or more hyperparameters comprises a number of training epochs. In some embodiments, the number of training epochs is at least 2, at least 3, at least 4, at least 5, at least 6, at least 7, at least 8, at least 9, at least 10, at least 20, at least 30, at least 40, at least 50, at least 60, at least 70, at least 80, at least 90, at least 100, at least 200, or at least 300 epochs. In some embodiments, the number of training epochs is no more than 500, no more than 100, no more than 80, no more than 60, no more than 40, no more than 20, or no more than 10 epochs. In some embodiments, the number of epochs is from 2 to 10, from 3 to 30, from 4 to 80, from 20 to 100, or from 50 to 300 epochs. In some embodiments, the number of training epochs falls within another range starting no lower than 2 epochs and ending no higher than 500 epochs.

In some embodiments, a respective hyperparameter of the one or more hyperparameters comprises a batch size. In some embodiments, the batch size is at least 3, at least 4, at least 5, at least 6, at least 7, at least 8, at least 9, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 100 training objects (e.g., images) selected from the plurality of training objects (e.g., images). In some embodiments, the batch size is no more than 300, no more than 100, no more than 95, no more than 90, no more than 85, no more than 80, no more than 75, no more than 70, no more than 65, no more than 60, no more than 55, no more than 50, no more than 45, no more than 40, no more than 35, no more than 30, no more than 25, no more than 20, no more than 15, no more than 10, no more than 5 or fewer training objects selected from the plurality of training objects. In some embodiments, the batch size is from 3 to 50, from 5 to 40, from 10 to 80, from 20 to 100, or from 50 to 300 training objects. In some embodiments, the batch size falls within another range starting no lower than 3 and ending no higher than 300 training objects. In some embodiments, the batch size is a percentage of the plurality of training objects (e.g., at least 5%, at least 10%, at least 15%, at least 20%, at least 25%, at least 30% at least 35%, or at least 40% of the plurality of training objects).

In some embodiments, a respective hyperparameter of the one or more hyperparameters comprises a learning rate. In some embodiments, the learning rate is at least 0.0001, at least 0.0005, at least 0.001, at least 0.005, at least 0.01, at least 0.05, at least 0.1, at least 0.2, at least 0.3, at least 0.4, at least 0.5, at least 0.6, at least 0.7, at least 0.8, at least 0.9, or at least 1. In some embodiments, the learning rate is no more than 1, no more than 0.9, no more than 0.8, no more than 0.7, no more than 0.6, no more than 0.5, no more than 0.4, no more than 0.3, no more than 0.2, no more than 0.1 no more than 0.05, no more than 0.01, or less. In some embodiments, the learning rate is from 0.0001 to 0.01, from 0.001 to 0.5, from 0.001 to 0.01, from 0.005 to 0.8, or from 0.005 to 1. In some embodiments, the learning rate falls within another range starting no lower than 0.0001 and ending no higher than 1. In some embodiments, the learning rate further comprises a learning rate decay (e.g., a reduction in the learning rate over one or more epochs). For example, a learning decay rate could be a reduction in the learning rate of 0.5 over 5 epochs or a reduction of 0.1 over 20 epochs). Tuning the learning rate can achieve successful classification. For example, a low learning rate provides linear improvement to the learning over one or more epochs (thus using a high number of epochs to achieve accurate classification), while a high learning rate introduces chaos into training and can prevent optimization of the learning.

In some embodiments, the learning rate is a differential learning rate.

In some embodiments, the learning rate is one-cycle training and/or flat cosine-annealed training.

In some embodiments, a respective hyperparameter of the one or more hyperparameters comprises a stride (e.g., a number of pixels by which a kernel moves across the image). In some embodiments, the stride is at least 1, at least 2, at least 3, at least 4, at least 5, at least 6, at least 7, at least 8, at least 9, or at least 10. In some embodiments, the stride is no more than 50, no more than 30, no more than 20, no more than 10, no more than 9, no more than 8, no more than 7, no more than 6, no more than 5, no more than 4, no more than 3, no more than 2, or no more than 1. In some embodiments, the stride is from 1 to 10, from 2 to 30, or from 5 to 50. In some embodiments, the stride falls within another range starting no lower than 1 and ending no higher than 50.

In some embodiments, a respective layer and/or block has the same or different values for a respective hyperparameter (e.g., stride). For example, in some embodiments, the initial convolutional neural network layer has a stride of two or more.

In some embodiments, a respective hyperparameter of the one or more hyperparameters comprises a kernel size.

Kernels (e.g., convolutional filters) comprise a corresponding height and width. In typical embodiments, a respective kernel (e.g., filter) is smaller than the input image to the corresponding convolutional layer which the respective kernel is used to convolve. In some embodiments, the value for a kernel size indicates the edge length of the kernel (e.g., 1×1, 2×2, etc.).

In some embodiments, a respective size for a kernel is a matrix (n×n) of pixels. In some embodiments, n is at least 1, at least 2, at least 3, at least 4, at least 5, at least 6, at least 7, at least 8, at least 9, at least 10, at least 20, at least 30, at least 40, or at least 50. In some embodiments, n is at most 100, at most 50, at most 10, at most 9, at most 8, at most 7, at most 6, at most 5, at most 4, at most 3, at most 2, or at most 1. In some embodiments, n is from 1 to 10, from 2 to 30, from 5 to 50, or from 10 to 100. In some embodiments, n falls within another range starting no lower than 1 and ending no higher than 100.

In some embodiments, a respective hyperparameter of the one or more hyperparameters comprises padding (e.g., the width in pixels of a border that is applied around the edges of an image while it is being convolved, so that data at the edges of the image are not lost during the convolution).

In some embodiments, the padding is at least 1, at least 2, at least 3, at least 4, at least 5, at least 6, at least 7, at least 8, at least 9, at least 10, at least 20, at least 30, at least 40, or at least 50 pixels. In some embodiments, the padding is at most 100, at most 50, at most 10, at most 9, at most 8, at most 7, at most 6, at most 5, at most 4, at most 3, at most 2, or at most 1 pixel. In some embodiments, the padding is from 1 to 10, from 2 to 30, from 5 to 50, or from 10 to 100 pixels. In some embodiments, the padding falls within another range starting no lower than 1 pixel and ending no higher than 100 pixels.

In some embodiments, a respective hyperparameter of the one or more hyperparameters comprises an input size. In some embodiments, a respective hyperparameter of the one or more hyperparameters comprises an output size. In some embodiments, the input size is a first number of dimensions and the output size is a second number of dimensions. For instance, in some embodiments, the input size indicates a first number of channels that is received as input to a respective layer and/or block in the untrained or partially trained neural network. In some embodiments, the output size indicates a second number of channels that is outputted by the respective layer and/or block in the untrained or partially trained neural network. In some embodiments, the input size and/or the output size is referred to as the data shape.

In some embodiments, an output of a respective layer comprises a second number of dimensions that is different (e.g., less or more) from the first number of dimensions (e.g., the data shape changes between layers and/or blocks).

In some embodiments, the input size and/or the output size (e.g., a number of channels) can be specified for any one or more layers and/or blocks in the untrained or partially trained neural network.

In some embodiments, the number of channels (e.g., input size and/or output size) of a respective layer and/or block in the untrained or partially trained neural network comprises at least 1, at least 2, at least 3, at least 4, at least 5, at least 6, at least 7, at least 8, at least 9, at least 10, at least 20, at least 30, at least 40, at least 50, at least 60, at least 70, at least 80, at least 90, at least 100, at least 150, at least 200, at least 250, at least 300, at least 400, or at least 500 channels. In some embodiments, the number of channels (e.g., input size and/or output size) of a respective layer and/or block in the untrained or partially trained neural network comprises at most 1000, at most 500, at most 100, at most 90, at most 80, at most 70, at most 60, or at most 50 channels. In some embodiments, the number of channels (e.g., input size and/or output size) of a respective layer and/or block in the untrained or partially trained neural network is from 1 to 40, from 10 to 100, from 50 to 500, or from 100 to 1000 channels. In some embodiments, the number of channels (e.g., input size and/or output size) of a respective layer and/or block in the untrained or partially trained neural network falls within another range starting no lower than 1 and ending no higher than 1000 channels.

Thus, in an example embodiment, a respective layer in the plurality of layers in the neural network is associated with a plurality of hyperparameters (e.g., input channels, output channels, kernel, stride, and/or padding). The plurality of hyperparameters defines the how the input to the respective layer is processed to produce the output of the respective layer. In some instances, the number of pixels in the plurality of pixels for the image (and/or in a tensor representation of the image) will decrease after being processed by a respective layer in the plurality of layers. Alternatively, or additionally, in some instances, the number of channels will increase after being processed by a respective layer in the plurality of layers. Thus, in some such instances, while convolution can decrease the number of pixels in a corresponding image, it can also concurrently increase the number of channels in the tensor representation of the image.

Figure 7:
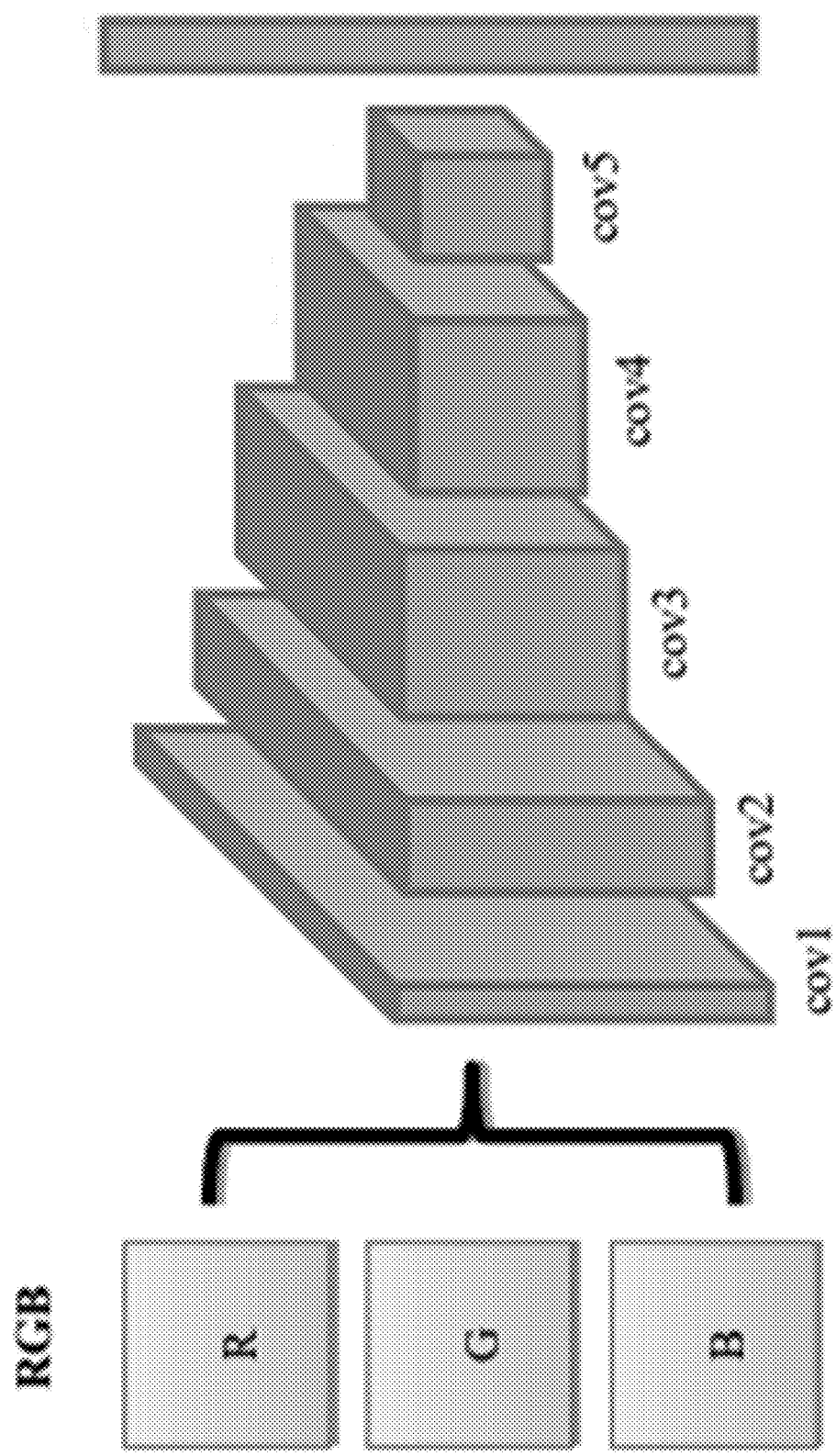
FIG. 7 illustrates an example neural network for handling data encoded into channels, in accordance with some embodiments of the present disclosure.

FIG. 7 illustrates the example situation in which an image progresses through a convolutional neural network. Successive rounds of convolution (e.g., cov1, cov2, cov3, cov4, and cov5) result in a corresponding successive reduction of the number of "pixels" outputted by a preceding layer and inputted to a subsequent layer. However, variation in the number of channels can be observed between convolutional layers, as illustrated by the varying depth of layers 1-5 as the tensor passes through each respective layer. While FIG. 7 illustrates one or more pixels comprising RGB pixel values as an initial input to the convolutional neural network, in practice a plurality of pixels comprising grey-scaled pixel values can be presented as an initial input to the convolutional neural network.

In some embodiments, a respective hyperparameter of the one or more hyperparameters comprises momentum. In some embodiments, momentum is set to at least 0.1, at least 0.2, at least 0.3, at least 0.4, at least 0.5, at least 0.6, at least 0.7, at least 0.8, at least 0.9, at least, 0.95, or at least 0.99. In some embodiments, momentum is set to at most 0.99, 0.95, 0.9, 0.8, 0.7, 0.6, 0.5, 0.4, 0.3, 0.2, 0.1 or less. In some embodiments, momentum is initially set to at least 0.5 and iterated to 0.99 over one or more epochs. In some embodiments, the momentum hyperparameter is an optimization that serves to control the variance rate (e.g., by altering stride distance).

In some embodiments, the one or more hyperparameters further include regularization strength (e.g., L2 weight penalty, dropout rate, etc.).

For instance, in some embodiments, the untrained or partially trained neural network is trained using a regularization on a corresponding parameter (e.g., weight) of each hidden neuron in the plurality of hidden neurons. In some embodiments, the regularization includes an L1 or L2 penalty.

In some embodiments, the dropout rate is at least 1%, at least 2%, at least 5%, at least 10%, at least 15%, at least 20%, at least 30%, at least 40%, or at least 50%. In some embodiments, the dropout rate is no more than 80%, no more than 50%, no more than 20%, no more than 15%, or no more than 10%. In some embodiments, the dropout rate is from 1% to 90%, from 5% to 50%, from 10% to 40%, or from 15% to 30%.

In some embodiments, the hyperparameter is an optimizer (e.g., Ranger and/or QHAdam).

In some embodiments, the hyperparameter is a loss function. In some embodiments, the loss function is mean square error, flattened mean square error, quadratic loss, mean absolute error, mean bias error, hinge, multi-class support vector machine, and/or cross-entropy. In some embodiments, the loss function is a gradient descent algorithm and/or a minimization function.

In some embodiments, any respective layer and/or block has the same or different values for a respective hyperparameter as any other respective layer and/or block. The arrangement of convolutional filters, residual blocks, pooling layers, parameters, and/or hyperparameters, and the number of such filters, blocks, layers, parameters, and/or hyperparameters in the neural networks disclosed herein are exemplary and other embodiments of the present disclosure may include other arrangements of such layers as will be apparent to one skilled in the art. Additionally, in some embodiments, the neural network can be constructed with any of the layers and/or blocks in any order and/or having any variations in parameters (e.g., type, number, and/or values thereof) that will be apparent to one skilled in the art.

In some embodiments, the untrained or partially trained neural network is any neural network disclosed herein (see, Definitions: Classifiers). In some embodiments, the untrained or partially trained neural network further comprises any algorithm and/or model disclosed herein (see, Definitions: Classifiers). For instance, in some embodiments, the untrained or partially trained neural network comprises a multilayer neural network, a deep convolutional neural network, a visual geometry convolutional neural network, a residual neural network, a residual convolutional neural network, and/or a combination thereof.

In some embodiments, the untrained or partially trained neural network is LeNet, AlexNet, VGGNet 16, GoogLeNet (e.g., Inception Network), ResNet, SE-ResNeXt, MobileNet, or EfficientNet.

Each of these specific neural networks is designed for use on image data. In some embodiments, any neural network designed to analyze image data can be used as the untrained or partially trained neural network. However, in some embodiments the multi-categorical classification layers, which may have more than 1000 classifications, may be replaced with a coordinate prediction layer (e.g., a regressor block). In some embodiments, the multi-categorical classification layers may be replaced with a plurality of coordinate prediction layers.

LeNet can be one type of neural network, and variations have been developed for use with image data. In some embodiments, LeNet can comprise at least one convolutional layer, at least one pooling layer, and at least one fully-connected layer. In some embodiments, LeNet comprises a first convolutional layer, a first pooling layer (e.g., a sub-sampling layer), a second convolutional layer, a second pooling layer, a first fully-connected layer, a second fully-connected layer, and a classification (e.g., output) layer.

AlexNet can be a GPU-enabled neural network for image recognition. In some embodiments, AlexNet can comprise at least eight convolutional, pooling, and fully-connected layers. In some embodiments, AlexNet includes five convolutional layers and three fully-connected layers.

The goal of VGGNet can be used to reduce the number of parameters. In some embodiments, VGGNet comprises 13 convolutional layers, 5 max-pooling layers, 2 fully-connected layers, and a classifying layer. In some embodiments, VGGNet alternates at least two convolutional layers with a pooling layer.

GoogLeNet can use dimensionality reduction initially to reduce computation usage, which also helps to prevent overfitting. GoogLeNet comprises fewer than 30 layers.

ResNet can be a deep network that includes a high number of layers (e.g., at least 25 layers, at least 50 layers, at least 100 layers, at least 150 layers, at least 200 layers, at least 300 layers, at least 400 layers, at least 500 layers, at least 750 layers, at least 1000 layers, at least 200 layers, at least 3000 layers, at least 4000 layers or at least 5000 layers) and provide for skipping of one or more layers. The possibility of skipping over some of the layers can keep the performance of the neural network from degrading too much. In some embodiments, ResNet can comprise at least 1000 layers.

In some embodiments, the model architecture is coded using any suitable programming language (e.g., pytorch, fastai).

In some embodiments, the neural network is a pre-trained and/or transfer learned neural network (see, Definitions: Untrained Models).

Model Training.

Referring to Block 214, the training the untrained or partially trained neural network further comprises using at least a difference between the corresponding calculated set of coordinates and the corresponding first measured set of coordinates obtained for each object in the plurality of objects to update all or a subset of the plurality of parameters (e.g., 10,000 or more parameters), thereby training the neural network to localize an upper eyelid in an image.

Generally, training a classifier (e.g., a neural network) comprises updating the plurality of parameters (e.g., weights) for the respective classifier through backpropagation (e.g., gradient descent). First, a forward propagation is performed, in which input data (e.g., a corresponding image for each respective training object in a plurality of training objects in the training dataset) is accepted into the neural network, and an output is calculated based on the selected activation function and an initial set of parameters (e.g., weights and/or hyperparameters). In some embodiments, parameters (e.g., weights and/or hyperparameters) are randomly assigned (e.g., initialized) for the untrained or partially trained neural network. In some embodiments, parameters are transferred from a previously saved plurality of parameters or from a pre-trained model (e.g., by transfer learning).

A backward pass is then performed by calculating an error gradient for each respective parameter corresponding to each respective unit in each layer, where the error for each parameter is determined by calculating a loss (e.g., error) based on the network output (e.g., the predicted value) and the input data (e.g., the expected value or true labels). Parameters (e.g., weights) are then updated by adjusting the value based on the calculated loss, thereby training the neural network.

For example, in some general embodiments of machine learning, backpropagation is a method of training a network with hidden layers comprising a plurality of weights (e.g., embeddings). The output of an untrained model (e.g., the calculated set of coordinates for an eyelid generated by a neural network) is first generated using a set of arbitrarily selected initial weights. The output is then compared with the original input (e.g., the measured set of coordinates for the eyelid obtained from the training dataset) by evaluating an error function to compute an error (e.g., using a loss function). The weights are then updated such that the error is minimized (e.g., according to the loss function). In some embodiments, any one of a variety of backpropagation algorithms and/or methods are used to update the plurality of weights, as will be apparent to one skilled in the art.

In some embodiments, the loss function is mean square error, quadratic loss, mean absolute error, mean bias error, hinge, multi-class support vector machine, and/or cross-entropy. In some embodiments, training the untrained or partially trained neural network comprises computing an error in accordance with a gradient descent algorithm and/or a minimization function.

In some embodiments, the error function is used to update one or more parameters (e.g., weights) in a neural network by adjusting the value of the one or more parameters by an amount proportional to the calculated loss, thereby training the neural network. In some embodiments, the amount by which the parameters are adjusted is metered by a learning rate hyperparameter that dictates the degree or severity to which parameters are updated (e.g., smaller or larger adjustments). Thus, in some embodiments, the training updates all or a subset of the plurality of parameters (e.g., 10,000 or more parameters) based on a learning rate. In some embodiments, the learning rate is a differential learning rate.

In some embodiments, the training further uses a regularization on the corresponding parameter of each hidden neuron in the corresponding plurality of hidden neurons. For example, in some embodiments, a regularization is performed by adding a penalty to the loss function, where the penalty is proportional to the values of the parameters in the trained or untrained neural network. Generally, regularization reduces the complexity of the model by adding a penalty to one or more parameters to decrease the importance of the respective hidden neurons associated with those parameters. Such practice can result in a more generalized model and reduce overfitting of the data. In some embodiments, the regularization includes an L1 or L2 penalty. For example, in some preferred embodiments, the regularization includes an L2 penalty on lower and upper parameters. In some embodiments, the regularization comprises spatial regularization (e.g., determined based on a priori and/or experimental knowledge of biomarker patterns in one or more infectious disease states) or dropout regularization. In some embodiments, the regularization comprises penalties that are independently optimized.

Referring to Block 216, the method further comprises repeating the training process for each learning instance in a plurality of learning instances.

For example, the inputting each corresponding image of each corresponding training object in the plurality of training objects as input to the untrained or partially trained neural network thereby obtaining a corresponding first calculated set of coordinates that localize an upper eyelid in the corresponding image, and the using at least a difference between the corresponding calculated set of coordinates and the corresponding first measured set of coordinates obtained for each object in the plurality of objects to update all or a subset of the plurality of parameters (e.g., 10,000 or more parameters) is repeated for each of a plurality of learning instances, thus training the neural network to localize an eyelid (e.g., an upper eyelid and/or a lower eyelid) in an image.

In some embodiments, the plurality of learning instances comprises at least 3, at least 4, at least 5, at least 6, at least 7, at least 8, at least 9, at least 10, at least 50, at least 100, at least 500, at least 1000, at least 2000, at least 3000, at least 4000, at least 5000, or at least 7500 learning instances. In some embodiments, the plurality of learning instances comprises no more than 10,000, no more than 5000, no more than 1000, no more than 500, no more than 100, or no more than 50 learning instances. In some embodiments, the plurality of learning instances comprises from 3 to 10, from 5 to 100, from 100 to 5000, or from 1000 to 10,000 learning instances. In some embodiments, the plurality of learning instances falls within another range starting no lower than 3 learning instances and ending no higher than 10,000 learning instances.

In some such embodiments, the training includes repeating the adjustment of the parameters of the neural network (e.g., via backpropagation) over a plurality of instances, therefore increasing the neural network's accuracy in calculating coordinates localizing an eyelid.

Referring to Block 218, the training further comprises, for a respective learning instance in the plurality of learning instances, repeating the training process for each training epoch in a respective plurality of training epochs in the respective learning instance.

Thus, in some embodiments, the training occurs over a plurality of training loops (e.g., learning instances), where, for one or more training loops in the plurality of training loops, the training occurs for over plurality of epochs. In some embodiments, the number of epochs is a hyperparameter.

In some embodiments, parameters can differ between training instances and/or between epochs within a respective training instance. For example, a learning rate can be modulated (e.g., can be slower or faster) between different training instances, different epochs of a respective training instance, and/or different layers of the neural network architecture within a respective training epoch. In another example, a number of epochs can be changed between a first training instance and a second training instance.

In some embodiments, parameters are held constant between training instances and/or between epochs within a respective training instance.

For instance, in some embodiments, the training further comprises, for a respective learning instance in the plurality of learning instances, freezing one or more of the plurality of parameters (e.g., 10,000 or more parameters) prior to the training.

In some embodiments, one or more parameters are frozen or unfrozen. In some embodiments, all of the parameters within a respective layer in a plurality of layers and/or within a respective block in a plurality of blocks are frozen or unfrozen. In some embodiments, all of the parameters across all of the layers in the neural network are frozen or unfrozen. In some embodiments, all of the parameters across all of the layers in the neural network except for the regressor layer are frozen.

In some embodiments, the plurality of parameters that are frozen varies between learning instances and/or between training epochs within a respective learning instance. In an example embodiment, the training process further comprises increasing the number of layers that are frozen after each successive learning instance in a plurality of learning instances, starting with the uppermost layers and gradually working towards the deeper layers.

In some embodiments, the training comprises transfer learning. Transfer learning is further described, for example, in the Definitions section (see, "Untrained models," above).

In some embodiments, training the untrained or partially trained neural network forms a trained neural network following a first evaluation of an error function. In some such embodiments, training the untrained or partially trained neural network forms a trained neural network following a first updating of one or more parameters based on a first evaluation of an error function. In some alternative embodiments, training the untrained or partially trained neural network forms a trained neural network following at least 1, at least 2, at least 3, at least 4, at least 5, at least 6, at least 7, at least 8, at least 9, at least 10, at least 20, at least 30, at least 40, at least 50, at least 100, at least 500, at least 1000, at least 10,000, at least 50,000, at least 100,000, at least 200,000, at least 500,000, or at least 1 million evaluations of an error function. In some such embodiments, training the untrained or partially trained neural network forms a trained neural network following at least 1, at least 2, at least 3, at least 4, at least 5, at least 6, at least 7, at least 8, at least 9, at least 10, at least 20, at least 30, at least 40, at least 50, at least 100, at least 500, at least 1000, at least 10,000, at least 50,000, at least 100,000, at least 200,000, at least 500,000, or at least 1 million updatings of one or more parameters based on the at least 1, at least 2, at least 3, at least 4, at least 5, at least 6, at least 7, at least 8, at least 9, at least 10, at least 20, at least 30, at least 40, at least 50, at least 100, at least 500, at least 1000, at least 10,000, at least 50,000, at least 100,000, at least 200,000, at least 500,000, or at least 1 million evaluations of an error function.

In some embodiments, training the untrained or partially trained neural network forms a trained neural network when the neural network satisfies a minimum performance requirement. For example, in some embodiments, training the untrained or partially trained neural network forms a trained neural network when the error calculated for the trained neural network, following an evaluation of an error function across one or more training datasets for a respective one or more training objects, satisfies an error threshold. In some embodiments, the error calculated by the error function across one or more training datasets for a respective one or more training objects satisfies an error threshold when the error is less than 20 percent, less than 18 percent, less than 15 percent, less than 10 percent, less than 5 percent, or less than 3 percent. Thus, for example, in some embodiments, a trained neural network is formed when the best performance is achieved (e.g., in some instances, a trained neural network is selected from an earlier training instance rather than a later training instance, if the earlier training instance resulted in better performance than the later training instance).

In some embodiments, the neural network performance is measured using a training loss metric, a validation loss metric, and/or a mean absolute error.

For instance, in some embodiments, the neural network performance is measured by validating the model using one or more images in the validation dataset and determined, based at least on a difference between a corresponding calculated set of coordinates and the corresponding first measured set of coordinates obtained for each image in the one or more images in the validation dataset. In some such embodiments, training the untrained or partially trained neural network forms a trained neural network when the neural network satisfies a minimum performance requirement based on a validation training.

In some embodiments, the method comprises any suitable method for validation, including but not limited to K-fold cross-validation, advanced cross-validation, random cross-validation, grouped cross-validation (e.g., K-fold grouped cross-validation), bootstrap bias corrected cross-validation, random search, and/or Bayesian hyperparameter optimization.

Referring to Block 220, as described above, in some embodiments, each respective training object in the plurality of training objects further comprises a corresponding second measured set of coordinates that localize a lower eyelid in the image corresponding to the respective training object; the training further comprises obtaining a corresponding second calculated set of coordinates that localize a lower eyelid in each corresponding image, and the training further uses a difference between the corresponding second calculated set of coordinates and the corresponding second measured set of coordinates obtained for each object in the plurality of objects to update all or a subset of the plurality of parameters (e.g., 10,000 or more parameters), thereby training the neural network to separately localize both an upper eyelid and a lower eyelid in an image.

In some embodiments, the localizing of a lower eyelid uses any of the embodiments described above as for upper eyelids, including images, data preprocessing and keypoints, model architecture, parameters, and/or model training, as disclosed in the above sections, and any substitutions, modifications, additions, deletions, and/or combinations thereof as will be apparent to one skilled in the art. In some such embodiments, the neural network provides, as output from the regressor layer, a first calculated set of coordinates and a second calculated set of coordinates, including 4 values indicating the (x1,y1) coordinates for the upper eyelid and the (x2,y2) coordinates for the lower eyelid.

In some embodiments, the trained neural network is exported. In some embodiments, the plurality of parameters for the trained neural network is stored.

In some embodiments, the method further comprises visualizing a graphical representation for one or more learning instances and/or one or more training epochs during the training process, where the graphical representation illustrates a performance measure (e.g., a training loss, validation loss, mean absolute error, and/or completion time). In some embodiments, the method further comprises obtaining a report for one or more learning instances and/or one or more training epochs during the training process, where the report indicates a hyperparameter (e.g., a learning rate).

In some embodiments, the method further provides for using a trained auxiliary neural network to determine a class of one or more images in the training dataset. For instance, in some embodiments, the method provides for determining, for a respective image in the training dataset, an identity of a subject from which the image is obtained.

In some embodiments, it is useful to determine whether an image of an eye that is to be used as input for training a neural network has been obtained from a subject that has previously been used as an input for training the neural network (e.g., to prevent overfitting of the neural network). In some such embodiments, the method includes generating an output indicating that a respective image is derived from a subject previously included in the training dataset. In some embodiments, when the respective image is determined to be derived from a subject that was previously included in the training dataset, the method includes removing the respective image from the training dataset. In some embodiments, when the respective image is determined to be derived from a subject that was previously included in a training subset of the training dataset, the method includes removing the respective image from a validation subset of the training dataset. In some embodiments, when the respective image is determined to be derived from a subject that was not previously included in the training dataset, the method includes adding and/or retaining the respective image to the training dataset.

In some embodiments, the using the trained auxiliary neural network to determine the class of the image comprises any of the embodiments described herein (see, for example, the section entitled "Embodiments for determining a class of an image," below).

Embodiments for Using a Trained Neural Network to Localize an Eyelid in an Image Referring to FIG. 3, the method provides for using a trained neural network to localize an eyelid (e.g., an upper eyelid and/or a lower eyelid) in an image. In some embodiments, this method is performed prior to downstream analysis for determining whether a subject is afflicted with a neurological condition.

Referring to Block 300, the method comprises obtaining the image of an eye of the subject in electronic format.

In some embodiments, the image of the eye comprises any of the embodiments of images disclosed above in the section entitled, "Images," and any substitutions, modifications, additions, deletions, and/or combinations thereof as will be apparent to one skilled in the art. In some embodiments, the image of the eye is preprocessed and/or transformed in accordance with any of the embodiments disclosed above in the section entitled, "Data preprocessing and keypoints," and any substitutions, modifications, additions, deletions, and/or combinations thereof as will be apparent to one skilled in the art.

For instance, in some embodiments, the image of the eye of the subject comprises a corresponding plurality of pixels and one or more pixel values for each pixel in the corresponding plurality of pixels. In some embodiments, an edge length, in pixels, of the image consists of between 164 pixels and 1024 pixels.

In some embodiments, the method comprises obtaining a plurality of images captured from a subject over a non-zero duration (e.g., as frames of a video or a series of images obtained during high-speed image capture), as described above in the section entitled, "Images." In some embodiments, the plurality of images for a subject is obtained during a blink. In some embodiments, the blink is voluntary or involuntary.

In particular, referring to Block 302, in some embodiments, the plurality of images is taken upon stimulation of at least one facial region of the subject using at least one stimulator so as to cause an involuntary blink response in the subject, where each image in the plurality of images is an image of the involuntary blink response.

In some embodiments, the at least one facial region is selected from the group consisting of the temple, the outer canthus, and the eye. In some embodiments, the stimulation of the at least one facial region is provided in proximity of the left eye, the right eye, or both. In some embodiments, the plurality of images is taken for the left eye, the right eye, or both.

In some implementations, the stimulation of the at least one facial region is selected from the group consisting of a puff of fluid (e.g., the fluid corresponding to a gas, a liquid, or a vapor), a mechanical contact (e.g., a pin prick), one or more flashes of light, an electrical current (e.g., less than approximately 1 milliamp), and a sound (e.g., between 70 and 80 decibels).

In some implementations, the stimulation is a verbal or visual command. For example, in some embodiments, the stimulation is a verbal command (e.g., "blink") administered to the subject. In some embodiments, the stimulation is a visual command (e.g., a screen that displays the word "blink") that is presented to the subject.

Methods for obtaining images and stimulating blink reflexes are disclosed in further detail in U.S. patent application Ser. No. 14/787,564, filed May 1, 2014, and International Patent Application No. PCT/US2018/032666, having an International Filing Date of May 15, 2018, each of which is hereby incorporated herein by reference in its entirety for all purposes.

In some embodiments, the method further comprises normalizing the one or more pixel values for each pixel in the corresponding plurality of pixels of each corresponding image of the plurality of images of the subject. In some embodiments, the normalizing normalizes a mean value of the pixel values of the corresponding plurality of pixels of each corresponding image of the plurality of images to a predetermined value. In some embodiments, the normalizing normalizes a standard deviation of the pixel values of the corresponding plurality of pixels of each corresponding image of the plurality of images to a predetermined standard deviation.

In some embodiments, the one or more pixel values for each corresponding image corresponding to a respective subject are normalized across the plurality of images corresponding to the respective subject. In some embodiments, the one or more pixel values for each corresponding image in a batch of images are normalized across the plurality of images in the batch. In some embodiments, the one or more pixel values for each corresponding image are normalized across a plurality of images corresponding to a plurality of subjects.

Referring to Block 304, the method further comprises inputting the image into a trained neural network comprising a plurality of parameters (e.g., at least 10,000 parameters), thereby obtaining a set of coordinates for an upper eyelid in the image.

Referring to Block 306, the method further comprises repeating the obtaining and inputting over the course of a non-zero duration thereby obtaining a corresponding set of coordinates for the upper eyelid in each image in a plurality of images (e.g., obtained using a video and/or high-speed image capture), and using each corresponding set of coordinates for the upper eyelid from each image in the plurality of images to determine whether the subject is afflicted with a neurological condition.

In some embodiments, the neurological condition is a result of a traumatic event, a head impact, or a mild traumatic brain injury. Non-limiting examples of neurological conditions include Alzheimer's disease, Parkinson's disease, dementia, Huntington's disease, schizophrenia, migraines, stroke, and/or epilepsy.

Referring to Block 308, the method further comprises using each corresponding set of coordinates for the upper eyelid in the plurality of images to obtain a first measurement of a characteristic of the involuntary blink response in the subject (e.g., for a subject suspected of having a neurological condition).

For example, in some embodiments, the output of the neural network for a plurality of images for a subject comprises a corresponding plurality of calculated sets of coordinates. A plurality of calculated sets of coordinates can include, for each image in the plurality of images for the subject, a first calculated set of coordinates for an upper eyelid (x1,y1) and/or a second calculated set of coordinates for a lower eyelid (x2,y2). The plurality of calculated sets of coordinates across the plurality of images is stacked (e.g., in a CSV), thus providing a trace (e.g., via coordinate positions) of the eyelids' movement over the course of the blink response.

In some embodiments, the characteristic of the involuntary blink response is selected from the group consisting of individual latency, differential latency, number of oscillations, change in tonic lid position, horizontal lid velocity (e.g., for an upper and lower lid), vertical lid velocity (e.g., for an upper and lower lid), time to close, time to open, total blink time, and time under threshold.

Tonic lid position refers to a moving average of the pixel location of the upper eyelid when not in a blink. Threshold is defined as a number of pixels (e.g., 20 pixels) below tonic lid position. Latency refers to the time differential between stimulation and ipsilateral eye (e.g., the stimulated eye) movement. Differential latency refers to the time differential between the start of ipsilateral eye movement and the start of contralateral eye (e.g., the eye opposite the stimulation) movement. Lid excursion refers to the distance traveled by the eyelid from the tonic lid position to closed position, measured in pixels. Lid velocity refers to the average eyelid speed (e.g., in pixels per second) in a first plurality of frames (e.g., 7 frames) following start of eyelid movement. Time to close refers to the time for an eyelid to travel from tonic lid position to the closed position. Time to open refers to the time for an eyelid to travel from closed position back to tonic lid position. Total blink time refers to the time from start of eyelid movement until it returns to its tonic lid position. Time under threshold refers to the time that the eyelid spends below the threshold position. Number of oscillations is defined as the number of cycles of up and down upper eyelid movement after a stimulated blink. Delta 30 refers to the time difference between the ipsilateral eye and contralateral eye after the lids had moved a threshold number of pixels (e.g., 30 pixels) from the tonic lid position.

In some embodiments, the plurality of images is taken without a stimulus, and the characteristic of the blink response is a number of times the subject blinks within a non-zero duration. In some embodiments, the non-zero duration is at least 1 second (s), at least 5 s, at least 10 s, at least 15 s, at least 20 s, at least 25 s, at least 30 s, at least 35 s, at least 40 s, at least 45 s, at least 50 s, at least 55 s, at least 1 minute (min), at least 2 min, at least 3 min, at least 4 min, at least 5 min, at least 6 min, at least 7 min, at least 8 min, at least 9 min, or at least 10 min. In some embodiments, the non-zero duration is between 1 second and 30 minutes.

Characteristics of blink responses are described in further detail, for example, in Garner et al., 2018, "Blink reflex parameters in baseline, active, and head-impact Division I athletes," Cogent Engineering, 5:1429110; doi: 10.1080/23311916.2018.1429110, which is hereby incorporated herein by reference in its entirety.

Thus, the method comprises using the calculated sets of coordinates across the plurality of images (e.g., the trace of eyelid movement) and a known image capture rate (e.g., a frame rate), to calculate various metrics for eyelid movement as a function of time.

Referring to Block 310, the method further comprises using each corresponding set of coordinates for the upper eyelid in the plurality of images to obtain a second measurement of the characteristic of the involuntary blink response for the subject, where the second measurement represents a baseline condition for the subject. The method further includes comparing the first measurement and the second measurement, and when the difference between the first measurement and the second measurement exceeds a predetermined threshold value, determining that the subject is afflicted with a neurological condition.

For example, in some embodiments, the baseline condition is obtained from the subject during a period of healthy and/or normal activity. In some embodiments, the baseline condition is obtained from the subject prior to onset of a suspected neurological condition. In some embodiments, the baseline condition is obtained from a healthy control subject.

Methods for measuring blink responses and determining whether a subject is afflicted with a neurological condition are disclosed in further detail in U.S. patent application Ser. No. 14/787,564, filed May 1, 2014, and International Patent Application No. PCT/US2018/032666, having an International Filing Date of May 15, 2018, each of which is hereby incorporated herein by reference in its entirety for all purposes.

In some embodiments, the method further comprises obtaining a corresponding set of coordinates for a lower eyelid in each image in the plurality of images for the subject, thereby localizing a lower eyelid in each image in the plurality of images. In some embodiments, the method further comprises using each corresponding set of coordinates for both the upper eyelid and the lower eyelid in the plurality of images to determine whether the subject is afflicted with a neurological condition.

The systems and methods for localizing of a lower eyelid and the measuring of one or more characteristics of the blink response using the set of coordinates for the lower eyelid includes any of the embodiments described above as for upper eyelids, and any substitutions, modifications, additions, deletions, and/or combinations thereof as will be apparent to one skilled in the art. In some such embodiments, the neural network provides, as output from the regressor layer, a first calculated set of coordinates and a second calculated set of coordinates, including 4 values indicating the (x1,y1) coordinates for the upper eyelid and the (x2,y2) coordinates for the lower eyelid.

Furthermore, the model architectures, parameters, and methods for model training and implementation contemplated for use of a trained neural network to localize an eyelid in an image include any of the embodiments for model architecture, parameters, model training, and model implementation (e.g., hyperparameters, layers, blocks, and/or any values or ranges thereof), as disclosed in the above section entitled, "Training a neural network to localize an eyelid in an image," and any substitutions, modifications, additions, deletions, and/or combinations thereof as will be apparent to one skilled in the art.

For instance, in some embodiments, the trained neural network comprises a plurality of convolutional layers, where each convolutional layer in the plurality of convolutional layers comprises one or more filters (e.g., kernels), a respective size (e.g., n×n), and a respective stride; and one or more pooling layers, where each pooling layer in the one or more pooling layers comprises a respective size and a respective stride.

In some embodiments, the trained neural network comprises an initial convolutional neural network layer that receives a grey-scaled pixel value for each pixel in the corresponding plurality of pixels as input into the neural network, where the initial convolutional neural network layer includes a first activation function, and where the initial convolutional neural network layer convolves the corresponding plurality of pixels into more than 10 separate parameters for each pixel in the plurality of pixels.

In some embodiments, the trained neural network further comprises a pooling layer that pools the 10 separate parameters for each pixel in the plurality of pixels outputted by the initial convolutional neural network layer.

In some embodiments, the initial convolutional neural network layer has a stride of two or more.

In some embodiments, the first activation function is tanh, sigmoid, softmax, Gaussian, Boltzmann-weighted averaging, absolute value, linear, rectified linear unit (ReLU), bounded rectified linear, soft rectified linear, parameterized rectified linear, average, max, min, sign, square, square root, multiquadric, inverse quadratic, inverse multiquadric, polyharmonic spline, swish, mish, Gaussian error linear unit (GeLU), or thin plate spline.

In some embodiments, the trained neural network further comprises a plurality of intermediate blocks including a first intermediate block and a final intermediate block, where the first intermediate block takes as input the output of the pooling layer; each intermediate block in the plurality of intermediate blocks other than the first intermediate block and the final intermediate block takes, as input, an output of another intermediate block in the plurality of intermediate blocks and has an output that serves as input to another intermediate block in the plurality of intermediate blocks; and where each intermediate block comprises a respective first convolutional layer comprising more than 1000 parameters, where the respective convolutional layer has a corresponding activation function.

In some embodiments, each intermediate block in the plurality of intermediate blocks comprises a corresponding second convolutional layer that takes, as input, an output of the respective first convolutional layer.

In some embodiments, each intermediate block in the plurality of intermediate blocks comprises a merge layer that merges (i) an output of the respective second convolutional layer and (ii) an output of a preceding intermediate block in the plurality of intermediate blocks.

In some embodiments, each intermediate block in the plurality of intermediate blocks has a corresponding input size and a corresponding output size, and, when the corresponding input size of a respective intermediate block differs from the corresponding output size (e.g., when the data shape changes between blocks), the respective intermediate block further comprises a corresponding third convolutional layer that receives, as input, the (ii) output of the preceding intermediate block, where the corresponding third convolutional layer convolves the (ii) output of the preceding intermediate block prior to the merging (i) and (ii) by the merge layer.

In some embodiments, the final intermediate block takes, as input, an output of another intermediate block in the plurality of intermediate blocks and produces, as output, a flattened data structure comprising a predetermined plurality of values.

In some embodiments, the neural network further comprises a regressor block including a first dropout layer, a first linear layer, and a corresponding activation function, where the regressor block takes, as input, the flattened data structure comprising the predetermined plurality of values. In some embodiments, the first dropout layer removes a first subset of values from the plurality of values in the flattened data structure, based on a first dropout rate. In some embodiments, the first linear layer applies a first linear transformation to the plurality of values in the flattened data structure.

In some embodiments, the regressor block further includes a second dropout layer, where the second dropout layer removes a second subset of values from the plurality of values in the flattened data structure, based on a second dropout rate. In some embodiments, the regressor block further includes a second linear layer, where the second linear layer applies a second linear transformation to the plurality of values in the flattened data structure.

In some embodiments, the trained neural network is LeNet, AlexNet, VGGNet 16, GoogLeNet, ResNet, SE-ResNeXt, MobileNet, or EfficientNet.

In some embodiments, the method further provides for using a trained auxiliary neural network to determine a class of the image, such as an identity of a subject from which the image is obtained.

For instance, in some embodiments, the method further provides for identifying whether a first image of an eye matches a second image that was previously inputted into the trained neural network in order to localize an eyelid (e.g., an upper eyelid and/or a lower eyelid) in the second image. In some such embodiments, the first matched image can be identified, e.g., as belonging to a series of images corresponding to a single subject, such as for clinical monitoring and/or tracking purposes. In some embodiments, the first matched image is an unlabeled image for which the originating subject is unknown.

In some embodiments, the using the trained auxiliary neural network to determine the class of the image comprises any of the embodiments described herein (see, for example, the section entitled "Embodiments for determining a class of an image," below).

Embodiments for Determining a Class of an Image.

In another aspect of the present disclosure, various methods of training and using a neural network for determining a class of an image are described.

As described above, determining a class of an image of an eye includes, in some embodiments, determining an identity of a subject from which the image is obtained. For instance, in some embodiments, determining a class of an image of an eye includes determining whether the image is obtained from a subject that was previously represented in a database of images (e.g., a subject whose image has been previously included in a plurality of images in a database).

In an example embodiment, the determination of whether a respective image is obtained from a subject previously represented in a database of images includes performing a pairwise comparison of the respective image against one or more images in the database. Each pair of images is entered as input into a trained neural network and classified by the trained neural network as originating from the same subject or originating from different subjects. Optionally, when a first respective image is identified as originating from the same subject as a second image selected from the database, an output is generated indicating that the first respective image is similar to the second image, and when the first respective image is identified as originating from a different subject as a second image selected from the database, an output is generated indicating that the first respective image is not similar to the second image.

In some embodiments, the database of images is a training dataset (e.g., a dataset of images for use in training a neural network, such as a neural network for localizing an eyelid in an image).

For example, in some embodiments, it is useful to determine whether an image of an eye that is intended as input for training a neural network has been obtained from a subject that has previously been used as an input for training the neural network. Advantageously, in some such embodiments, it is beneficial to ensure that multiple training images derived from a single subject are marked as such and/or removed from the training dataset to prevent overfitting of the neural network. Similarly, in some embodiments, prior to adding a new image of an eye to a training dataset, it is beneficial to determine whether the image has been obtained from a subject that has previously been used as an input for training the neural network. Moreover, in some embodiments, the method can be used to ensure separation between a training subset and a validation subset when splitting a training dataset for training and validating performance of a neural network.

In some embodiments, the database of images is a plurality of images used as inputs into a trained neural network (e.g., a plurality of images previously used as inputs to a trained neural network for localizing an eyelid in an image). For instance, in some embodiments, the method is used to identify whether an image of an eye that is used for eyelid localization matches a previously inputted image. In some such embodiments, the matched image can be used to identify a series of images belonging to a single subject, such as for clinical monitoring and/or tracking purposes. In some embodiments, the matched image can be used to classify an unlabeled image with a known subject.

In some embodiments, the database of images comprises any one or more images (e.g., images of eyes) disclosed herein. See, for example, the section entitled "Images," above.

Accordingly, in some embodiments, the present disclosure further provides for determining a class for a first training object in the plurality of training objects. The method comprises obtaining a first pair of images comprising a query image of an eye corresponding to the first training object and a reference image of an eye corresponding to a second training object, other than the first training object, in the plurality of training objects, wherein the reference image is of a corresponding class. The query image and the reference image are inputted into a trained auxiliary neural network (e.g., comprising at least 500 parameters), thereby determining whether the query image and the reference image are of the same corresponding class. Classes.

In some embodiments, the plurality of training objects comprises any of the embodiments for training objects disclosed herein. For example, in some embodiments, the plurality of training objects is a plurality of training objects in a training dataset for training a neural network to localize an eyelid in an image (see, for example, the section entitled, "Images," above).

In some embodiments, the query image of an eye is a corresponding image of an eye for the first respective training object in the plurality of training objects, where the query image comprises a corresponding plurality of pixels and one or more pixel values for each pixel in the corresponding plurality of pixels.

In some embodiments, the reference image is a corresponding image of an eye for a second training object, other than the first training object, in the plurality of training objects, where the reference image comprises a corresponding plurality of pixels and one or more pixel values for each pixel in the corresponding plurality of pixels.

In some embodiments, the reference image is a corresponding image for a training object that is included in the plurality of training objects in a training dataset for training a neural network to localize an eyelid in an image, and the query image is a new image (e.g., a corresponding image for a training object that is not currently included in the training dataset).

In some embodiments, the query image and/or the reference image comprises any of the embodiments for images disclosed herein (see, for example, the section entitled "Images," above).

For example, in some embodiments, the query image and/or the reference image is any form of two-dimensional RGB or grey-scaled pixelated image. In some embodiments, the query image and/or the reference image comprises a size denoted by n×m, where n and m refer to an edge length, in pixels. In some embodiments, an edge length, in pixels, of the query image and/or the reference image consists of between 164 pixels and 1024 pixels. In some embodiments, an edge length, in pixels, of the query image and/or the reference image consists of between 164 pixels and 1024 pixels.

In some embodiments, the query image and/or the reference image is further preprocessed. In some embodiments, the preprocessing comprises one or more of resizing, tensor conversion, normalization, and/or reordering channels (e.g., permutation). In some embodiments, the method further comprises normalizing the one or more pixel values for each pixel in the corresponding plurality of pixels of the query image and/or the reference image, across the plurality of training objects.

In some embodiments, the query image and/or the reference image has a corresponding class. In some embodiments, the reference image has a corresponding known class, and the class of the query image is unknown.

In some embodiments, a corresponding class for a respective image is an identity of a subject from which the respective image is obtained. For example, in some embodiments, the corresponding image for each respective training object in a plurality of training objects is obtained from a respective subject in a plurality of subjects. In some such embodiments, each corresponding image in the training dataset has a corresponding class in a plurality of classes, where each class is an identity (e.g., a subject identification number) of a different subject in the plurality of subjects.

In some embodiments, the reference image has a corresponding class in a plurality of classes, and the plurality of classes comprises at least 10, at least 20, at least 30, at least 40, at least 50, at least 75, at least 100, at least 125, at least 150, at least 200, at least 300, at least 400, at least 450, at least 500, at least 600, at least 700, at least 800, at least 900, at least 1000, at least 2000, at least 3000, at least 4000, at least 5000, at least 6000, at least 7000, at least 8000, at least 9000, or at least 10,000 classes. In some embodiments, the reference image has a corresponding class in a plurality of classes, and the plurality of classes comprises no more than 50,000, no more than 10,000, no more than 5000, no more than 2000, no more than 1000, no more than 500, or no more than 100 classes. In some embodiments, the reference image has a corresponding class in a plurality of classes, and the plurality of classes is from 20 to 500, from 100 to 10,000, from 40 to 5000, or from 10 to 50,000 classes. In some embodiments, the reference image has a corresponding class in a plurality of classes, and the plurality of classes falls within another range starting no lower than 10 classes and ending no higher than 50,000 classes.

In some embodiments, a corresponding class for a respective image is any category, characteristic, or identifying feature of an image, including but not limited to a subject identity, scan number, batch number, timestamp, frame number, demographic data (e.g., gender, age, clinical condition, neurological condition, cohort, etc.) of the subject, image metadata (e.g., image size, image resolution, type of preprocessing used, etc.), eyelid position (open, closed, partial open, etc.), and/or image input group (e.g., training, validation, test, etc.).

In some embodiments, a corresponding class for a respective image is determined using an annotation associated with the respective image, where the annotation includes any category, characteristic, or identifying feature of the image, including but not limited to a tag, filename, subject ID, scan ID, batch ID, timestamp, frame number, and/or any other category, characteristic, or identifying feature as described herein.

In some embodiments, the query image of an eye is of a class that is represented by at least one other image of an eye for a corresponding at least one training object in the plurality of training objects. For example, in some embodiments, the method is used to determine whether the query image matches a class that is already represented by at least one other image in the training dataset. In other words, in some such embodiments, the method is used to determine whether another image in the training dataset is of the same class as that of the query image.

Thus, in some embodiments, the method is used to identify whether a new image is obtained from a subject already represented in the training dataset.

In some embodiments, the query image of an eye is obtained from a subject represented by at least one other image of an eye for a corresponding at least one training object in the plurality of training objects (e.g., where a new image is obtained from a subject already represented in the training dataset). In some embodiments, the query image and the at least one other image representing the subject are obtained at different acquisition time points. For instance, in some embodiments, a training dataset includes a plurality of images for a corresponding plurality of training objects, where one or more images in the plurality of images are obtained at different times. In some such embodiments, images can be obtained at later time points and subsequently used to build and/or expand upon an existing training dataset for training a neural network (e.g., for localizing an eyelid in an image). It may be the case that one or more of the images later obtained include images from subjects that were previously used in earlier iterations of training the neural network, and thus the present disclosure provides a method for identifying such images in order to manage and/or reduce the risk of overfitting a neural network.

Accordingly, in some embodiments, the query image of an eye is obtained from a subject represented by at least one other image of an eye for a corresponding at least one training object in the plurality of training objects, where the query image and the at least one other image representing the subject are obtained from different respective time points, different respective scans, and/or different respective batches of image acquisition. For instance, as described above, in some embodiments, the training dataset includes multiple images for a single subject. In some embodiments, the training dataset includes multiple batches of images for a single subject. In some embodiments, the multiple images and/or multiple batches of images for the single subject are obtained at a corresponding plurality of time points.

In some embodiments, at least one of the query image and the at least one other image representing the subject comprises a visual modification of the eye of the subject. In some embodiments, the visual modification of the eye of the subject is a modification of the image of the eye and/or a modification of the physical eye of the subject. In some embodiments, a visual modification of the eye of the subject is determined based on a comparison of one of the query image and the at least one other image representing the subject, relative to the other of the query image and the at least one other image representing the subject. For instance, in some embodiments, the visual modification of the eye of the subject comprises an application of cosmetics (e.g., eyeliner, mascara, etc.) to the eye. Thus, in some embodiments, the visual modification of the eye of the subject is determined based on a comparison of a query image comprising an application of cosmetics to the eye and a reference image comprising no cosmetics applied to the eye. Alternatively, in some embodiments, the visual modification of the eye of the subject is determined based on a comparison of a reference image comprising an application of cosmetics to the eye and a query image comprising no cosmetics applied to the eye.

In some embodiments, the visual modification of the eye of the subject comprises a difference in eyelid position (e.g., closed, open, partial open, etc.), image acquisition quality (e.g., lighting, resolution, etc.), framing (e.g., angle, cropping, etc.), and/or texture or surface modifications (e.g., application of cosmetics, color, contact lenses, etc.).

Accordingly, in some embodiments, the present disclosure advantageously provides a method for determining whether a first respective image is of the same class (e.g., obtained from the same subject) as a second respective image in the training dataset, even when the first image and the second image comprise visual modifications that impart dissimilarities between them (e.g., an image of an eye from a subject with and without cosmetics). See, for example, a comparison between two eyes from the same subject in FIG. 8B.

In some embodiments, the query image is obtained from a subject not represented by any other training object in the plurality of training objects.

Using the Trained Auxiliary Neural Network.

In some embodiments, as described above, the method comprises determining a class for a first training object in the plurality of training objects by inputting, into a trained auxiliary neural network, a corresponding query image for the first training object and a reference image corresponding to a second training object in the plurality of training objects.

In some embodiments, the method comprises determining a class for a first training object in the plurality of training objects by inputting, into a trained auxiliary neural network, the corresponding query image for the first training object and a plurality of reference images corresponding to a plurality of second training objects in the plurality of training objects. For instance, in some embodiments, a first query image can be compared to (e.g., used to determine a match with) one or more other images in the training dataset. In some embodiments, a first query image is compared to (e.g., used to determine a match with) at least 50%, at least 60%, at least 70%, at least 80%, at least 90%, or at least 95% of the images in the training dataset. In some embodiments, a first query image is compared to from 50% to 95%, from 80% to 99%, or from 95% to 100% of the images in the training dataset.

In some embodiments, the query image for the first training object is compared to at least one image corresponding to each respective class in a plurality of classes represented by the training dataset. For instance, in some embodiments, the query image for the first training object is compared to at least one image for each respective subject in a plurality of subjects represented by the training dataset (e.g., the plurality of subjects from which the images in the training dataset are obtained).

In some embodiments, the query image for the first training object is compared to every other image in the training dataset.

Accordingly, in some embodiments, the method further comprises, for each respective second training object other than the first training object in the plurality of training objects, (i) obtaining a respective pair of images in a plurality of pairs of images, the respective pair of images comprising the query image of an eye corresponding to the first training object and a respective reference image of an eye corresponding to the respective second training object, and (ii) inputting the respective pair of images in the plurality of pairs of images into the trained auxiliary neural network, thereby determining whether the query image and the respective reference image are of the same corresponding class.

In some embodiments, the determining a class for a first training object in the plurality of training objects comprises outputting a result indicating whether the query image and the reference image are of the same corresponding class.

In some embodiments, the determining a class for a first training object in the plurality of training objects comprises outputting a result indicating whether the query image and a respective reference image are of the same corresponding class, for each respective second training object other than the first training object in the plurality of training objects.

In some embodiments, the method further comprises generating a report indicating whether the query image and the respective reference image are of the same corresponding class. For instance, in some embodiments, the generating a report comprises, when the query image and the respective reference image are determined to be of the same corresponding class, the first training object and the respective second training object are deemed to be similar, and when the query image and the respective reference image are determined to be of different corresponding classes, the first training object and the respective second training object are deemed to be not similar. Example outputs are further described in Example 2, below, with reference to FIGS. 8A-8D.

In some embodiments, when the query image and the reference image are determined to be of the same corresponding class, the first training object is removed from the plurality of training objects. Thus, for example, in some implementations, the method comprises pruning the training dataset to reduce the likelihood of retraining a neural network (e.g., a neural network for localizing an eyelid in an image) on subjects previously inputted to the neural network, and thereby reducing the likelihood of overfitting.

In some embodiments, the query image is an image in a validation subset and the reference image is an image in a training subset of the training dataset, and, when the query image and the reference image are determined to be of the same corresponding class, the first training object is removed from the validation subset. Thus, for example, in some implementations, the method comprises refining a validation subset to reduce the likelihood that the validation subset includes any objects previously inputted to the neural network (e.g., a neural network for localizing an eyelid in an image) in the training phase.

In some embodiments, when the query image and the reference image are determined to be of different corresponding classes, the first training object is retained in the plurality of training objects. Thus, for example, in some implementations, the method comprises assessing new images, prior to expanding upon an existing training dataset and/or prior to performing a subsequent training of the neural network (e.g., a neural network for localizing an eyelid in an image), to determine whether a new image has been previously inputted to the neural network.

In some embodiments, the query image is an image in a validation subset and the reference image is an image in a training subset of the training dataset, and, when the query image and the reference image are determined to be of different corresponding classes, the first training object is retained in the validation subset. Thus, for example, in some implementations, the method comprises assessing new images, prior to performing a validation step for a trained or partially trained neural network (e.g., a neural network for localizing an eyelid in an image), to reduce the likelihood that the validation subset includes any objects previously inputted to the neural network in the training phase.

In some embodiments, the output of the trained auxiliary neural network comprises an indication of whether the query image is in the same class as a respective reference image. In some embodiments, the trained auxiliary neural network for determining a class of an image is a binary classifier. In some embodiments, the output is binary (e.g., 0 or 1, true or false, yes or no, same or different, similar or not similar, etc.). In some embodiments, the trained auxiliary neural network for determining a class of an image is a multiclass classifier. In some embodiments, the output is a multiclass indication (e.g., a probability and/or likelihood that the query image is in the same class as a respective reference image).

Training the Auxiliary Neural Network.

In some embodiments, the trained auxiliary neural network is trained by a procedure comprising obtaining, in electronic format, for each respective pair of training objects in a plurality of pairs of training objects, a respective pair of images. The respective pair of images comprises a first image of an eye corresponding to a first training object in the pair of training objects and a second image of an eye corresponding to a second training object in the pair of training objects. Each respective image comprises a corresponding plurality of pixels and one or more pixel values for each pixel in the corresponding plurality of pixels, thereby obtaining a plurality of pairs of images. The respective pair of images further comprises a corresponding similarity label indicating a class similarity between the first image and the second image.

The procedure further includes training an untrained or partially trained auxiliary neural network comprising a plurality of parameters (e.g., 500 or more parameters) by inputting each corresponding pair of images in the plurality of pairs of images as input to the untrained or partially trained auxiliary neural network thereby obtaining a corresponding similarity prediction indicating a class similarity between the first image and the second image. The procedure further comprises using at least a difference between the corresponding similarity prediction and the corresponding similarity label obtained for each pair of images in the plurality of pairs of images to update all or a subset of the plurality (e.g., 500 or more) of parameters, thereby training the auxiliary neural network to determine a class for an image of an eye corresponding to a training object.

In some embodiments, the plurality of pairs of training objects comprises at least 10, at least 20, at least 30, at least 40, at least 50, at least 75, at least 100, at least 125, at least 150, at least 200, at least 300, at least 400, at least 450, at least 500, at least 600, at least 700, at least 800, at least 900, at least 1000, at least 2000, at least 3000, at least 4000, at least 5000, at least 6000, at least 7000, at least 8000, at least 9000, at least 10,000, at least 20,000, at least 50,000, at least 100,000, at least 200,000, or at least 500,000 pairs of training objects. In some embodiments, the plurality of pairs of training objects comprises no more than 1 million, no more than 500,000, no more than 100,000, no more than 50,000, no more than 20,000, no more than 10,000, no more than 5000, no more than 2000, no more than 1000, or no more than 500 pairs of training objects. In some embodiments, the plurality of pairs of training objects comprises from 2 to 100,000, from 100 to 500,000, from 10 to 5000, from 10,000 to 50,000, or from 100,000 to 1 million pairs of training objects. In some embodiments, the plurality of pairs of training objects comprises a different range starting no lower than 10 pairs of training objects and ending no higher than 1 million pairs of training objects.

In some embodiments, for each respective pair of images in the plurality of pairs of images, each respective image is associated with a corresponding class, and the class similarity comprises an indication of whether the first image and the second image are associated with the same class or different classes. For instance, in some embodiments, for a respective pair of images in the plurality of pairs of images, the first image and the second image are associated with the same class. In some such embodiments, the first image and the second image are obtained from the same subject. In some embodiments, for a respective pair of images in the plurality of pairs of images, the first image is associated with a corresponding first class and the second image is associated with a corresponding second class that is different from the first class. In some such embodiments, the first image is obtained from a first subject and the second image is obtained from a second subject that is different from the first subject.

As described above, in some embodiments, the corresponding class of each respective image is determined based on an annotation, in electronic form, for the respective image. For example, in some embodiments, the association of a respective image in a respective pair of images with its corresponding class is determined based on an annotation associated with the respective image, where the annotation includes any category, characteristic, or identifying feature of the image, including but not limited to a tag, filename, subject ID, scan ID, batch ID, timestamp, frame number, and/or any other category, characteristic, or identifying feature as described herein. In some embodiments, a corresponding class is an identity of a subject (e.g., a subject identification number), and a respective image in a respective pair of images is associated with its corresponding class based on a filename that includes the identity of the subject from which the respective image is obtained.

In some embodiments, a respective image in a respective pair of images is associated with a plurality of corresponding classes, including but not limited to a plurality of corresponding categories, characteristics, or identifying features of the image, including but not limited to a subject identity, scan number, batch number, timestamp, frame number, demographic data (e.g., gender, age, clinical condition, neurological condition, cohort, etc.) of the subject, image metadata (e.g., image size, image resolution, type of pre-processing used, etc.), eyelid position (open, closed, partial open, etc.), image input group (e.g., training, validation, test, etc.), and/or any other category, characteristic, or identifying feature as described herein or as will be apparent to one skilled in the art.

In some embodiments, the corresponding class for a respective image in a respective pair of images is unknown. For instance, in some embodiments, a respective image in a respective pair of images is not annotated with one or more annotations indicating a corresponding one or more classes.

In some embodiments, the similarity label is determined based on a comparison of a first corresponding class for the first image and a second corresponding class for the second image. For example, in some embodiments, the first image and the second image are obtained from the same subject and the similarity label indicates that the first image and the second image are of a similar class. In some embodiments, the first image is obtained from a first subject and the second image is obtained from a second subject that is different from the first subject, and the similarity label indicates that the first image and the second image are of dissimilar or different classes.

Thus, in some embodiments, for a respective pair of images in the plurality of pairs of images, the similarity label indicates whether the first image is in the same class as the second image. In some embodiments, the similarity label is a binary indication (e.g., 0 or 1, true or false, yes or no, same or different, similar or not similar, etc.). In some embodiments, the similarity label is a multiclass indication (e.g., a probability and/or likelihood that the query image is in the same class as a respective reference image).

In some embodiments, the corresponding class for one or both images in a respective pair of images is unknown, and the similarity label for the respective pair of images is undetermined.

As described above, in some embodiments, the trained auxiliary neural network is trained by a procedure comprising inputting an untrained or partially trained auxiliary neural network with each respective pair of images in the plurality of pairs of images and using a difference between the similarity label for the respective pair of images and a similarity prediction generated by the untrained or partially trained auxiliary neural network to update all or a subset of the plurality of parameters for the untrained or partially trained auxiliary neural network. Example embodiments for obtaining the plurality of pairs of images for use in training the untrained or partially trained auxiliary neural network are described below.

In some embodiments, the plurality of pairs of training objects used for training the auxiliary neural network is obtained from the plurality of training objects used for training a neural network to localize an eyelid in an image. In some embodiments, the plurality of pairs of training objects used for training the auxiliary neural network is obtained separately from the plurality of training objects used for training a neural network to localize an eyelid in an image. In some embodiments, the plurality of pairs of training objects used for training the auxiliary neural network is obtained using any one or more training objects as disclosed herein, or any substitutions, modifications, additions, deletions, and/or combinations thereof, as will be apparent to one skilled in the art (see, for example, the section entitled "Images," above).

In some embodiments, each pair of training objects in the plurality of pairs of training objects comprises at least one training object obtained from the plurality of training objects used for training a neural network to localize an eyelid in an image.

In some embodiments, the plurality of pairs of images is obtained by selecting, for each respective training object in the plurality of training objects, a first image of an eye corresponding to the respective training object and a second image of an eye that is of either the same class or a different class from the first image.

For example, in some embodiments, each respective training object in the plurality of training objects is represented at least once in the plurality of pairs of training objects, and the plurality of pairs of images is obtained by, for each respective training object in the plurality of training objects: obtaining the first image of an eye corresponding to the respective training object; determining a similarity label for a first pair of images for the respective training object; receiving, from the plurality of training objects, a subset of training objects that matches the determined similarity label relative to the first image in the first pair of images; and selecting, from the subset of training objects, a second image of an eye for a corresponding training object in the subset of training objects, wherein the similarity label for the first image and the selected second image matches the determined similarity label for the first pair of images, thereby obtaining the first pair of images for the respective training object.

Thus, in an example embodiment, the plurality of pairs of images is obtained by a procedure comprising obtaining a respective pair of images for each respective training object in the plurality of training objects. The first image for the respective pair of images is selected from the corresponding image of an eye for the respective training object, where the first image is of a first class f (e.g., obtained from a first subject). The second image for the respective pair of images is selected from a first subset of images of either the same class f (e.g., obtained from the same subject as the first image) or a second subset of images of a different class other than class f (e.g., obtained from a different subject than the first image). In some embodiments, the subset of images from which the second image is obtained (e.g., whether the second image is of the same or different class as the first image) is randomly determined (e.g., with a probability of 0.5). In some embodiments, the second image is further randomly selected from a respective subset of images (e.g., from the first subset or the second subset). The procedure is repeated until the selection and pairing process is performed at least once for each respective training object in the plurality of training objects. Additional embodiments for generating a plurality of pairs of training objects for use in training an auxiliary neural network are further described in "Tutorial—Using fastai on a custom new task," 2021, available on the internet at docs.fast.ai/tutorial.siamese.html, which is hereby incorporated herein by reference in its entirety.

In some embodiments, each corresponding image for each respective first training object in the training dataset is paired with another image corresponding to a respective second training object in the training dataset, other than the first training object (e.g., the selection and pairing process is performed once for each image in the training dataset). In some embodiments, the corresponding image for the respective first training object is randomly paired with another image of either the same or a different class (e.g., with a probability of 0.5).

In some embodiments, each corresponding image for each respective first training object in the training dataset is paired with at least two other images, where the at least two other images includes an image that is of the same class and an image that is of a different class.

Accordingly, in some embodiments, for each respective training object in the plurality of training objects, the plurality of pairs of images comprises at least: (i) a first pair of images comprising a first image of an eye having a first class corresponding to the respective training object and a second image of an eye that is of the same class as the first image, and (ii) a second pair of images comprising the first image of an eye and a third image of an eye having a second class that is different from the first class.

Thus, in some embodiments, the auxiliary neural network is trained by inputting, for each respective training object in the plurality of training objects, (i) a comparison of the respective image for the respective training object with another image of the same class (e.g., obtained from the same subject) and (ii) a comparison of the respective image for the respective training object with another image of a different class (e.g., obtained from different subjects).

In some embodiments, each respective first image in the training dataset is paired with every other image in the dataset (e.g., each respective first training object in the plurality of training objects is paired with every other training object in the plurality of training objects). In some embodiments, each respective first image in the training dataset is paired with every other image of the same class. In some embodiments, each respective first image in the training dataset is paired with every other image of a different class.

In some embodiments, each respective first image of a first respective class is paired with, for each respective second class other than the first class in the plurality of classes, at least a second image representing the respective second class. Thus, in some embodiments, each respective image in the dataset is paired with at least one image from each of the different classes in the plurality of classes.

As described above, generally, training a neural network (e.g., the untrained or partially trained auxiliary neural network) comprises updating the plurality of parameters (e.g., weights) for the respective neural network through backpropagation (e.g., gradient descent). First, a forward propagation is performed, in which input data (e.g., a corresponding pair of images for each respective pair of training objects in a plurality of pairs of training objects) is accepted into the untrained or partially trained auxiliary neural network, and an output is calculated based on the selected activation function and an initial set of parameters (e.g., weights and/or hyperparameters). In some embodiments, parameters (e.g., weights and/or hyperparameters) are randomly assigned (e.g., initialized) for the untrained or partially trained auxiliary neural network. In some embodiments, parameters are transferred from a previously saved plurality of parameters or from a pre-trained model (e.g., by transfer learning).

A backward pass is then performed by calculating an error gradient for each respective parameter corresponding to each respective unit in each layer, where the error for each parameter is determined by calculating a loss (e.g., error) based on the network output (e.g., the predicted value and/or the similarity prediction) and the input data (e.g., the expected value and/or the similarity label). Parameters (e.g., weights) are then updated by adjusting the value based on the calculated loss, thereby training the auxiliary neural network. In some embodiments, the training updates all or a subset of the plurality of parameters (e.g., 500 or more parameters) based on a learning rate.

Additional embodiments for training the auxiliary neural network are possible, as disclosed herein (see, for example, the section entitled "Model training," above), as well as any substitutions, modifications, additions, deletions, and/or combinations thereof, as will be apparent to one skilled in the art.

For instance, in some embodiments, training the untrained or partially trained auxiliary neural network forms a trained auxiliary neural network when the auxiliary neural network satisfies a minimum performance requirement. For example, in some embodiments, training the untrained or partially trained auxiliary neural network forms a trained auxiliary neural network when the error calculated for the trained auxiliary neural network, following an evaluation of an error function across one or more pairs of training objects in the plurality of pairs of training objects, satisfies an error threshold. In some embodiments, the performance of the auxiliary neural network is measured using a training loss metric, a validation loss metric, and/or a mean absolute error.

For instance, in some embodiments, the performance of the auxiliary neural network is measured by validating the model using one or more images in a validation subset of the plurality of pairs of training objects. In some such embodiments, training the untrained or partially trained auxiliary neural network forms a trained auxiliary neural network when the auxiliary neural network satisfies a minimum performance requirement based on a validation training. In some embodiments, the method comprises any suitable method for validation, including but not limited to K-fold cross-validation, advanced cross-validation, random cross-validation, grouped cross-validation (e.g., K-fold grouped cross-validation), bootstrap bias corrected cross-validation, random search, and/or Bayesian hyperparameter optimization.

In some embodiments, the validation subset is obtained from the plurality of pairs of training objects. In some embodiments, the validation subset is separate from a training subset, where the validation subset and the training subset are both obtained from the plurality of pairs of training objects. In some embodiments, the training subset is used as input for training the untrained or partially trained auxiliary neural network, and the validation subset is used for validating the model. In some embodiments, the validation subset and the training subset comprise nonoverlapping subsets of pairs of training objects in the plurality of pairs of training objects. For example, one or more pairs of images in the validation dataset can be labeled such that the one or more pairs of images are not used for training the auxiliary neural network.

In some embodiments, the validation subset and the training subset are obtained by splitting the plurality of pairs of training objects according to a ratio, such that the plurality of pairs of training objects is divided between the two subsets. Accordingly, in some embodiments, the validation subset comprises at least 5%, at least 10%, at least 20%, at least 30%, at least 40%, or at least 50% of the plurality of pairs of training objects. In some embodiments, the validation subset and the training subset are obtained using a 20:80 split of the plurality of pairs of training objects.

Auxiliary Neural Network Architecture.

In an example embodiment, the untrained or partially trained auxiliary neural network comprises a plurality of convolutional layers, where each convolutional layer in the plurality of convolutional layers comprises one or more filters (e.g., kernels), a respective size (e.g., n×n), and a respective stride; and one or more pooling layers, where each pooling layer in the one or more pooling layers comprises a respective size and a respective stride.

In another example embodiment, the untrained or partially trained auxiliary neural network comprises a corresponding plurality of inputs, where each input in the corresponding plurality of inputs is for a pixel in the plurality of pixels for each respective image in a respective pair of images, a corresponding first hidden layer comprising a corresponding plurality of hidden neurons, where each hidden neuron in the corresponding plurality of hidden neurons (i) is fully connected to each input in the plurality of inputs, (ii) is associated with a first activation function type, and (iii) is associated with a corresponding parameter (e.g., weight) in a plurality of parameters for the untrained or partially trained auxiliary neural network, and one or more corresponding auxiliary neural network outputs, where each respective auxiliary neural network output in the corresponding one or more neural network outputs (i) directly or indirectly receives, as input, an output of each hidden neuron in the corresponding plurality of hidden neurons, and (ii) is associated with a second activation function type. In some such embodiments, the untrained or partially trained auxiliary neural network is a fully connected network.

In some embodiments, the untrained or partially trained auxiliary neural network comprises a plurality of hidden layers. As described above, hidden layers are located between input and output layers (e.g., to capture additional complexity). In some embodiments, where there is a plurality of hidden layers, each hidden layer may have a same respective number of neurons.

In some embodiments, each hidden neuron (e.g., in a respective hidden layer in an auxiliary neural network) is associated with an activation function that performs a function on the input data (e.g., a linear or non-linear function). Generally, the purpose of the activation function is to introduce nonlinearity into the data such that the auxiliary neural network is trained on representations of the original data and can subsequently "fit" or generate additional representations of new (e.g., previously unseen) data. Selection of activation functions (e.g., a first and/or a second activation function) is dependent on the use case of the auxiliary neural network, as certain activation functions can lead to saturation at the extreme ends of a dataset (e.g., tanh and/or sigmoid functions). For instance, in some embodiments, an activation function (e.g., a first and/or a second activation function) is selected from any of the activation functions disclosed herein and described in greater detail above (see, for example, the section entitled, "Parameters," above).

In some embodiments, each hidden neuron is further associated with a parameter (e.g., a weight and/or hyperparameter), as well as any substitutions, modifications, additions, deletions, and/or combinations/or a bias value) that contributes to the output of the auxiliary neural network, determined based on the activation function. In some embodiments, the hidden neuron is initialized with arbitrary parameters (e.g., randomized weights). In some alternative embodiments, the hidden neuron is initialized with a predetermined set of parameters.

In some embodiments, the auxiliary neural network for determining a class of an image comprises any of the embodiments for network architectures and/or parameters as used in the neural network for localizing an eyelid in an image, disclosed herein. In some embodiments, the auxiliary neural network comprises any of the embodiments for neural network architectures and/or parameters disclosed herein (see, for example, the section entitled "Model architecture," as well as any substitutions, modifications, additions, deletions, and/or combinations thereof, as will be apparent to one skilled in the art. Additional exemplary embodiments for the auxiliary neural network contemplated for use in the present disclosure are further disclosed in "Tutorial—Using fastai on a custom new task," 2021, available on the internet at docs.fast.ai/tutorial.siamese.html, which is hereby incorporated herein by reference in its entirety.

For instance, in some embodiments, plurality of parameters for the auxiliary neural network comprises at least 10, at least 50, at least 100, at least 500, at least 1000, at least 2000, at least 5000, at least 10,000, at least 20,000, at least 50,000, at least 100,000, at least 200,000, at least 500,000, at least 1 million, at least 2 million, at least 3 million, at least 4 million or at least 5 million parameters. In some embodiments, the plurality of parameters for the auxiliary neural network comprises no more than 8 million, no more than 5 million, no more than 4 million, no more than 1 million, no more than 500,000, no more than 100,000, no more than 50,000, no more than 10,000, no more than 5000, no more than 1000, or no more than 500 parameters. In some embodiments, the plurality of parameters for the auxiliary neural network comprises from 10 to 5000, from 500 to 10,000, from 10,000 to 500,000, from 20,000 to 1 million, or from 1 million to 5 million parameters. In some embodiments, the plurality of parameters for the auxiliary neural network falls within another range starting no lower than 10 parameters and ending no higher than 8 million parameters.

In some embodiments, the auxiliary neural network is associated with one or more activation functions. In some embodiments, an activation function in the one or more activation functions is tanh, sigmoid, softmax, Gaussian, Boltzmann-weighted averaging, absolute value, linear, rectified linear unit (ReLU), bounded rectified linear, soft rectified linear, parameterized rectified linear, average, max, min, sign, square, square root, multiquadric, inverse quadratic, inverse multiquadric, polyharmonic spline, swish, mish, Gaussian error linear unit (GeLU), or thin plate spline. In some embodiments, an activation function in the one or more activation functions is any of the activation functions disclosed herein. Other suitable activation functions are possible, as will be apparent to one skilled in the art.

In some embodiments, the training of the auxiliary neural network is characterized by one or more hyperparameters.

In some embodiments, a respective hyperparameter in the one or more hyperparameters comprises a number of training epochs. In some embodiments, the number of training epochs is at least 2, at least 3, at least 4, at least 5, at least 6, at least 7, at least 8, at least 9, at least 10, at least 20, at least 30, at least 40, at least 50, at least 60, at least 70, at least 80, at least 90, at least 100, at least 200, or at least 300 epochs. In some embodiments, the number of training epochs is no more than 500, no more than 100, no more than 80, no more than 60, no more than 40, no more than 20, or no more than 10 epochs. In some embodiments, the number of epochs is from 2 to 10, from 3 to 30, from 4 to 80, from 20 to 100, or from 50 to 300 epochs. In some embodiments, the number of training epochs falls within another range starting no lower than 2 epochs and ending no higher than 500 epochs.

In some embodiments, a respective hyperparameter in the one or more hyperparameters comprises a learning rate. In some embodiments, the learning rate is at least 0.0001, at least 0.0005, at least 0.001, at least 0.005, at least 0.01, at least 0.05, at least 0.1, at least 0.2, at least 0.3, at least 0.4, at least 0.5, at least 0.6, at least 0.7, at least 0.8, at least 0.9, or at least 1. In some embodiments, the learning rate is no more than 1, no more than 0.9, no more than 0.8, no more than 0.7, no more than 0.6, no more than 0.5, no more than 0.4, no more than 0.3, no more than 0.2, no more than 0.1 no more than 0.05, no more than 0.01, or less. In some embodiments, the learning rate is from 0.0001 to 0.01, from 0.001 to 0.5, from 0.001 to 0.01, from 0.005 to 0.8, or from 0.005 to 1. In some embodiments, the learning rate falls within another range starting no lower than 0.0001 and ending no higher than 1. In some embodiments, the learning rate further comprises a learning rate decay (e.g., a reduction in the learning rate over one or more epochs). For example, a learning decay rate could be a reduction in the learning rate of 0.5 over 5 epochs or a reduction of 0.1 over 20 epochs). In some embodiments, the learning rate is a differential learning rate.

In some embodiments, a respective hyperparameter in the one or more hyperparameters comprises a loss function. In some embodiments, the loss function is mean square error, flattened mean square error, quadratic loss, mean absolute error, mean bias error, hinge, multi-class support vector machine, cross-entropy, flattened cross-entropy, gradient descent algorithm and/or a minimization function.

In some embodiments, the auxiliary neural network is LeNet, AlexNet, VGGNet 16, GoogLeNet, ResNet, SE-ResNeXt, MobileNet, or EfficientNet.

In some embodiments, the trained auxiliary neural network is a pre-trained and/or transfer learned neural network. In some embodiments, the auxiliary neural network comprises all or a subset of a pre-trained or transfer learned neural network and/or all or a subset of an untrained custom-built neural network. For instance, in some embodiments, the auxiliary neural network is constructed using a portion of a pre-trained neural network (e.g., ResNet) combined with an untrained, custom-built neural network.

For example, in some embodiments, the pretrained neural network comprises a plurality of convolutional layers, where each convolutional layer in the plurality of convolutional layers comprises one or more filters (e.g., kernels), a respective size (e.g., n×n), and a respective stride; and one or more pooling layers, where each pooling layer in the one or more pooling layers comprises a respective size and a respective stride.

In some embodiments, the auxiliary neural network is constructed using one or more convolutional layers in the plurality of convolutional layers obtained from the pre-trained neural network. For instance, in some embodiments, the auxiliary neural network comprises all but one of the convolutional layers in the plurality of convolutional layers obtained from the pretrained neural network. In some embodiments, the auxiliary neural network comprises all but 2, all but 3, all but 4, all but 5, all but 6, all but 7, all but 8, all but 9, or all but 10 of the convolutional layers in the plurality of convolutional layers obtained from the pre-trained neural network. In some embodiments, the auxiliary neural network comprises at least 1, at least 2, at least 3, at least 4, at least 5, at least 6, at least 7, at least 8, at least 9, or at least 10 of the convolutional layers in the plurality of convolutional layers obtained from the pretrained neural network. In some embodiments, the auxiliary neural network is obtained by splitting the pretrained neural network at a predefined layer, thereby obtaining a subset of convolutional layers in the plurality of convolutional layers (e.g., using a splitter).

In some embodiments, the pretrained neural network or the subset thereof comprises any of the embodiments for model architecture disclosed herein (see, for example, the section entitled "Model architecture," above). Similarly, in some embodiments, the untrained custom-built neural network comprises any of the embodiments for model architecture disclosed herein (see, for example, the section entitled "Model architecture," above).

In some embodiments, the training of the auxiliary neural network further comprises performing, for each learning instance in a plurality of learning instances, the inputting (i) each corresponding pair of images in the plurality of pairs of images as input to the untrained or partially trained auxiliary neural network thereby obtaining a corresponding similarity prediction indicating a class similarity between the first image and the second image, and the using (ii) at least a difference between the corresponding similarity prediction and the corresponding similarity label obtained for each pair of images in the plurality of pairs of images to update all or a subset of the plurality of parameters.

In some embodiments, the plurality of learning instances comprises at least 3, at least 4, at least 5, at least 6, at least 7, at least 8, at least 9, at least 10, at least 50, at least 100, or at least 500 learning instances. In some embodiments, the plurality of learning instances comprises no more than 1000, no more than 500, no more than 100, or no more than 50 learning instances. In some embodiments, the plurality of learning instances comprises from 3 to 10, from 5 to 100, from 100 to 500, or from 100 to 1000 learning instances. In some embodiments, the plurality of learning instances falls within another range starting no lower than 3 learning instances and ending no higher than 1000 learning instances.

In some embodiments, the training of the auxiliary neural network further comprises, for a respective learning instance in the plurality of learning instances, repeating the inputting (i) and the using (ii) for each training epoch in a respective plurality of training epochs in the respective learning instance.

In some embodiments, the training of the auxiliary neural network further comprises, for a respective learning instance in the plurality of learning instances, freezing one or more of the plurality of parameters prior to the inputting (i) and the using (ii).

In some embodiments, for a respective learning instance, one or more parameters in the auxiliary neural network are frozen or unfrozen. In some embodiments, for a respective learning instance, all of the parameters within a respective layer in a plurality of layers and/or within a respective block in a plurality of blocks are frozen or unfrozen. In some embodiments, for a respective learning instance, all of the parameters across all of the layers in the auxiliary neural network are frozen or unfrozen. In some embodiments, for a respective learning instance, all of the parameters across all of the layers in the neural network except for a predefined number of upper or lower layers are frozen. In some embodiments, for a respective learning instance, all of the parameters across all of the layers obtained from the pre-trained neural network are frozen, and all of the parameters across all of the layers generated in the custom-built neural network are unfrozen.

In some embodiments, the plurality of parameters that are frozen varies between learning instances and/or between training epochs within a respective learning instance. In an example embodiment, the training process comprises increasing the number of layers that are frozen after each successive learning instance in a plurality of learning instances. In another example embodiment, the training process comprises reducing the number of layers that are frozen after each successive learning instance in a plurality of learning instances.

For instance, in an example implementation, the auxiliary neural network comprises a subset of a pre-trained neural network (e.g., all but the top two layers of a pre-trained ResNet architecture) combined with an untrained, custom-built neural network, and the training of the auxiliary neural network comprises a first learning instance and a second learning instance. The first learning instance is performed by freezing the plurality of parameters across all of the layers in the pre-trained neural network and training the auxiliary neural network by updating the parameters included in the custom-built neural network over a plurality of training epochs (e.g., 4 training epochs). The second learning instance is performed by unfreezing all of the parameters across all of the layers in the auxiliary neural network and training the auxiliary neural network by updating the parameters included in both the pre-trained neural network and the custom-built neural network over a plurality of training epochs (e.g., 4 training epochs). In some embodiments, the second learning instance further comprises a differential learning rate.

In some embodiments, the method further comprises displaying a graphical representation for one or more learning instances and/or one or more training epochs during the training process, where the graphical representation illustrates a performance measure (e.g., a training loss, validation loss, mean absolute error, and/or completion time).

In some embodiments, the method further comprises obtaining a report for one or more learning instances and/or one or more training epochs during the training process, where the report indicates a parameter (e.g., a learning rate) and/or a value for a parameter.

In some embodiments, the method further comprises displaying a graphical representation of an output of the auxiliary neural network for one or more learning instances and/or one or more training epochs during the training process. For instance, in some embodiments, the graphical representation comprises a display of the first image, the second image, the similarity label (e.g., similar/not similar), and the similarity prediction (e.g., similar/not similar). Example outputs are further described in Example 2, below, with reference to FIGS. 8A-8D.

Additional Embodiments

Another aspect of the present disclosure provides a computing system, comprising one or more processors and memory storing one or more programs to be executed by the one or more processor, the one or more programs comprising instructions for training a neural network to localize an upper eyelid in an image. The instructions include a method comprising obtaining, in electronic format, a training dataset comprising, for each respective training object in a plurality of training objects, a corresponding image of an eye comprising a corresponding plurality of pixels and one or more pixel values for each pixel in the corresponding plurality of pixels, and a corresponding first measured set of coordinates that localize an upper eyelid in the corresponding image.

The method further comprises training an untrained or partially trained neural network comprising a plurality of parameters (e.g., 10,000 or more parameters) by a procedure comprising (i) inputting each corresponding image of each corresponding training object in the plurality of training objects as input to the untrained or partially trained neural network thereby obtaining a corresponding first calculated set of coordinates that localize an upper eyelid in the corresponding image, and (ii) using at least a difference between the corresponding calculated set of coordinates and the corresponding first measured set of coordinates obtained for each object in the plurality of objects to update all or a subset of the plurality of parameters (e.g., 10,000 or more parameters), thereby training the neural network to localize an upper eyelid in an image.

Another aspect of the present disclosure provides a non-transitory computer readable storage medium storing one or more programs for training a neural network to localize an upper eyelid in an image, the one or more programs configured for execution by a computer. The one or more programs comprise instructions for obtaining, in electronic format, a training dataset comprising, for each respective training object in a plurality of training objects, a corresponding image of an eye comprising a corresponding plurality of pixels and one or more pixel values for each pixel in the corresponding plurality of pixels, and a corresponding first measured set of coordinates that localize an upper eyelid in the corresponding image.

The one or more programs further comprise instructions for training an untrained or partially trained neural network comprising a plurality of parameters (e.g., 10,000 or more parameters) by a procedure comprising (i) inputting each corresponding image of each corresponding training object in the plurality of training objects as input to the untrained or partially trained neural network thereby obtaining a corresponding first calculated set of coordinates that localize an upper eyelid in the corresponding image, and (ii) using at least a difference between the corresponding calculated set of coordinates and the corresponding first measured set of coordinates obtained for each object in the plurality of objects to update all or a subset of the plurality of parameters (e.g., 10,000 or more parameters), thereby training the neural network to localize an upper eyelid in an image.

Still another aspect of the present disclosure provides a computing system, comprising one or more processors and memory storing one or more programs to be executed by the one or more processor, the one or more programs comprising instructions for localizing an upper eyelid in an image of a subject. The instructions include a method comprising obtaining the image of an eye of the subject in electronic format and inputting the image into a trained neural network comprising at least 10,000 parameters, thereby obtaining a set of coordinates for an upper eyelid in the image.

Another aspect of the present disclosure provides a non-transitory computer readable storage medium storing one or more programs for localizing an upper eyelid in an image of a subject, the one or more programs configured for execution by a computer. The one or more programs comprise instructions for obtaining the image of an eye of the subject in electronic format and inputting the image into a trained neural network comprising at least 10,000 parameters, thereby obtaining a set of coordinates for an upper eyelid in the image.

Still another aspect of the present disclosure provides a computing system including the above-disclosed one or more processors and memory storing one or more programs that further comprise instructions for performing any of the above-disclosed methods alone or in combination.

Another aspect of the present disclosure provides non-transitory computer-readable storage medium comprising the above-disclosed one or more programs in which the one or more programs further comprise instructions for performing any of the above-disclosed methods alone or in combination. The one or more programs are configured for execution by a computer.

EXAMPLES

Example 1

Performance of Residual Convolutional Neural Network Architecture Versus Pre-Trained ResNet FIGS. 4A-B illustrate example performance measures of a transfer-learned ResNet model (FIG. 4A) and a residual convolutional neural network with custom architecture trained in accordance with some embodiments of the present disclosure (FIG. 4B).

A pre-trained ResNet model was trained, using transfer learning, on a training dataset including a plurality of images. The model's architecture included the use of a ReLU activation function, the Ranger optimizer, and flat cosine-annealed training. Training was performed for 10 epochs (in two sets of 5 epochs labeled epochs 0-4). For the first 5 epochs, parameters in all layers except the final layer were frozen, and only the final layer was trained. For the final 5 epochs, all layers were unfrozen, and every layer of the model was trained. The model was validated using a validation dataset including a subset of images not used during training. The ability of the model to correctly identify coordinates for eyelid localization was measured using training loss, validation loss, r2 scores (e.g., where values closer to 1 indicate greater accuracy of predicted values compared to actual values), and mean absolute error of predictions in pixels (pixmae). Completion time (speed) of each epoch was also measured. As illustrated in FIG. 4A, training loss, validation loss, and mean absolute error decreased sharply during the first 5 epochs and remained relatively constant for the final 5 epochs. Similarly, r2 scores increased sharply during the first 5 epochs and remained relatively constant for the final 5 epochs. These performance measures indicated the accuracy of the model. However, the pre-trained ResNet model's bloat and lack of domain specificity indicated that a custom architecture was the optimal approach.

A custom ResNet architecture (e.g., a residual convolutional neural network) model was constructed in accordance with some embodiments of the present disclosure. A Mish activation function was used instead of ReLU and the QHAdam optimizer was used instead of Ranger. Flat cosine-annealed training on every layer of the model was performed for 10 epochs on the training dataset and validated using the validation dataset described above. FIG. 4B shows the report from the final epochs of training (pictured as epochs 0-9), including training loss, validation loss, r2 score, mean absolute error of predictions in pixels, and completion time. Accuracy of the custom architecture was comparable to that of the pre-trained ResNet model, but the completion time for each epoch was shorter, indicating that the systems and methods provided herein improved the speed of computation. The shallowness of the architecture provides greater efficiency and consistency given the specificity of the domain in the input images. As provided in the present disclosure, various combinations are possible for the configuration of the architecture with regards to the optimizer, activation function, network depth, convolution kernel sizes, capabilities for generalization, self-attention, and optical flow estimation, among other specifications.

Example 2

Performance of Trained Auxiliary Neural Network for Determining a Class of an Image FIGS. 8A, 8B, 8C, and 8D illustrate example outputs of an auxiliary neural network for determining a class of an image. A plurality of pairs of training objects was obtained from a plurality of training objects in a training dataset used for training a neural network to localize an eyelid in an image, as in Example 1 above. The subject identity for each respective image in each pair of images for the corresponding pair of training objects was determined using an annotation (e.g., a numerical identifier included in the filename) for the respective image. In addition, the annotation for each respective image included a scan identity, the capture orientation (e.g., left or right eye), and a frame number for the respective image. An auxiliary neural network using a pre-trained ResNet18 model architecture was trained, using transfer learning, as a binary classifier to generate similarity predictions (e.g., true or false), using, as input, each respective pair of images in the plurality of pairs of training objects and a similarity label for the respective pair of images derived from a comparison of the subject identifiers for each respective image in the respective pair of images.

Figure 8B:
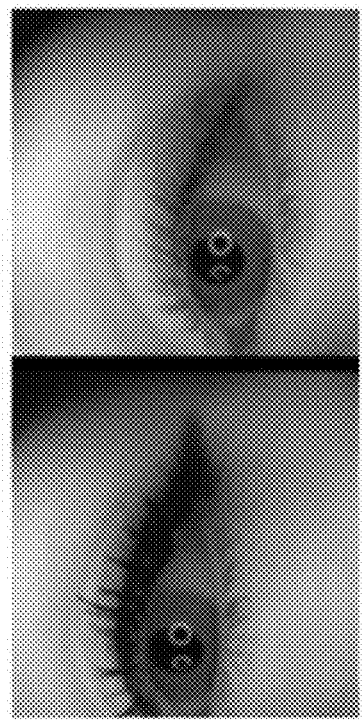
FIGS. 8A, 8B, 8C, and 8D illustrate example outputs of an auxiliary neural network for determining a class of an image, in accordance with some embodiments of the present disclosure.
Figure 8D:
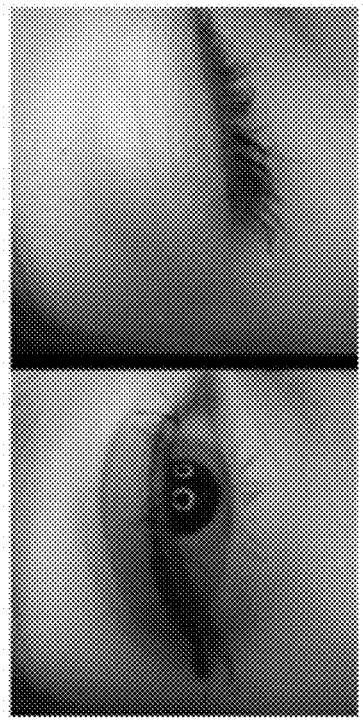
Figure 8A:
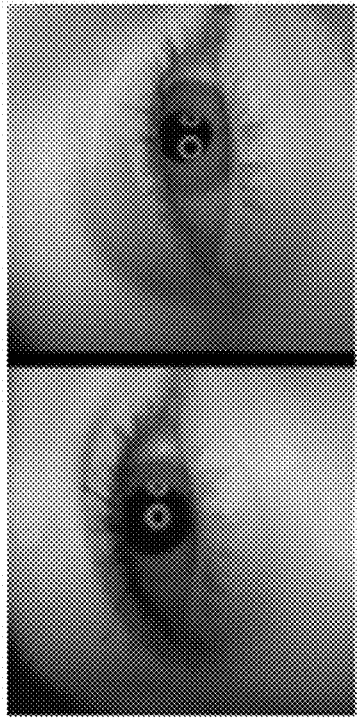
Figure 8C:
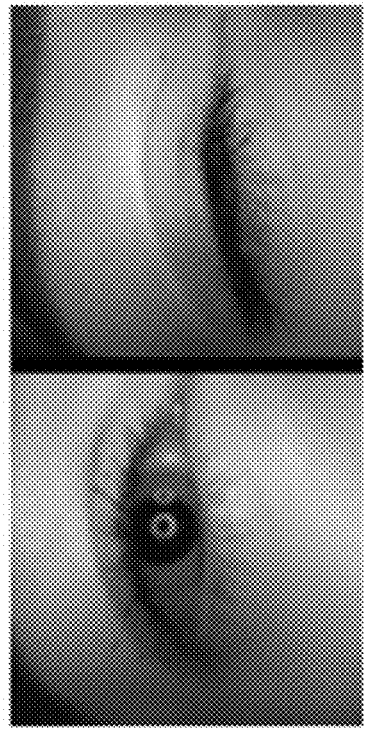

Outputs from the trained auxiliary neural network were assessed using a validation dataset to determine the model's ability to predict whether or not two respective images of an eye are obtained from the same subject or from different subjects. Notably, the trained auxiliary neural network achieved 99.1% accuracy on the validation set. FIGS. 8A and 8D illustrate the model's ability to differentiate between images obtained from different subjects (e.g., "Not similar"). FIGS. 8B and 8C illustrate the model's ability to accurately identify images obtained from the same subject (e.g., "Similar"), regardless of different eyelid orientations (e.g., FIG. 8C: left panel: open; right panel: closed) and/or textures (e.g., FIG. 8B: left panel: eyelid with makeup; right panel: eyelid without makeup).

CONCLUSION

The terminology used herein is for the purpose of describing particular cases and is not intended to be limiting. As used herein, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "including," "includes," "having," "has," "with," or variants thereof are used in either the detailed description and/or the claims, such terms are intended to be inclusive in a manner similar to the term "comprising."

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms first, second, etc. may be used herein to describe various elements, these elements should not be limited by these terms. These terms are used to distinguish one element from another. For example, a first subject could be termed a second subject, and, similarly, a second subject could be termed a first subject, without departing from the scope of the present disclosure. The first subject and the second subject are both subjects, but they are not the same subject.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many alterations, modifications, and variations will be apparent to those skilled in the art in light of the foregoing description without departing from the spirit or scope of the present disclosure and that when numerical lower limits and numerical upper limits are listed herein, ranges from any lower limit to any upper limit are contemplated. The implementations were chosen and described in order to best explain the principles and their practical applications, to thereby enable others skilled in the art to best utilize the implementations and various implementations with various modifications as are suited to the particular use contemplated.

What is claimed:

1. A method for localizing an upper eyelid in an image of a subject, the method comprising:
 (a) obtaining the image of an eye of the subject in electronic format;

(b) inputting the image into a trained neural network comprising at least 10,000 parameters, thereby obtaining a set of coordinates for an upper eyelid in the image;

(c) repeating the obtaining (a) and inputting (b) over the course of a non-zero duration thereby obtaining a corresponding set of coordinates for the upper eyelid in each image in a plurality of images; and (d) using each corresponding set of coordinates for the upper eyelid from each image in the plurality of images to determine whether the subject is afflicted with a neurological condition.

2. The method of claim 1, wherein the neurological condition is a result of a traumatic event, a head impact, or a mild traumatic brain injury.

3. The method of claim 1, wherein the plurality of images is taken upon stimulation of at least one facial region of the subject using at least one stimulator so as to cause an involuntary blink response in the subject and wherein each image in the plurality of images is an image of the involuntary blink response.

4. The method of claim 3, wherein the at least one facial region is selected from the group consisting of the temple, the outer canthus, and the eye.

5. The method of claim 3, wherein the stimulator is provided in proximity of the left eye, the right eye, or both.

6. The method of claim 1, wherein the plurality of images is taken for the left eye of the subject, the right eye of the subject, or both.

7. The method of claim 3, wherein the at least one stimulator is selected from the group consisting of a puff of fluid, a mechanical contact, one or more flashes of light, an electrical current, and a sound.

8. The method of claim 3, further comprising using each corresponding set of coordinates for the upper eyelid in the plurality of images to obtain a first measurement of a characteristic of the involuntary blink response in the subject.

9. The method of claim 8, wherein the characteristic of the involuntary blink response is selected from the group consisting of individual latency, differential latency, number of oscillations, change in tonic lid position, horizontal lid velocity, vertical lid velocity, time to close, time to open, total blink time, and time under threshold.

10. The method of claim 9, further comprising using each corresponding set of coordinates for the upper eyelid in the plurality of images to obtain a second measurement of the characteristic of the involuntary blink response for the subject, wherein the second measurement represents a baseline condition for the subject;
comparing the first measurement and the second measurement; and
when the difference between the first measurement and the second measurement exceeds a predetermined threshold value, determining that the subject is afflicted with a neurological condition.

11. The method of claim 1, wherein the trained neural network comprises:
a plurality of convolutional layers, wherein each convolutional layer in the plurality of convolutional layers comprises one or more filters, a respective size, and a respective stride; and
one or more pooling layers, wherein each pooling layer in the one or more pooling layers comprises a respective size and a respective stride.

12. The method of claim 1, wherein the trained neural network is LeNet, AlexNet, VGGNet 16, GoogLeNet, ResNet, SE-ResNeXt, MobileNet, or EfficientNet.

13. The method of claim 1, further comprising:
obtaining a corresponding set of coordinates for a lower eyelid in each image in the plurality of images, thereby localizing a lower eyelid in each image in the plurality of images; and
using each corresponding set of coordinates for both the upper eyelid and the lower eyelid in the plurality of images to determine whether the subject is afflicted with the neurological condition.

14. The method of claim 1, wherein the image of the eye of the subject comprises a corresponding plurality of pixels and one or more pixel values for each pixel in the corresponding plurality of pixels.

15. The method of claim 14, wherein an edge length, in pixels, of the image consists of between 164 pixels and 1024 pixels.

16. The method of claim 14, wherein
the trained neural network comprises an initial convolutional neural network layer that receives a grey-scaled pixel value for each pixel in the corresponding plurality of pixels as input into the neural network,
the initial convolutional neural network layer includes a first activation function, and
the initial convolutional neural network layer convolves the corresponding plurality of pixels into more than 10 separate parameters for each pixel in the plurality of pixels.

17. The method of claim 16, wherein the trained neural network further comprises a pooling layer that pools the more than 10 separate parameters for each pixel in the plurality of pixels outputted by the initial convolutional neural network layer.

18. The method of claim 16, wherein the initial convolutional neural network layer has a stride of two or more.

19. The method of claim 17, wherein the trained neural network further comprises a plurality of intermediate blocks including a first intermediate block and a final intermediate block, wherein
the first intermediate block takes as input the output of the pooling layer;
each intermediate block in the plurality of intermediate blocks other than the first intermediate block and the final intermediate block takes, as input, an output of another intermediate block in the plurality of intermediate blocks and has an output that serves as input to another intermediate block in the plurality of intermediate blocks, and wherein each intermediate block comprises a respective first convolutional layer comprising more than 1000 parameters, wherein the respective convolutional layer has a corresponding activation function.

20. The method of claim 19, wherein each intermediate block in the plurality of intermediate blocks comprises a corresponding second convolutional layer that takes, as input, an output of the respective first convolutional layer.

21. The method of claim 20, wherein each intermediate block in the plurality of intermediate blocks comprises a merge layer that merges (i) an output of the respective second convolutional layer and (ii) an output of a preceding intermediate block in the plurality of intermediate blocks.

22. The method of claim 21, wherein:
each intermediate block in the plurality of intermediate blocks has a corresponding input size and a corresponding output size, and, when the corresponding input size of a respective intermediate block differs from the corresponding output size, the respective intermediate block further comprises a corresponding third convolutional layer that receives, as input, the (ii) output of the preceding intermediate block, wherein the corresponding third convolutional layer convolves the (ii) output of the preceding intermediate block prior to the merging (i) and (ii) by the merge layer.

23. The method of claim 19, wherein the final intermediate block takes, as input, an output of another intermediate block in the plurality of intermediate blocks and produces, as output, a flattened data structure comprising a predetermined plurality of values.

24. The method of claim 23, wherein the neural network further comprises a regressor block including a first dropout layer, a first linear layer, and a corresponding activation function, wherein the regressor block takes, as input, the flattened data structure comprising the predetermined plurality of values.

25. The method of claim 24, wherein the first dropout layer removes a first subset of values from the plurality of values in the flattened data structure, based on a first dropout rate.

26. The method of claim 25, wherein the first linear layer applies a first linear transformation to the plurality of values in the flattened data structure.

27. The method of claim 26, wherein the regressor block further includes a second dropout layer, wherein the second dropout layer removes a second subset of values from the plurality of values in the flattened data structure, based on a second dropout rate.

28. The method of claim 26, wherein the regressor block further includes a second linear layer, wherein the second linear layer applies a second linear transformation to the plurality of values in the flattened data structure.

29. The method of claim 16, wherein the first activation function is tanh, sigmoid, softmax, Gaussian, Boltzmann-weighted averaging, absolute value, linear, rectified linear unit (ReLU), bounded rectified linear, soft rectified linear, parameterized rectified linear, average, max, min, sign, square, square root, multiquadric, inverse quadratic, inverse multiquadric, polyharmonic spline, swish, mish, Gaussian error linear unit (GeLU), or thin plate spline.

30. A computing system, comprising:
one or more processors;
memory storing one or more programs to be executed by the one or more processors, the one or more programs comprising instructions for localizing an upper eyelid in an image of a subject by a method comprising:
(a) obtaining the image of an eye of the subject in electronic format;
(b) inputting the image into a trained neural network comprising at least 10,000 parameters, thereby obtaining a set of coordinates for an upper eyelid in the image;
(c) repeating the obtaining (a) and inputting (b) over the course of a non-zero duration thereby obtaining a corresponding set of coordinates for the upper eyelid in each image in a plurality of images; and
(d) using each corresponding set of coordinates for the upper eyelid from each image in the plurality of images to determine whether the subject is afflicted with a neurological condition.

31. A non-transitory computer readable storage medium storing one or more programs for localizing an upper eyelid in an image of a subject, the one or more programs configured for execution by a computer, wherein the one or more programs comprise instructions for:
(a) obtaining the image of an eye of the subject in electronic format;
(b) inputting the image into a trained neural network comprising at least 10,000 parameters, thereby obtaining a set of coordinates for an upper eyelid in the image;
(c) repeating the obtaining (a) and inputting (b) over the course of a non-zero duration thereby obtaining a corresponding set of coordinates for the upper eyelid in each image in a plurality of images; and
(d) using each corresponding set of coordinates for the upper eyelid from each image in the plurality of images to determine whether the subject is afflicted with a neurological condition.

* * * * *